US011946405B2

(12) United States Patent
Schlereth et al.

(10) Patent No.: US 11,946,405 B2
(45) Date of Patent: Apr. 2, 2024

(54) FOUR-WAY CONVERSION CATALYST FOR THE TREATMENT OF AN EXHAUST GAS STREAM

(71) Applicant: BASF Corporation, Florham Park, NJ (US)

(72) Inventors: David Schlereth, Nienburg/Weser (DE); Hao Li, Nienburg/Weser (DE); Stephen Siemund, Hannover (DE); Thomas Schmitz, Hannover (DE); Attilio Siani, Shanghai (CN); Florian Waltz, Hannover (DE)

(73) Assignee: BASF Corporation, Florham Park, NJ (US)

( * ) Notice: Subject to any disclaimer, the term of this patent is extended or adjusted under 35 U.S.C. 154(b) by 462 days.

(21) Appl. No.: 17/250,544

(22) PCT Filed: Aug. 30, 2019

(86) PCT No.: PCT/EP2019/073226
§ 371 (c)(1),
(2) Date: Feb. 2, 2021

(87) PCT Pub. No.: WO2020/043885
PCT Pub. Date: Mar. 5, 2020

(65) Prior Publication Data
US 2021/0293168 A1    Sep. 23, 2021

(30) Foreign Application Priority Data
Aug. 31, 2018 (EP) ................................. 18191953

(51) Int. Cl.
*B01J 21/04* (2006.01)
*B01J 21/06* (2006.01)
(Continued)

(52) U.S. Cl.
CPC .............. *F01N 3/035* (2013.01); *B01J 23/63* (2013.01); *F01N 3/022* (2013.01); *F01N 3/101* (2013.01);
(Continued)

(58) Field of Classification Search
CPC . B01J 21/04; B01J 21/066; B01J 23/02; B01J 23/04; B01J 23/10; B01J 23/42;
(Continued)

(56) References Cited

U.S. PATENT DOCUMENTS 7,722,829 B2 * 5/2010 Punke .................... B01J 29/068
422/180
8,524,182 B2 * 9/2013 Grubert ................... F01N 3/035
60/299
(Continued)

FOREIGN PATENT DOCUMENTS

CN       103079683 A      9/2015
DE    112016005997 T5     8/2018
(Continued)

OTHER PUBLICATIONS

International Search Report dated Dec. 5, 2019 for International Application No. PCT/EP2019/073226.
(Continued)

Primary Examiner — Cam N. Nguyen
(74) Attorney, Agent, or Firm — DLA Piper LLP (US)

(57) ABSTRACT

The present invention relates to a four-way conversion catalyst for the treatment of an exhaust gas stream of a gasoline engine, the catalyst comprising a porous wall-flow filter substrate comprising an inlet end, an outlet end, a substrate axial length extending between the inlet end and the outlet end, and a plurality of passages defined by porous internal walls of the porous wallflow filter substrate, wherein the plurality of passages comprise inlet passages having an
(Continued)

open inlet end and a closed outlet end, and outlet passages having a closed inlet end and an open outlet end, wherein the interface between the passages and the porous internal walls is defined by the surface of the internal walls; wherein the porous internal walls comprise pores which comprise an oxidic component comprising a first refractory metal oxide, said first refractory metal oxide comprising aluminum, said oxidic component having a platinum group metal content in the range of from 0 to 0.001 weight-% based on the total weight of the oxidic component; wherein the catalyst further comprises a first three-way conversion catalytic coating, at least weight-% thereof being comprised in the pores of the internal walls, said first three-way conversion catalytic coating comprising an oxygen storage compound and a platinum group metal supported on a second refractory metal oxide.

16 Claims, 3 Drawing Sheets

(51) Int. Cl.
| | | |
|---|---|---|
| | *B01J 23/02* | (2006.01) |
| | *B01J 23/04* | (2006.01) |
| | *B01J 23/10* | (2006.01) |
| | *B01J 23/42* | (2006.01) |
| | *B01J 23/44* | (2006.01) |
| | *B01J 23/46* | (2006.01) |
| | *B01J 23/63* | (2006.01) |
| | *B01J 35/00* | (2006.01) |
| | *B01J 35/04* | (2006.01) |
| | *F01N 3/022* | (2006.01) |
| | *F01N 3/035* | (2006.01) |
| | *F01N 3/10* | (2006.01) |

(52) U.S. Cl.
CPC .............. *B01J 21/04* (2013.01); *B01J 21/066* (2013.01); *F01N 2370/02* (2013.01); *F01N 2510/06* (2013.01); *F01N 2570/10* (2013.01); *F01N 2570/12* (2013.01); *F01N 2570/14* (2013.01)

(58) Field of Classification Search
CPC ... B01J 23/44; B01J 23/46; B01J 23/63; B01J 35/0006; B01J 35/04; F01N 3/022; F01N 3/035; F01N 3/101

USPC ........ 502/302–304, 332–334, 339, 349, 355, 502/415, 439

See application file for complete search history.

(56) References Cited

U.S. PATENT DOCUMENTS

| | | | |
|---|---|---|---|
| 8,709,349 B2* | 4/2014 | Miyairi | B01D 46/2429 422/177 |
| 8,802,016 B2* | 8/2014 | Grubert | B01J 35/04 422/177 |
| 8,815,189 B2 | 8/2014 | Arnold et al. | |
| 8,845,974 B2* | 9/2014 | Li | C04B 38/0006 422/177 |
| 8,940,259 B2* | 1/2015 | Brown | B01J 23/63 60/299 |
| 10,215,073 B2* | 2/2019 | Punke | B01J 35/0006 |
| 11,376,569 B2* | 7/2022 | Schmitz | B01J 23/63 |
| 2006/0057046 A1* | 3/2006 | Punke | B01J 37/0248 422/177 |
| 2007/0104623 A1 | 5/2007 | Dettling et al. | |
| 2010/0275579 A1* | 11/2010 | Klingmann | B01J 37/0244 422/310 |
| 2011/0212831 A1* | 9/2011 | Goto | B01D 46/24492 502/100 |
| 2012/0124974 A1 | 5/2012 | Li et al. | |
| 2018/0185788 A1* | 7/2018 | Grubert | B01J 23/83 |
| 2019/0009254 A1 | 1/2019 | Clowes et al. | |
| 2020/0353410 A1* | 11/2020 | Waltz | F01N 3/035 |

FOREIGN PATENT DOCUMENTS

| | | |
|---|---|---|
| JP | 2003-265964 A | 9/2003 |
| WO | 2011/151711 A1 | 12/2011 |
| WO | 2018024546 A1 | 2/2018 |
| WO | 2018024547 A1 | 2/2018 |
| WO | 2019197177 A1 | 10/2019 |

OTHER PUBLICATIONS

Notice of Reasons for Refusal dated Aug. 1, 2023, of counterpart Japanese Patent Application No. 2021-511578, along with an English translation.

* cited by examiner

FOUR-WAY CONVERSION CATALYST FOR THE TREATMENT OF AN EXHAUST GAS STREAM

This application is a national stage entry application under 35 U.S.C. § 371 based on International Application No. PCT/EP2019/073226, filed Aug. 30, 2019, and claims priority to European Patent Application No. 18191953.1, filed Aug. 31, 2018; the contents of each application is incorporated herein by reference in its entirety.

The present invention relates to a four-way conversion catalyst for the treatment of an exhaust gas stream of a gasoline engine and to a process for preparing said catalyst. The present invention further relates to a four-way conversion catalyst obtained or obtainable by said process, to an exhaust gas treatment system comprising the four-way conversion catalyst of the present invention and to a method of treating an exhaust gas stream from a gasoline engine, using said four-way conversion catalyst.

Exhaust gas particle filtration is the key function of a gasoline particle filter. By coating a filter substrate with a catalytic active slurry, it is possible to add the features of a three-way conversion catalyst to the filter, further referred to as four-way conversion (FWC) catalyst. The catalytic activity of the FWC is usually deteriorating over vehicle lifetime. One of the main deterioration mechanisms is thermal degradation of the catalyst due to high exhaust gas temperatures which occur in normal driving conditions.

When comparing to a state of the art three-way-conversion catalyst (TWC), the severity of activity degradation of the FWC is higher than that of a TWC. To compensate effects of stronger thermal degradation, currently higher catalyst volume and/or more platinum group metal (PGM) is used. Therefore, it is needed to make a FWC catalyst competitive compared to a TWC catalyst by significantly improving the thermal stability.

U.S. Pat. No. 8,815,189 B2 discloses exhaust systems and components suitable for use with gasoline engines, wherein three-way conversion (TWC) catalysts located on particulate filters are provided. The TWC catalyst comprises a coating comprising a platinum group metal and an oxygen storage component; the coating is preferably free of alumina.

WO 2018/024546 A1 discloses an emission treatment system downstream of a gasoline engine comprising a first three-way conversion catalytic material deposited on a flow-through substrate followed by a catalyzed particulate filter which comprises a second three-way conversion catalytic material permeating the walls of a particulate filter. The second three-way conversion catalytic material comprises rhodium as the only platinum group metal.

WO 2018/024547 A1 discloses an emission treatment system downstream of a gasoline engine comprising a three-way conversion catalytic material permeating the walls of a particulate filter.

Investigation of deterioration mechanism showed that silicon migration from a cordierite substrate to a catalytic active layer as one potential root cause for stronger deterioration as seen in a three way conversion catalyst. The silicon migration also occurs from a three-way conversion catalyst substrate which consists of cordierite as well. However the catalytic coating of a TWC catalyst is much thicker than on a filter substrate where the contact between the coating and the substrate is more intimate. Thus migration of silicon may harm catalytic functionality more effectively.

Therefore, it was an object of the present invention to provide a four-way conversion catalyst for the treatment of an exhaust gas stream of a gasoline engine which exhibits improved catalytic activities, such as improved HC oxidation, CO oxidation and NOx conversion, an improved filtration efficiency and an improved thermal stability. Surprisingly, it was found that the four-way conversion catalyst of the present invention permits to achieve improved catalytic activities, such as improved HC oxidation, CO oxidation and NOx conversion, an improved filtration efficiency and an improved thermal stability.

Therefore, the present invention relates to a four-way conversion catalyst for the treatment of an exhaust gas stream of a gasoline engine, the catalyst comprising a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;

wherein the porous internal walls comprise pores which comprise an oxidic component comprising a first refractory metal oxide, said first refractory metal oxide comprising aluminum, said oxidic component having a platinum group metal content in the range of from 0 to 0.001 weight-% based on the total weight of the oxidic component;

wherein the catalyst further comprises a first three-way conversion catalytic coating, at least 10 weight-% thereof being comprised in the pores of the internal walls, said first three-way conversion catalytic coating comprising an oxygen storage compound and a platinum group metal supported on a second refractory metal oxide.

Preferably from 98 to 100 weight-%, more preferably from 99 to 100 weight-%, more preferably from 99.5 to 100 weight-%, more preferably from 99.9 to 100 weight-% of the first refractory metal consists of aluminum and oxygen, more preferably alumina.

It is preferred that the first refractory metal oxide has a BET specific surface area in the range of from 50 to 500 $m^2/g$, more preferably in the range of from 70 to 300 $m^2/g$, wherein the BET specific surface area is determined according to Reference Example 2.

Preferably from 50 to 99 weight-%, more preferably from 60 to 99 weight-%, more preferably from 70 to 99 weight-%, more preferably from 80 to 99 weight-%, more preferably from 85 to 95 weight-% of the oxidic component consist of the first refractory metal oxide.

As to the oxidic component, it is preferred that it further comprises an oxide comprising one or more of Mg, Ca, Sr and Ba, more preferably an oxide comprising one or more of Mg, Ca and Ba, more preferably an oxide comprising one or more oxides of Mg and Ba, more preferably an oxide comprising barium, more preferably baria. It is more preferred that the oxidic component further comprises baria.

As to the oxidic component, it is preferred that it further comprises an oxide comprising one or more of La, Y, Nd, Ti and Zr, more preferably an oxide comprising one or more of Ti and Zr, more preferably an oxide comprising zirconium, more preferably zirconia. It is more preferred that the oxidic component further comprises zirconia. More preferably, the oxidic component further comprises baria and zirconia.

It is preferred that the oxidic material further comprises a metal oxide binder, wherein the metal oxide binder more preferably comprises an oxide comprising one or more of zirconium, aluminum, and titanium, more preferably comprises an oxide comprising one or more of aluminum and zirconium, more preferably comprises an oxide comprising aluminum.

Preferably from 98 to 100 weight-%, more preferably from 99 to 100 weight-%, more preferably from 99.5 to 100 weight-%, more preferably from 99.9 to 100 weight-% of the oxidic component consist of the first refractory metal oxide, the oxide comprising one or more of Mg, Ca, Sr and Ba, the oxide comprising one or more of La, Y, Nd, Ti and Zr and more preferably a metal oxide binder as defined in the foregoing.

Alternatively, it is preferred that from 98 to 100 weight-%, more preferably from 99 to 100 weight-%, more preferably from 99.5 to 100 weight-%, more preferably from 99.9 to 100 weight-% of the oxidic component consist of the first refractory metal oxide.

According to the present invention, it is preferred that the catalyst comprises the oxidic component at a loading in the range of from 7 to 75 g/l, more preferably in the range of from 8 to 60 g/l, more preferably in the range of from 10 to 60 g/l, more preferably in the range of from 12 to 32 g/l. It is preferred that the catalyst comprises the oxidic component at a loading in the range of from 12 to 18 g/l. Alternatively, it is more preferred that the catalyst comprises the oxidic component at a loading in the range of from 20 to 32 g/l.

It is preferred that at least 90 weight-%, more preferably from 90 to 100 weight-%, more preferably from 95 to 100 weight-%, more preferably from 98 to 100 weight-%, more preferably from 99 to 100 weight-%, more preferably from 99.5 to 100 weight-%, more preferably from 99.9 to 100 weight-% of the oxidic component comprised in the catalyst are in the pores of the porous internal walls.

Therefore, the present invention preferably relates to a four-way conversion catalyst for the treatment of an exhaust gas stream of a gasoline engine, the catalyst comprising
  a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;
  wherein the porous internal walls comprise pores which comprise an oxidic component comprising a first refractory metal oxide, said first refractory metal oxide comprising aluminum, said oxidic component having a platinum group metal content in the range of from 0 to 0.001 weight-% based on the total weight of the oxidic component, wherein at least 90 weight-%, more preferably from 90 to 100 weight-%, more preferably from 95 to 100 weight-%, of the oxidic component comprised in the catalyst are in the pores of the porous internal walls;
  wherein the catalyst further comprises a first three-way conversion catalytic coating, at least 10 weight-% thereof being comprised in the pores of the internal walls, said first three-way conversion catalytic coating comprising an oxygen storage compound and a platinum group metal supported on a second refractory metal oxide;
  wherein from 98 to 100 weight-%, more preferably from 99 to 100 weight-%, of the oxidic component consist of the first refractory metal oxide, an oxide comprising one or more of Mg, Ca, Sr and Ba as defined in the foregoing, an oxide comprising one or more of La, Y, Nd, Ti and Zr as defined in the foregoing, and more preferably a metal oxide binder as defined in the foregoing; or wherein from 98 to 100 weight-%, more preferably from 99 to 100 weight-%, of the oxidic component consist of the first refractory metal oxide.

According to the present invention, it is preferred that from 0 to 0.001 weight-%, more preferably from 0 to 0.0001 weight-%, more preferably from 0 to 0.00001 weight-% of the oxidic component consist of cerium.

It is preferred that from 0 to 0.001 weight-%, more preferably from 0 to 0.0001 weight-%, more preferably from 0 to 0.00001 weight-% of the oxidic component consist of silicon.

It is preferred that the oxidic compound has a platinum group metal content in the range of from 0 to 0.0001 weight-%, more preferably in the range of from 0 to 0.00001 weight-% based on the total weight of the oxidic component.

As to the first three-way conversion catalytic coating, there is no particular restriction. It is however preferred that the first three-way conversion catalytic coating comprises one or more platinum group metals, more preferably one or more of ruthenium, palladium, rhodium, platinum, and iridium, more preferably one or more of palladium, rhodium and platinum, more preferably one or more of palladium and rhodium.

It is preferred that the oxygen storage compound comprised in the first three-way conversion catalytic coating comprises cerium, more preferably comprises one or more of a cerium oxide, a mixture of oxides comprising a cerium oxide and a mixed oxide comprising cerium, wherein the mixed oxide comprising cerium more preferably additionally comprises one or more of zirconium, yttrium, neodymium, lanthanum, hafnium, samarium and praseodymium, more preferably one or more of zirconium, yttrium, neodymium and lanthanum.

It is preferred that the oxygen storage compound comprised in the first three-way conversion catalytic coating comprises a mixed oxide comprising cerium, zirconium, yttrium, neodymium and lanthanum. It is more preferred that from 98 to 100 weight-%, more preferably from 99 to 100 weight-%, more preferably from 99.5 to 100 weight-%, more preferably from 99.9 to 100 weight-% of the oxygen storage compound consist of a mixed oxide comprising cerium, zirconium, yttrium, neodymium and lanthanum. It is more preferred that from 20 to 60 weight-%, more preferably from 35 to 45 weight-% of the oxygen storage compound consist of cerium, calculated as $CeO_2$, and more preferably from 30 to 60 weight-%, more preferably from 40 to 50 weight-% of the oxygen storage compound consist of zirconium, calculated as $ZrO_2$.

As to the oxygen storage compound comprised in the first three-way conversion catalytic coating, it is alternatively preferred that it comprises a mixed oxide comprising cerium, zirconium, yttrium and lanthanum. It is more preferred that from 98 to 100 weight-%, more preferably from 99 to 100 weight-%, more preferably from 99.5 to 100 weight-%, more preferably from 99.9 to 100 weight-% of the oxygen storage compound consist of a mixed oxide comprising cerium, zirconium, yttrium and lanthanum. It is more preferred that from 20 to 60 weight-%, more preferably from 35 to 45 weight-%, of the oxygen storage compound consist of cerium, calculated as $CeO_2$, and more preferably from 35 to 60 weight-%, more preferably from 45 to 55 weight-%, of the oxygen storage compound consist of zirconium, calculated as $ZrO_2$.

According to the present invention, it is preferred that the oxygen storage compound comprised in the first three-way conversion catalytic coating has a porosity in the range of from 0.05 to 1.5 ml/g, more preferably in the range of from 0.1 to 1.0 ml/g, more preferably in the range of from 0.15 to 0.8 ml/g, wherein the porosity is determined according to Reference Example 1.

It is preferred that the first three-way conversion catalytic coating comprises a platinum group metal, more preferably palladium, supported on the oxygen storage component.

As to the second refractory metal oxide comprised in the first three-way conversion catalytic coating, it is preferred that it comprises aluminum, more preferably comprises one or more of aluminum oxide, a mixture of oxides comprising aluminum, a mixed oxide comprising aluminum, wherein the mixed oxide comprising aluminum more preferably additionally comprises one or more of zirconium, cerium, lanthanum, barium, and neodymium. It is more preferred that the second refractory metal oxide comprises, more preferably is, an aluminum oxide, more preferably a gamma aluminum oxide.

The second refractory metal oxide has preferably a porosity in the range of from 0.05 to 1.5 ml/g, more preferably in the range of from 0.1 to 1.0 ml/g, more preferably in the range of from 0.15 to 0.8 ml/g, wherein the porosity is determined according to Reference Example 1.

It is preferred that the first three-way conversion catalytic coating further comprises a promotor, wherein the promotor more preferably comprises one or more of zirconium, barium, strontium, lanthanum, neodymium, yttrium, and praseodymium, wherein the promotor more preferably comprises one or more of zirconium and barium, wherein the promotor more preferably comprises, more preferably is, one or more of a mixture of barium oxide and zirconium oxide and a mixed oxide of barium and zirconium.

It is preferred that the first three-way conversion catalytic coating comprises, more preferably consists of, the platinum group metal, more preferably rhodium, supported on the second refractory metal oxide; a platinum group metal, more preferably palladium, supported on the oxygen storage component, and a promotor as defined in the foregoing.

It is preferred that from 98 to 100 weight-%, more preferably from 99 to 100 weight-%, more preferably 99.5 to 100 weight-%, more preferably from 99.9 to 100 weight-% of the first three-way conversion catalytic coating consist of the platinum group metal, preferably rhodium, supported on the second refractory metal oxide; a platinum group metal, preferably palladium, supported on the oxygen storage component, and a promotor as defined in the foregoing.

Therefore, the present invention preferably to a four-way conversion catalyst for the treatment of an exhaust gas stream of a gasoline engine, the catalyst comprising a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;

wherein the porous internal walls comprise pores which comprise an oxidic component comprising a first refractory metal oxide, said first refractory metal oxide comprising aluminum, said oxidic component having a platinum group metal content in the range of from 0 to 0.001 weight-% based on the total weight of the oxidic component, wherein at least 90 weight-%, more preferably from 90 to 100 weight-%, more preferably from 95 to 100 weight-%, of the oxidic component comprised in the catalyst are in the pores of the porous internal walls;

wherein the catalyst further comprises a first three-way conversion catalytic coating, at least 10 weight-% thereof being comprised in the pores of the internal walls, said first three-way conversion catalytic coating comprising an oxygen storage compound and a platinum group metal supported on a second refractory metal oxide;

wherein the first three-way conversion catalytic coating comprises, more preferably consists of, the platinum group metal, more preferably rhodium, supported on the second refractory metal oxide; a platinum group metal, more preferably palladium, supported on the oxygen storage component, and a promotor as defined in the foregoing;

wherein more preferably from 98 to 100 weight-%, more preferably from 99 to 100 weight-%, of the oxidic component consist of the first refractory metal oxide, an oxide comprising one or more of Mg, Ca, Sr and Ba as defined above, the oxide comprising one or more of La, Y, Nd, Ti and Zr as defined above, and more preferably a metal oxide binder as defined in the foregoing; or wherein more preferably from 98 to 100 weight-%, more preferably from 99 to 100 weight-%, of the oxidic component consist of the first refractory metal oxide.

According to the present invention, it is preferred that, in the catalyst, the first three-way conversion catalytic coating comprises the second refractory metal oxide at a loading (l1) and the oxygen storage compound at a loading (l2), wherein the ratio of the loading (l1) to the loading (l2) is in the range of from 3:1 to 1:6, more preferably in the range of from 2:1 to 1:5, more preferably in the range of from 1.5:1 to 1:4, more preferably in the range of from 1:1 to 1:3.

It is preferred that, in the catalyst, the first three-way conversion catalytic coating comprises the platinum group metal supported on the second refractory metal oxide at a loading in the range of from 0.035 to 7.063 g/l (1 to 200 g/ft$^3$), more preferably in the range of from 0.106 to 6.357 g/l (3 to 180 g/ft$^3$), more preferably in the range of from 0.141 to 5.297 g/l (4 to 150 g/ft$^3$), and that the second refractory metal oxide at a loading in the range of from 6.10 to 183.07 g/l (0.1 to 3 g/in$^3$), more preferably in the range of from 9.15 to 152.56 g/l (0.15 to 2.5 g/in$^3$), more preferably in the range of from 12.20 to 122.05 g/l (0.2 to 2 g/in$^3$).

It is preferred that, in the catalyst, the first three-way conversion catalytic coating comprises a platinum group metal supported on the oxygen storage compound at a loading in the range of from 0.035 to 7.063 g/l (1 to 200 g/ft$^3$), more preferably in the range of from 0.106 to 6.357 g/l (3 to 180 g/ft$^3$), more preferably in the range of from 0.141 to 5.297 g/l (4 to 150 g/ft$^3$), and that the oxygen storage compound at a loading in the range of from 6.10 to 183.07 g/l (0.1 to 3 g/in$^3$), more preferably in the range of from 9.15 to 152.56 g/l (0.15 to 2.5 g/in$^3$), more preferably in the range of from 12.20 to 122.05 g/l (0.2 to 2 g/in$^3$).

It is preferred that, in the catalyst, the first three-way conversion catalytic coating comprises a promotor at a loading in the range of from 0.061 to 61.024 g/l (0.001 to 1.0 g/in$^3$), more preferably in the range of from 0.305 to 30.512 g/l (0.005 to 0.5 g/in$^3$), more preferably in the range of from 0.305 to 12.20 g/l (0.005 to 0.2 g/in$^3$).

Preferably from 10 to 100 weight-% of the first three-way conversion catalytic coating are comprised in the pores of the internal walls.

Preferably from 30 to 100 weight-%, more preferably from 50 to 100 weight-%, more preferably from 70 to 100 weight-%, of the first three-way conversion catalytic coating are comprised in the pores of the internal walls.

It is preferred that the catalyst comprises the first three-way conversion catalytic coating at a loading in the range of from 30 to 250 g/l, more preferably in the range of from 40 to 200 g/l, more preferably in the range of from 50 to 170 g/l.

According to a first aspect of the present invention, it is preferred that the pores comprising the oxidic component extends over x % of the substrate axial length from the inlet end toward the outlet end of the inlet passages, with x being in the range of from 95 to 100. Alternatively, it is preferred that the pores comprising the oxidic component extends over x % of the substrate axial length from the outlet end toward the inlet end of the outlet passages, with x being in the range of from 95 to 100.

According to the first aspect of the present invention, it is more preferred that the first three-way conversion catalytic coating extends over y % of the substrate axial length from the inlet end toward the outlet end of the inlet passages, with y being in the range of from 20 to x.

According to the first aspect of the present invention, it is more preferred that the first three-way conversion catalytic coating extends over y % of the substrate axial length from the inlet end toward the outlet end of the inlet passages, with y being in the range of from 80 to x, more preferably in the range of from 90 to x, more preferably with y being x. It is more preferred that the pores comprising the oxidic component extends over x % of the substrate axial length from the inlet end toward the outlet end of the inlet passages, with x being in the range of from 95 to 100, and that the first three-way conversion catalytic coating extends over y % of the substrate axial length from the inlet end toward the outlet end of the inlet passages, with y being in the range of from 80 to x, more preferably in the range of from 90 to x, more preferably with y being x.

According to the first aspect of the present invention, it is more preferred that the first three-way conversion catalytic coating extends over y % of the substrate axial length from the inlet end toward the outlet end of the inlet passages, with y being in the range of from 20 to 70, more preferably in the range of from 40 to 60, more preferably in the range of from 45 to 55.

According to the first aspect of the present invention, it is alternatively more preferred that the first three-way conversion catalytic coating extends over y % of the substrate axial length from the outlet end toward the inlet end of the outlet passages, with y being in the range of from 20 to x. It is more preferred that the first three-way conversion catalytic coating extends over y % of the substrate axial length from the outlet end toward the inlet end of the outlet passages, with y being in the range of from 80 to x, more preferably in the range of from 90 to x, more preferably with y being x. It is more preferred that the pores comprising the oxidic component extends over x % of the substrate axial length from the outlet end toward the inlet end of the outlet passages, with x being in the range of from 95 to 100 and that the first three-way conversion catalytic coating extends over y % of the substrate axial length from the outlet end toward the inlet end of the outlet passages, with y being in the range of from 80 to x, more preferably in the range of from 90 to x, more preferably with y being x.

According to the first aspect of the present invention, it is preferred that from 95 to 100 weight-%, more preferably from 98 to 100 weight-%, more preferably from 99 to 100 weight-%, more preferably from 99.5 to 100 weight-%, more preferably from 99.9 to 100 weight-% of the four-way conversion catalyst consist of the porous wall-flow filter substrate, the oxidic component and the first three-way conversion catalytic coating.

According to a second aspect of the present invention, it is preferred that the pores comprising the oxidic component extends over x % of the substrate axial length from the inlet end toward the outlet end of the inlet passages, with x being in the range of from 95 to 100. Alternatively, it is preferred that the pores comprising the oxidic component extends over x % of the substrate axial length from the outlet end toward the inlet end of the outlet passages, with x being in the range of from 95 to 100.

According to the second aspect of the present invention, it is more preferred that the catalyst further comprises a second three-way conversion catalytic coating, at least 10 weight-% thereof being comprised in the pores of the internal walls, the second three-way conversion catalytic coating comprising an oxygen storage compound and a platinum group metal supported on a refractory metal oxide, wherein the second three-way conversion catalytic coating extends over z % of the substrate axial length from the outlet end toward the inlet end of the outlet passages, with z being in the range of from 20 to x, more preferably in the range of from 20 to 70, more preferably in the range of from 40 to 60, more preferably in the range of from 45 to 55.

According to the second aspect of the present invention, it is more preferred that the first three-way conversion coating extends over y % of the substrate axial length from the inlet end toward the outlet end of the inlet passages, with y being in the range of from 20 to 70, more preferably in the range of from 40 to 60, more preferably in the range of from 45 to 55, and that the second three-way conversion catalytic coating extends over z % of the substrate axial length from the outlet end toward the inlet end, with z being in the range of from 20 to 70, more preferably in the range of from 40 to 60, more preferably in the range of from 45 to 55.

As to the second three-way conversion catalytic coating, it is preferred that it comprises one or more platinum group metals, more preferably one or more of ruthenium, palladium, rhodium, platinum, and iridium, more preferably one or more of palladium, rhodium and platinum, more preferably one or more of palladium and rhodium.

As to the oxygen storage compound comprised in the second three-way conversion catalytic coating, it is preferred that it comprises cerium, more preferably comprises one or more of a cerium oxide, a mixture of oxides comprising a cerium oxide and a mixed oxide comprising cerium, wherein the mixed oxide comprising cerium more preferably additionally comprises one or more of zirconium, yttrium, neodymium, lanthanum, hafnium, samarium and praseodymium, more preferably one or more of zirconium, yttrium, neodymium and lanthanum.

As to the oxygen storage compound comprised in the second three-way conversion catalytic coating, it is preferred that it has a porosity in the range of from 0.05 to 1.5 ml/g, more preferably in the range of from 0.1 to 1.0 ml/g, more preferably in the range of from 0.15 to 0.8 ml/g, wherein the porosity is determined according to Reference Example 1.

It is preferred that the oxygen storage compound comprised in the second three-way conversion catalytic coating comprises a mixed oxide comprising cerium, zirconium, yttrium, neodymium and lanthanum. More preferably from 98 to 100 weight-%, more preferably from 99 to 100 weight-%, more preferably from 99.5 to 100 weight-%, more preferably from 99.9 to 100 weight-% of the oxygen storage compound consist of a mixed oxide comprising cerium, zirconium, yttrium, neodymium and lanthanum. More preferably from 20 to 60 weight-%, more preferably from 35 to 45 weight-% of the oxygen storage compound consist of cerium, calculated as $CeO_2$, and more preferably from 30 to 60 weight-%, more preferably from 40 to 50 weight-% of the oxygen storage compound consist of zirconium, calculated as $ZrO_2$. It is alternatively preferred that the oxygen storage compound comprised in the second three-way conversion catalytic coating comprises a mixed oxide comprising cerium, zirconium, yttrium and lanthanum. More preferably from 98 to 100 weight-%, more preferably from 99 to 100 weight-%, more preferably from 99.5 to 100 weight-%, more preferably from 99.9 to 100 weight-% of the oxygen storage compound consist of a mixed oxide comprising cerium, zirconium, yttrium and lanthanum. More preferably from 20 to 60 weight-%, more preferably from 35 to 45 weight-% of the oxygen storage compound consist of cerium, calculated as $CeO_2$, and more preferably from 35 to 60 weight-%, more preferably from 45 to 55 weight-% of the oxygen storage compound consist of zirconium, calculated as $ZrO_2$.

It is preferred that the second three-way conversion catalytic coating comprises a platinum group metal, more preferably palladium, supported on the oxygen storage component.

As to the refractory metal oxide comprised in the second three-way conversion catalytic coating, it is preferred that it comprises aluminum, more preferably comprises one or more of aluminum oxide, a mixture of oxides comprising aluminum, a mixed oxide comprising aluminum, wherein the mixed oxide comprising aluminum more preferably additionally comprises one or more of zirconium, cerium, lanthanum, barium, and neodymium. It is more preferred that the refractory metal oxide comprised in the second three-way conversion catalytic coating comprises, more preferably is, an aluminum oxide, more preferably a gamma aluminum oxide.

It is preferred that the refractory metal oxide comprised in the second three-way conversion catalytic coating has a porosity in the range of from 0.05 to 1.5 ml/g, more preferably in the range of from 0.1 to 1.0 ml/g, more preferably in the range of from 0.15 to 0.8 ml/g, wherein the porosity is determined according to Reference Example 1.

As to the second three-way conversion catalytic coating, it is preferred that it further comprises a promotor, wherein the promotor more preferably comprises one or more of zirconium, barium, strontium, lanthanum, neodymium, yttrium, and praseodymium, wherein the promotor more preferably comprises one or more of zirconium and barium, wherein the promotor more preferably comprises, more preferably is, one or more of a mixture of barium oxide and zirconium oxide and a mixed oxide of barium and zirconium.

According to the present invention, it is preferred that the second three-way conversion catalytic coating comprises, more preferably consists of, the platinum group metal, more preferably rhodium, supported on the refractory metal oxide; a platinum group metal, more preferably palladium, supported on the oxygen storage component, and a promotor as defined in the foregoing.

Preferably from 98 to 100 weight-%, more preferably from 99 to 100 weight-%, more preferably 99.5 to 100 weight-%, more preferably from 99.9 to 100 weight-% of the second three-way conversion catalytic coating consist of the platinum group metal, more preferably rhodium, supported on the refractory metal oxide; a platinum group metal, more preferably palladium, supported on the oxygen storage component, and a promotor as defined in the foregoing.

Therefore, the present invention preferably relates to a four-way conversion catalyst for the treatment of an exhaust gas stream of a gasoline engine, the catalyst comprising
  a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;
  wherein the porous internal walls comprise pores which comprise an oxidic component comprising a first refractory metal oxide, said first refractory metal oxide comprising aluminum, said oxidic component having a platinum group metal content in the range of from 0 to 0.001 weight-% based on the total weight of the oxidic component, wherein at least 90 weight-% of the oxidic component comprised in the catalyst are in the pores of the porous internal walls and wherein the pores comprising the oxidic component extends over x % of the substrate axial length, from the inlet end toward the outlet end of the inlet passages, or from the outlet end toward the inlet end of the outlet passages, with x being in the range of from 95 to 100;
  wherein the catalyst further comprises a first three-way conversion catalytic coating, at least 10 weight-% thereof being comprised in the pores of the internal walls, said first three-way conversion catalytic coating comprising an oxygen storage compound and a platinum group metal supported on a second refractory metal oxide;
  wherein the first three-way conversion catalytic coating comprises, more preferably consists of, the platinum group metal, more preferably rhodium, supported on the second refractory metal oxide; a platinum group metal, more preferably palladium, supported on the oxygen storage component, and a promotor as defined in the foregoing, wherein the first three-way conversion coating extends over y % of the substrate axial length from the inlet end toward the outlet end of the inlet passages, with y being in the range of from 45 to 55;
  wherein the catalyst further comprises a second three-way conversion catalytic coating, at least 10 weight-% thereof being comprised in the pores of the internal walls, the second three-way conversion catalytic coating comprising an oxygen storage compound and a platinum group metal supported on a refractory metal oxide, wherein the second three-way conversion catalytic coating extends over z % of the substrate axial length from the outlet end toward the inlet end of the outlet passages, with z being in the range of from 20 to x, more preferably in the range of from 45 to 55;

wherein the second three-way conversion catalytic coating comprises, more preferably consists of, the platinum group metal, more preferably rhodium, supported on the refractory metal oxide; a platinum group metal, more preferably palladium, supported on the oxygen storage component, and a promotor as defined in the foregoing.

According to the present invention, it is preferred that, in the catalyst, the second three-way conversion catalytic coating comprises the refractory metal oxide at a loading (I1') and the oxygen storage compound at a loading (I2'), wherein the ratio of the loading (I1') to the loading (I2') is in the range of from 3:1 to 1:6, more preferably in the range of from 2:1 to 1:5, more preferably in the range of from 1.5:1 to 1:4, more preferably in the range of from 1:1 to 1:3.

It is preferred that, in the catalyst, the second three-way conversion catalytic coating comprises the platinum group metal supported on the refractory metal oxide at a loading in the range of from 0.035 to 7.063 g/l (1 to 200 g/ft$^3$), more preferably in the range of from 0.106 to 6.357 g/l (3 to 180 g/ft$^3$), more preferably in the range of from 0.141 to 5.297 g/l (4 to 150 g/ft$^3$), and that the refractory metal oxide at a loading in the range of from 6.10 to 183.07 g/l (0.1 to 3 g/in$^3$), more preferably in the range of from 9.15 to 152.56 g/l (0.15 to 2.5 g/in$^3$), more preferably in the range of from 12.20 to 122.05 g/l (0.2 to 2 g/in$^3$).

It is preferred that, in the catalyst, the second three-way conversion catalytic coating comprises a platinum group metal supported on the oxygen storage compound at a loading in the range of from 0.035 to 7.063 g/l (1 to 200 g/ft$^3$), more preferably in the range of from 0.106 to 6.357 g/l (3 to 180 g/ft$^3$), more preferably in the range of from 0.141 to 5.297 g/l (4 to 150 g/ft$^3$), and that the oxygen storage compound at a loading in the range of from 6.10 to 183.07 g/l (0.1 to 3 g/in$^3$), more preferably in the range of from 9.15 to 152.56 g/l (0.15 to 2.5 g/in$^3$), more preferably in the range of from 12.20 to 122.05 g/l (0.2 to 2 g/in$^3$).

It is preferred that, in the catalyst, the second three-way conversion catalytic coating comprises a promotor at a loading in the range of from 0.061 to 61.024 g/l (0.001 to 1.0 g/in$^3$), more preferably in the range of from 0.305 to 30.512 g/l (0.005 to 0.5 g/in$^3$), more preferably in the range of from 0.305 to 12.20 g/l (0.005 to 0.2 g/in$^3$).

Preferably from 10 to 100 weight-% of the second three-way conversion catalytic coating are comprised in the pores of the internal walls.

More preferably from 30 to 100 weight-%, more preferably from 50 to 100 weight-%, more preferably from 70 to 100 weight-%, of the second three-way conversion catalytic coating are comprised in the pores of the internal walls.

It is preferred that the catalyst comprises the second three-way conversion catalytic coating at a loading in the range of from 30 to 250 g/l, more preferably in the range of from 40 to 200 g/l, more preferably in the range of from 50 to 170 g/l.

It is preferred that the catalyst comprises the first three-way conversion catalytic coating at a loading (L1) and the second three-way conversion catalytic coating at a loading (L2), wherein the ratio of (L1):(L2) is in the range of from 1:3 to 3:1, more preferably in the range of from 1:2 to 2:1, more preferably in the range of from 1:1.1 to 1.1:1.

Preferably from 95 to 100 weight-%, more preferably from 98 to 100 weight-%, more preferably from 99 to 100 weight-%, more preferably from 99.5 to 100 weight-%, more preferably from 99.9 to 100 weight-% of the four-way conversion catalyst consist of the porous wall-flow filter substrate, the oxidic component, the first three-way conversion catalytic coating and the second three-way conversion catalytic coating.

According to the present invention, it is preferred that the first three-way conversion catalytic coating and the second three-way conversion catalytic coating have the same chemical composition.

As to the porous wall-flow filter substrate, it is preferred that it comprises, more preferably consists of, a ceramic substance, wherein the ceramic substance comprises, more preferably consists of, one or more of a silica, a silicate, a aluminosilicate, more preferably a cordierite or a mullite, an aluminum titanate and a silicon carbide, more preferably one or more of a silicon carbide and a cordierite, more preferably a cordierite.

It is preferred that the porous internal walls, comprising the oxidic component, at least 10 weight-% of the first three-way conversion catalytic coating, and optionally at least 10 weight-% of a second three-way conversion catalytic coating as defined in the foregoing, have a relative average porosity in the range of from 20 to 75%, more preferably in the range of from 50 to 75%, more preferably in the range of from 55 to 70%, more preferably in the range of from 60 to 65%, wherein the relative average porosity is defined as the average porosity of the porous internal walls, comprising the oxidic component, at least 10 weight-% of the first three-way conversion catalytic coating, and optionally at least 10 weight-% of a second three-way conversion catalytic coating as defined in the foregoing, to the average porosity of the porous internal walls not comprising the oxidic component and said three-way catalytic coatings, wherein the average porosity is determined according to Reference Example 3.

The present invention further relates to a process for preparing the four-way conversion catalyst according to the present invention, comprising (i) providing a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls, wherein the internal walls have an average pore size in the range of from 10 to 30 micrometers, the average pore size being determined according to Reference Example 3, and wherein the average porosity of the internal walls is in the range of from 25 to 75%, the average porosity being determined according to Reference Example 3;

(ii) providing a slurry comprising particles of a source of the oxidic component, said particles having a Dv90 value in the range of from 0.005 to 20 micrometers, the Dv90 value being determined according to Reference Example 4; coating the porous internal walls of the porous wall-flow filter substrate provided in (i) with the particles of the slurry; calcining the obtained coated filter substrate, obtaining the filter substrate comprising the oxidic component;

(iii) providing a slurry comprising particles of a source of the first three-way conversion catalytic coating, said particles having a Dv90 value in the range of from 2 to 25 micrometers, the Dv90 value being determined according to Reference Example 4; coating the porous internal walls of the porous wall-flow filter substrate obtained in (ii) with the particles of the slurry; calcining the obtained coated filter substrate, obtaining the filter substrate comprising the oxidic component and the first three-way conversion catalytic coating.

As to (i), the internal walls have preferably an average pore size in the range of from 10 to 25 micrometers, more preferably in the range of from 16 to 21 micrometers, wherein the average pore size is determined according to Reference Example 3.

As to (i), the average porosity of the internal walls is preferably in the range of from 50 to 75%, more preferably in the range of from 55 to 70%, more preferably in the range of from 60 to 70%, wherein the average porosity is determined according to Reference Example 3.

As to (i), the particles have preferably a Dv90 value in the range of from 0.005 to 19 micrometers, more preferably in the range of from 0.005 to 1 micrometer, or more preferably in the range of from 2 to 6 micrometers, or more preferably in the range of from 17 to 19 micrometers, wherein the Dv90 value is determined according to Reference Example 4. As to (i), it is more preferred that the particles have a Dv90 value in the range of from 0.005 to 0.5 micrometer, or in the range of from 2.5 to 5 micrometers, wherein the Dv90 value is determined according to Reference Example 4.

It is preferred that the slurry provided in (ii) has a solid content in the range of from 10 to 50 weight-%, more preferably in the range of from 14 to 45 weight-%.

As to (iii), the particles have preferably a Dv90 value in the range of from 3 to 20 micrometers, more preferably in the range of from 4 to 18 micrometers, wherein the Dv90 value is determined according to Reference Example 4.

It is preferred that the slurry provided in (iii) has a viscosity in the range of from 5 to 35 mPa·s, more preferably in the range of from 10 to 30 mPa·s, more preferably in the range of from 12 to 28 mPa·s, at a shear rate of 300 $s^{-1}$ as described in Reference Example 5.

As to (ii), it is preferred that it comprises
- (ii.1) providing particles of a source of a first refractory metal oxide comprising aluminum, water, more preferably with one or more of a source of an oxide comprising one or more of Mg, Ca, Sr and Ba and a source of an oxide comprising one or more of La, Y, Nd, Ti and Zr, and more preferably further providing one or more of an alcohol, an acid and a metal oxide binder, forming a slurry;
- (ii.2) adjusting the pH of the aqueous phase of the slurry obtained in (ii.1) to a value in the range of from 2 to 5, more preferably in the range of from 3 to 4;
- (ii.3) milling the slurry obtained in (ii.2) obtaining particles having a Dv90 value in the range of from 2 to 6 micrometers, or in the range of from 17 to 19 micrometers, the Dv90 value being determined according to Reference Example 4, obtaining the slurry comprising particles of a source of the oxidic component;
- (ii.4) coating the porous internal walls of the porous wall-flow filter substrate provided in (i), with the particles of the slurry obtained in (ii.3), over x % of the substrate axial length from the inlet end to the outlet end of the inlet passages, or from the outlet end to the inlet end of the outlet passages, wherein x is in the range of from 95 to 100, obtaining a slurry treated wall-flow filter substrate;
- (ii.5) optionally drying the slurry-treated wall-flow filter substrate obtained in (ii.4), obtaining a dried slurry treated wall-flow filter substrate;
- (ii.6) calcining the slurry-treated wall-flow filter substrate obtained in (ii.4), or the dried slurry treated wall-flow filter substrate obtained in (ii.5).

According to (ii.1), the first refractory metal oxide preferably comprises, more preferably consists of, alumina, more preferably gamma alumina.

According to (ii.1), the source of an oxide comprising one or more of Mg, Ca, Sr and Ba preferably comprises a salt of one or more of Mg, Ca, Sr and Ba, more preferably a salt of one or more of Mg, Ca and Ba, more preferably a salt of one or more of Mg and Ba, wherein the source of an oxide comprising one or more of Mg, Ca, Sr and Ba, more preferably comprises, more preferably is, a salt of Ba. It is more preferred that the source of an oxide comprising one or more of Mg, Ca, Sr and Ba comprises, more preferably is, barium nitrate.

According to (ii.1), the source of an oxide comprising one or more of La, Y, Nd, Ti and Zr preferably comprises a salt of one or more of La, Y, Nd, Ti and Zr, more preferably a salt of Ti and Zr, wherein the source of an oxide comprising one or more of La, Y, Nd, Ti and Zr more preferably comprises, more preferably is, a salt of Zr. It is more preferred that the source of an oxide comprising one or more of La, Y, Nd, Ti and Zr comprises, more preferably is, zirconium nitrate.

As to (ii), it is alternatively preferred that it comprises
- (ii.1') providing particles of a source of a first refractory metal oxide comprising aluminum, more preferably boehmite, water, and more preferably one or more of an alcohol and an acid, forming a slurry, said particles having more preferably a Dv90 value in the range of from 0.005 to 5 micrometers, more preferably in the range of from 0.005 to 0.5 micrometer, the Dv90 value being determined according to Reference Example 4;
- (ii.2') adjusting the pH of the aqueous phase of the slurry obtained in (ii.1') to a value in the range of from 2 to 5, more preferably in the range of from 3 to 4;
- (ii.3') milling the slurry obtained in (ii.2') to homogenize the slurry, obtaining the slurry comprising particles of a source of the oxidic component;
- (ii.4') coating the porous internal walls of the porous wall-flow filter substrate provided in (i), with the particles of the slurry obtained in (ii.3'), over x % of the substrate axial length, wherein x is in the range of from 95 to 100 from the inlet end to the outlet end of the inlet passages, or from the outlet end to the inlet end of the outlet passages, obtaining a slurry treated wall-flow filter substrate;
- (ii.5') optionally drying the slurry-treated wall-flow filter substrate obtained in (ii.4'), obtaining a dried slurry treated wall-flow filter substrate;
- (ii.6') calcining the slurry-treated wall-flow filter substrate obtained in (ii.4'), or the dried slurry treated wall-flow filter substrate obtained in (ii.5').

It is preferred that the coating according to (ii.4), or (ii.4'), is performed by applying the slurry with vacuum or immersing the substrate, more preferably immersing the substrate.

As to drying according to (ii.5), or (ii.5'), it is preferred that it is performed in a gas atmosphere having a temperature in the range of from 90 to 200° C., more preferably in the range of from 100 to 180° C., the gas atmosphere more preferably comprising oxygen.

As to drying according to (ii.5), or (ii.5'), it is preferred that it is performed in a gas atmosphere for a duration in the range of from 10 minutes to 1 hour, more preferably in the range of from 10 to 30 minutes, the gas atmosphere more preferably comprising oxygen. As to drying according to (ii.5), or (ii.5'), it is more preferred that it is performed in a gas atmosphere having a temperature in the range of from 100 to 180° C. for a duration in the range of from 10 to 30 minutes.

As to calcining according to (ii.6), or (ii.6'), it is preferred that it is performed in a gas atmosphere having a temperature in the range of from 300 to 600° C., more preferably in the range of from 400 to 500° C., the gas atmosphere more preferably comprising oxygen.

As to calcining according to (ii.6), or (ii.6'), it is preferred that it is performed in a gas atmosphere for a duration in the range of from 10 minutes to 6 hours, more preferably from 1 to 6 hours, more preferably in the range of from 2 to 4 hours, the gas atmosphere more preferably comprising oxygen. As to calcining according to (ii.6), or (ii.6'), it is more preferred that it is performed in a gas atmosphere having a temperature in the range of from 400 to 500° C. for a duration in the range of from 2 to 4 hours.

As to (iii), it is preferred that it comprises
- (iii.1) impregnating a source of a platinum group metal onto a refractory metal oxide;
  - admixing the platinum group metal supported on the refractory metal oxide with one or more of an adjuvant and a source of a promotor, obtaining a slurry;
  - milling the obtained slurry obtaining a slurry, wherein the particles comprised in said slurry have a Dv90 value in the range of from 3 to 20 micrometers, more preferably in the range of from 4 to 18 micrometers, wherein the Dv90 value being determined according to Reference Example 4;
- (iii.2) impregnating a source of a platinum group metal onto an oxygen storage compound;
  - admixing the platinum group metal supported on the oxygen storage compound with one or more of an adjuvant and a source of a promotor, obtaining a slurry;
  - milling the obtained slurry obtaining a slurry, wherein the particles comprised in said slurry have a Dv90 value in the range of from 3 to 20 micrometers, more preferably in the range of from 4 to 18 micrometers, wherein the Dv90 value being determined according to Reference Example 4;
- (iii.3) admixing the slurry obtained in (iii.1) and the slurry obtained in (iii.2), obtaining the slurry comprising particles of a source of the first three-way conversion catalytic coating;
- (iii.4) coating the porous internal walls of the porous wall-flow filter substrate obtained in (ii), with the particles of the slurry obtained in (iii.3), over y % of the substrate axial length from the inlet end to the outlet end of the inlet passages, or from the outlet end to the inlet end of the outlet passages, wherein y is in the range of from 20 to x, obtaining a slurry treated wall-flow filter substrate;
- (iii.5) optionally drying the slurry treated wall-flow filter substrate obtained in (iii.4), obtained a dried slurry treated wall-flow filter substrate;
- (iii.6) calcining the slurry treated wall-flow filter substrate obtained in (iii.4), or the dried slurry treated wall-flow filter substrate obtained in (iii.5).

According to (iii.1), it is preferred that the platinum group metal is one or more of ruthenium, palladium, rhodium, platinum, and iridium, more preferably one or more of palladium, rhodium, and platinum, more preferably one or more of palladium and rhodium, more preferably rhodium. It is more preferred that the source of a platinum group metal comprises a salt of a platinum group metal, more preferably comprises a nitrate of a platinum group metal.

According to (iii.1), it is preferred that the refractory metal oxide comprises aluminum, more preferably comprises one or more of an aluminum oxide, a mixture of oxides comprising an aluminum oxide, and a mixed oxide comprising aluminum. It is more preferred that the mixed oxide comprising aluminum additionally comprises one or more of zirconium, cerium, lanthanum, barium, and neodymium. It is more preferred according to (iii.1) that the refractory metal oxide support comprises, more preferably is, an aluminum oxide, more preferably a gamma aluminum oxide.

According to (iii.1) and prior to admixing the platinum group metal supported on the refractory metal oxide with one or more of an adjuvant and a source of a promotor, it is preferred that the refractory metal oxide impregnated with the source of platinum group metal is calcined in gas atmosphere, more preferably having a temperature in the range of from 250 to 600° C., more preferably in the range of from 300 to 450° C., the gas atmosphere more preferably comprising oxygen.

According to (iii.1), it is preferred that the adjuvant is one or more of water, a polyacrylate, a methylcellulose, and an alcohol, more preferably one or more of water and an alcohol, more preferably water and an alcohol.

According to (iii.1), it is preferred that the source of a promotor is a source of one or more of a promotor comprising zirconium, a promotor comprising barium, a promotor comprising strontium, a promotor comprising lanthanum, a promotor comprising neodymium, a promotor comprising yttrium, a promotor comprising praseodymium, more preferably one or more of a promotor comprising zirconium and a promotor comprising barium. It is more preferred that the source of a promotor is a source of a promotor comprising zirconium and a promotor comprising barium.

According to (iii.1), it is preferred that the source of a promotor comprises a salt, more preferably a nitrate, of the respective promotor element, more preferably zirconium nitrate and barium nitrate.

According to (iii.2), it is preferred that the platinum group metal is one or more of ruthenium, palladium, rhodium, platinum, and iridium, more preferably one or more of palladium, rhodium, and platinum, more preferably one or more of palladium and rhodium, more preferably palladium. It is more preferred that the source of a platinum group metal comprises a salt of a platinum group metal, more preferably comprises a nitrate of a platinum group metal.

According to (iii.2), it is preferred that the oxygen storage compound comprises cerium, more preferably comprises one or more of a cerium oxide, a mixture of oxides comprising a cerium oxide, and a mixed oxide comprising cerium. It is more preferred that the mixed oxide comprising cerium additionally comprises one or more of zirconium, yttrium, neodymium, lanthanum, hafnium, samarium and praseodymium, more preferably additionally comprises one or more of zirconium, yttrium, neodymium, and lanthanum, or more preferably additionally comprises zirconium, yttrium, and lanthanum. It is more preferred according to (iii.2) that the oxygen storage compound comprises a mixed oxide of cerium, zirconium, yttrium, neodymium, and lanthanum or a mixed oxide of cerium, zirconium, yttrium, and lanthanum.

According to (iii.2) and prior to admixing the platinum group metal supported on the oxygen storage compound with one or more of an adjuvant and a source of a promotor, it is preferred that the oxygen storage compound impregnated with the source of platinum group metal is calcined in gas atmosphere, more preferably having a temperature in the range of from 250 to 600° C., more preferably in the range of from 300 to 450° C., the gas atmosphere preferably comprising oxygen.

According to (iii.2), it is preferred that the adjuvant is one or more of water, a polyacrylate, a methylcellulose, and an alcohol, more preferably one or more of water and an alcohol, more preferably water and an alcohol.

According to (iii.2), it is preferred that the source of a promotor is a source of one or more of a promotor comprising zirconium, a promotor comprising barium, a promotor comprising strontium, a promotor comprising lanthanum, a promotor comprising neodymium, a promotor comprising yttrium, a promotor comprising praseodymium, more preferably one or more of a promotor comprising zirconium and a promotor comprising barium. It is more preferred that the source of a promotor is a source of a promotor comprising zirconium and a promotor comprising barium.

According to (iii.2), it is more preferred that the source of a promotor comprises a salt, more preferably a nitrate, of the respective promotor element, more preferably zirconium nitrate and barium nitrate.

It is preferred that the coating according to (iii.4) is performed by applying the slurry with vacuum or immersing the substrate, more preferably immersing the substrate.

As to drying according to (iii.5), it is preferred that it is performed in a gas atmosphere having a temperature in the range of from 90 to 200° C., more preferably in the range of from 100 to 180° C., the gas atmosphere more preferably comprising oxygen.

As to drying according to (iii.5), it is preferred that it is performed in a gas atmosphere for a duration in the range of from 10 minutes to 1 hour, more preferably in the range of from 10 to 30 minutes, the gas atmosphere more preferably comprising oxygen. As to drying according to (iii.5), it is more preferred that it is performed in a gas atmosphere having a temperature in the range of from 100 to 180° C. for a duration in the range of from 10 to 30 minutes.

As to calcining according to (iii.6), it is preferred that it is performed in a gas atmosphere having a temperature in the range of from 300 to 600° C., more preferably in the range of from 400 to 500° C., the gas atmosphere more preferably comprising oxygen.

As to calcining according to (iii.6), it is preferred that it is performed in a gas atmosphere for a duration in the range of from 10 minutes to 6 hours, more preferably in the range of from 1 to 6 hours, more preferably in the range of from 2 to 4 hours, the gas atmosphere more preferably comprising oxygen. As to calcining according to (iii.6), it is more preferred that it is performed in a gas atmosphere having a temperature in the range of from 400 to 500° C. for a duration in the range of from 2 to 4 hours.

According to (ii.4), or (ii.4'), it is preferred that the coating of the porous internal walls of the porous wall-flow filter substrate provided in (i) is over x % of the substrate axial length, wherein x is in the range of from 95 to 100 from the inlet end to the outlet end of the inlet passages, and that according to (iii.4), the coating of the porous internal walls of the porous wall-flow filter substrate obtained in (ii) is over y % of the substrate axial length, wherein y is in the range of from 20 to x, more preferably in the range of from 80 to x, more preferably in the range of from 90 to x, from the inlet end to the outlet end of the inlet passages, or alternatively wherein y is in the range of from 20 to 70, more preferably in the range of from 40 to 60, more preferably in the range of from 45 to 55, from the inlet end to the outlet end of the inlet passages, According to (ii.4), or (ii.4'), it is preferred that the coating of the porous internal walls of the porous wall-flow filter substrate provided in (i) is over x % of the substrate axial length, wherein x is in the range of from 95 to 100 from the outlet end to the inlet end of the outlet passages, and that according to (iii.4), the coating of the porous internal walls of the porous wall-flow filter substrate obtained in (ii) is over y % of the substrate axial length, wherein y is in the range of from 20 to x, more preferably in the range of from 80 to x, more preferably in the range of from 90 to x, from the outlet end to the inlet end of the outlet passages.

According to the first aspect of the present invention, it is preferred that the process for preparing the four-way conversion catalyst consists of (i), (ii) and (iii).

According to the second aspect of the present invention, the process preferably further comprises
(iv) providing a slurry comprising particles of a source of the second three-way conversion catalytic coating, said particles having a Dv90 value in the range of from 2 to 25 micrometers, the Dv90 value being determined according to Reference Example 4; coating the porous internal walls of the porous wall-flow filter substrate obtained in (iii), with the particles of the slurry, over z % of the substrate axial length, wherein z is in the range of from 20 to x, more preferably in the range of from 20 to 70, more preferably in the range of from 40 to 60, more preferably in the range of from 45 to 55, from the outlet end to the inlet end of the outlet passages; calcining the obtained coated filter substrate, obtaining the filter substrate comprising the oxidic component, the first three-way conversion catalytic coating and the second three-way conversion catalytic coating.

It is more preferred that according to (ii.4), or (ii.4'), the coating of the porous internal walls of the porous wall-flow filter substrate provided in (i) is over x % of the substrate axial length from the inlet end to the outlet end of the inlet passages, or from the outlet end to the inlet end of the outlet passages, wherein x is in the range of from 95 to 100, obtaining a slurry treated wall-flow filter substrate.

It is more preferred that according to (iii.4), the coating of the porous internal walls of the porous wall-flow filter substrate obtained in (ii) is over y % of the substrate axial length from the inlet end to the outlet end of the inlet passages, wherein y is in the range of from 20 to 70, more preferably in the range of from 40 to 60, more preferably in the range of from 45 to 55.

As to (iv), it is preferred that it comprises
(iv.1) impregnating a source of a platinum group metal onto a refractory metal oxide;
admixing the platinum group metal supported on the refractory metal oxide support with one or more of an adjuvant and a source of a promotor, obtaining a slurry;
milling the obtained slurry obtaining a slurry, wherein the particles comprised in said slurry have a Dv90 value in the range of from 3 to 20 micrometers, more preferably in the range of from 4 to 18 micrometers, wherein the Dv90 value being determined according to Reference Example 4;
(iv.2) impregnating a source of a platinum group metal onto an oxygen storage compound;

admixing the platinum group metal supported on the oxygen storage compound with one or more of an adjuvant and a source of a promotor, obtaining a slurry;

milling the obtained slurry obtaining a slurry, wherein the particles comprised in said slurry have a Dv90 value in the range of from 3 to 20 micrometers, more preferably in the range of from 4 to 18 micrometers, wherein the Dv90 value being determined according to Reference Example 4;

(iv.3) admixing the slurry obtained in (iv.1) and the slurry obtained in (iv.2), obtaining the slurry comprising a source of the second three-way conversion catalytic coating;

(iv.4) coating the porous internal walls of the porous wall-flow filter substrate obtained in (iii), with the particles of the slurry obtained in (iv.3), over z % of the substrate axial length from the outlet end to the inlet end of the outlet passages, wherein z is in the range of from 20 to 70, more preferably in the range of from 40 to 60, more preferably in the range of from 45 to 55, obtaining a slurry treated wall-flow filter substrate;

(iv.5) optionally drying the slurry treated wall-flow filter substrate obtained in (iv.4), obtained a dried slurry treated wall-flow filter substrate;

(iv.6) calcining the slurry treated wall-flow filter substrate obtained in (iv.4), or the dried slurry treated wall-flow filter substrate obtained in (iv.5).

According to (iv.1), it is preferred that the platinum group metal is one or more of ruthenium, palladium, rhodium, platinum, and iridium, more preferably one or more of palladium, rhodium, and platinum, more preferably one or more of palladium and rhodium, more preferably rhodium. It is more preferred that the source of a platinum group metal comprises a salt of a platinum group metal, more preferably comprises a nitrate of a platinum group metal.

According to (iv.1), it is preferred that the refractory metal oxide comprises aluminum, more preferably comprises one or more of an aluminum oxide, a mixture of oxides comprising an aluminum oxide, and a mixed oxide comprising aluminum. It is more preferred that the mixed oxide comprising aluminum additionally comprises one or more of zirconium, cerium, lanthanum, barium, and neodymium. According to (iv.1), it is preferred that the refractory metal oxide support comprises, more preferably is, an aluminum oxide, more preferably a gamma aluminum oxide.

According to (iv.1) and prior to admixing the platinum group metal supported on the refractory metal oxide with one or more of an adjuvant and a source of a promotor, it is preferred that the refractory metal oxide impregnated with the source of platinum group metal is calcined in gas atmosphere, more preferably having a temperature in the range of from 250 to 600° C., more preferably in the range of from 300 to 450° C., the gas atmosphere more preferably comprising oxygen.

According to (iv.1), it is preferred that the adjuvant is one or more of water, a polyacrylate, a methylcellulose, and an alcohol, more preferably one or more of water and an alcohol, more preferably water and an alcohol.

According to (iv.1), it is preferred that the source of a promotor is a source of one or more of a promotor comprising zirconium, a promotor comprising barium, a promotor comprising strontium, a promotor comprising lanthanum, a promotor comprising neodymium, a promotor comprising yttrium, a promotor comprising praseodymium, more preferably one or more of a promotor comprising zirconium and a promotor comprising barium. It is more preferred that the source of a promotor is a source of a promotor comprising zirconium and a promotor comprising barium.

It is more preferred that according to (iv.1), the source of a promotor comprises a salt, more preferably a nitrate, of the respective promotor element, more preferably zirconium nitrate and barium nitrate.

According to (iv.2), it is preferred that the platinum group metal is one or more of ruthenium, palladium, rhodium, platinum, and iridium, more preferably one or more of palladium, rhodium, and platinum, more preferably one or more of palladium and rhodium, more preferably palladium. It is more preferred that the source of a platinum group metal preferably comprises a salt of a platinum group metal, more preferably comprises a nitrate of a platinum group metal.

According to (iv.2), it is preferred that the oxygen storage compound comprises cerium, more preferably comprises one or more of a cerium oxide, a mixture of oxides comprising a cerium oxide, and a mixed oxide comprising cerium. It is more preferred that the mixed oxide comprising cerium p additionally comprises one or more of zirconium, yttrium, neodymium, lanthanum, hafnium, samarium and praseodymium, more preferably additionally comprises one or more of zirconium, yttrium, neodymium, and lanthanum, or more preferably additionally comprises zirconium, yttrium, and lanthanum. According to (iv.2), it is preferred that the oxygen storage compound comprises a mixed oxide of cerium, zirconium, yttrium, neodymium, and lanthanum or a mixed oxide of cerium, zirconium, yttrium, and lanthanum.

According to (iv.2) and prior to admixing the platinum group metal supported on the oxygen storage compound with one or more of an adjuvant and a source of a promotor, it is preferred that the oxygen storage compound impregnated with the source of platinum group metal is calcined in gas atmosphere, more preferably having a temperature in the range of from 250 to 600° C., more preferably in the range of from 300 to 450° C., the gas atmosphere more preferably comprising oxygen.

According to (iv.2), it is preferred that the adjuvant is one or more of water, a polyacrylate, a methylcellulose, and an alcohol, more preferably one or more of water and an alcohol, more preferably water and an alcohol.

According to (iv.2), it is preferred that the source of a promotor is a source of one or more of a promotor comprising zirconium, a promotor comprising barium, a promotor comprising strontium, a promotor comprising lanthanum, a promotor comprising neodymium, a promotor comprising yttrium, a promotor comprising praseodymium, more preferably one or more of a promotor comprising zirconium and a promotor comprising barium, more preferably a promotor comprising zirconium and a promotor comprising barium.

According to (iv.2), it is preferred that the source of a promotor comprises a salt, more preferably a nitrate, of the respective promotor element, more preferably zirconium nitrate and barium nitrate.

It is preferred that the coating according to (iv.4) is performed by applying the slurry with vacuum or immersing the substrate, more preferably immersing the substrate.

As to drying according to (iv.5), it is preferred that it is performed in a gas atmosphere having a temperature in the range of from 90 to 200° C., more preferably in the range of from 100 to 180° C., the gas atmosphere more preferably comprising oxygen.

As to drying according to (iv.5), it is preferred that it is performed in a gas atmosphere for a duration in the range of from 10 minutes to 1 hour, more preferably in the range of from 10 to 30 minutes, the gas atmosphere more preferably comprising oxygen. As to drying according to (iv.5), it is more preferred that it is performed in a gas atmosphere having a temperature in the range of from 100 to 180° C. for a duration in the range of from 10 to 30 minutes.

As to calcining according to (iv.6), it is preferred that it is performed in a gas atmosphere having a temperature in the range of from 300 to 600° C., more preferably in the range of from 400 to 500° C., the gas atmosphere more preferably comprising oxygen.

As to calcining according to (iv.6), it is preferred that it is performed in a gas atmosphere for a duration in the range of from 10 minutes to 6 hours, more preferably in the range of from 1 to 6 hours, more preferably in the range of from 2 to 4 hours, the gas atmosphere more preferably comprising oxygen. As to calcining according to (iv.6), it is more preferred that it is performed in a gas atmosphere having a temperature in the range of from 400 to 500° C. for a duration in the range of from 2 to 4 hours.

According to the second aspect of the present invention, it is preferred that the process for preparing the four-way conversion catalyst consists of (i), (ii), (iii), and (iv).

According to the present invention, it is preferred that the porous wall-flow filter according to (i) comprises, more preferably consists of, a ceramic substance. It is preferred that the ceramic substance comprises, more preferably consists of, one or more of a silica, a silicate, a aluminosilicate, more preferably a cordierite or a mullite, an aluminum titanate and a silicon carbide, more preferably one or more of a silicon carbide and a cordierite, more preferably a cordierite.

The present invention further relates to a four-way conversion catalyst, preferably the four-way conversion catalyst according to the present invention and as defined in the foregoing, obtainable or obtained or preparable or prepared by a process according to the present invention.

The present invention further relates to an exhaust gas treatment system downstream of and in fluid communication with a gasoline engine, the system comprising a four-way conversion catalyst according to the present invention. It is preferred that said gasoline engine is a spark ignition engine, more preferably a gasoline direct injection engine. It is preferred that the exhaust gas stream of the gasoline engine comprises hydrocarbon (HC), carbon monoxide (CO), nitrogen oxides (NOx), and particulates.

The present invention further relates to a use of a four-way conversion catalyst according the present invention for the treatment of an exhaust gas stream from a gasoline engine. It is preferred that said gasoline engine is a spark ignition engine, more preferably a gasoline direct injection engine. It is preferred that the exhaust gas stream of the gasoline engine comprises hydrocarbon (HC), carbon monoxide (CO), nitrogen oxides (NOx), and particulates.

The present invention further relates to a method of treating an exhaust gas stream from a gasoline engine, comprising passing said exhaust gas stream through a four-way conversion catalyst according to the present invention. It is preferred that said gasoline engine is a spark ignition engine, more preferably a gasoline direct injection engine. It is preferred that the exhaust gas stream of the gasoline engine comprises hydrocarbon (HC), carbon monoxide (CO), nitrogen oxides (NOx), and particulates.

The present invention is further illustrated by the following set of embodiments and combinations of embodiments resulting from the dependencies and back-references as indicated. In particular, it is noted that in each instance where a range of embodiments is mentioned, for example in the context of a term such as "The four-way conversion catalyst of any one of embodiments 1 to 4", every embodiment in this range is meant to be explicitly disclosed for the skilled person, i.e. the wording of this term is to be understood by the skilled person as being synonymous to "The four-way conversion catalyst of any one of embodiments 1, 2, 3, and 4".

1. A four-way conversion catalyst for the treatment of an exhaust gas stream of a gasoline engine, the catalyst comprising
   a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls;
   wherein the porous internal walls comprise pores which comprise an oxidic component comprising a first refractory metal oxide, said first refractory metal oxide comprising aluminum, said oxidic component having a platinum group metal content in the range of from 0 to 0.001 weight-% based on the total weight of the oxidic component;
   wherein the catalyst further comprises a first three-way conversion catalytic coating, at least 10 weight-% thereof being comprised in the pores of the internal walls, said first three-way conversion catalytic coating comprising an oxygen storage compound and a platinum group metal supported on a second refractory metal oxide.

2. The four-way conversion catalyst of embodiment 1, wherein from 98 to 100 weight-%, preferably from 99 to 100 weight-%, more preferably from 99.5 to 100 weight-%, more preferably from 99.9 to 100 weight-% of the first refractory metal consists of aluminum and oxygen, preferably alumina.

3. The four-way conversion catalyst of embodiment 1 or 2, wherein the first refractory metal oxide has a BET specific surface area in the range of from 50 to 500 $m^2/g$, preferably in the range of from 70 to 300 $m^2/g$, wherein the BET specific surface area is determined according to Reference Example 2.

4. The four-way conversion catalyst of any one of embodiments 1 to 3, wherein from 50 to 99 weight-%, preferably from 60 to 99 weight-%, more preferably from 70 to 99 weight-%, more preferably from 80 to 99 weight-%, more preferably from 85 to 95 weight-% of the oxidic component consist of the first refractory metal oxide.

5. The four-way conversion catalyst of any one of embodiments 1 to 4, wherein the oxidic component further comprises an oxide comprising one or more of Mg, Ca, Sr and Ba, preferably an oxide comprising one or more of Mg, Ca and Ba, more preferably an oxide comprising one or more oxides of Mg and Ba, more preferably an oxide comprising barium, more preferably baria.

6. The four-way conversion catalyst of any one of embodiments 1 to 5, wherein the oxidic component further comprises an oxide comprising one or more of La, Y, Nd, Ti and Zr, preferably an oxide comprising one or more of Ti and Zr, more preferably an oxide comprising zirconium, more preferably zirconia.

7. The four-way conversion catalyst of any one of embodiments 1 to 6, wherein the oxidic material further comprises a metal oxide binder, wherein the metal oxide binder preferably comprises an oxide comprising one or more of zirconium, aluminum, and titanium, more preferably comprises an oxide comprising one or more of aluminum and zirconium, more preferably comprises an oxide comprising aluminum.

8. The four-way conversion catalyst of any one of embodiments 1 to 7, wherein from 98 to 100 weight-%, preferably from 99 to 100 weight-%, more preferably from 99.5 to 100 weight-%, more preferably from 99.9 to 100 weight-% of the oxidic component consist of the first refractory metal oxide, the oxide comprising one or more of Mg, Ca, Sr and Ba, the oxide comprising one or more of La, Y, Nd, Ti and Zr and preferably a metal oxide binder as defined in embodiment 7.

9. The four-way conversion catalyst of any one of embodiments 1 to 3, wherein from 98 to 100 weight-%, preferably from 99 to 100 weight-%, more preferably from 99.5 to 100 weight-%, more preferably from 99.9 to 100 weight-% of the oxidic component consist of the first refractory metal oxide.

10. The four-way conversion catalyst of any one of embodiments 1 to 9, wherein the catalyst comprises the oxidic component at a loading in the range of from 7 to 75 g/l, preferably in the range of from 8 to 60 g/l, more preferably in the range of from 10 to 60 g/l, more preferably in the range of from 12 to 32 g/l, more preferably in the range of from 12 to 18 g/l, or in the range of from 20 to 32 g/l.

11. The four-way conversion catalyst of any one of embodiments 1 to 10, wherein at least 90 weight-%, preferably from 90 to 100 weight-%, more preferably from 95 to 100 weight-%, more preferably from 98 to 100 weight-%, more preferably from 99 to 100 weight-%, more preferably from 99.5 to 100 weight-%, more preferably from 99.9 to 100 weight-% of the oxidic component comprised in the catalyst are in the pores of the porous internal walls.

12. The four-way conversion catalyst of any one of embodiments 1 to 11, wherein from 0 to 0.001 weight-%, preferably from 0 to 0.0001 weight-%, more preferably from 0 to 0.00001 weight-% of the oxidic component consist of cerium.

13. The four-way conversion catalyst of any one of embodiments 1 to 12, wherein from 0 to 0.001 weight-%, preferably from 0 to 0.0001 weight-%, more preferably from 0 to 0.00001 weight-% of the oxidic component consist of silicon.

14. The four-way conversion catalyst of any one of embodiments 1 to 13, wherein the first three-way conversion catalytic coating comprises one or more platinum group metals, preferably one or more of ruthenium, palladium, rhodium, platinum, and iridium, more preferably one or more of palladium, rhodium and platinum, more preferably one or more of palladium and rhodium.

15. The four-way conversion catalyst of any one of embodiments 1 to 14, wherein the oxygen storage compound comprised in the first three-way conversion catalytic coating comprises cerium, preferably comprises one or more of a cerium oxide, a mixture of oxides comprising a cerium oxide and a mixed oxide comprising cerium, wherein the mixed oxide comprising cerium preferably additionally comprises one or more of zirconium, yttrium, neodymium, lanthanum, hafnium, samarium and praseodymium, more preferably one or more of zirconium, yttrium, neodymium and lanthanum.

16. The four-way conversion catalyst of any one of embodiments 1 to 15, wherein the oxygen storage compound comprised in the first three-way conversion catalytic coating comprises
a mixed oxide comprising cerium, zirconium, yttrium, neodymium and lanthanum;
wherein preferably from 98 to 100 weight-%, more preferably from 99 to 100 weight-%, more preferably from 99.5 to 100 weight-%, more preferably from 99.9 to 100 weight-% of the oxygen storage compound consist of a mixed oxide comprising cerium, zirconium, yttrium, neodymium and lanthanum;
wherein more preferably from 20 to 60 weight-%, more preferably from 35 to 45 weight-% of the oxygen storage compound consist of cerium, calculated as $CeO_2$, and more preferably from 30 to 60 weight-%, more preferably from 40 to 50 weight-% of the oxygen storage compound consist of zirconium, calculated as $ZrO_2$.

17. The four-way conversion catalyst of any one of embodiments 1 to 15, wherein the oxygen storage compound comprised in the first three-way conversion catalytic coating comprises
a mixed oxide comprising cerium, zirconium, yttrium and lanthanum;
wherein preferably from 98 to 100 weight-%, more preferably from 99 to 100 weight-%, more preferably from 99.5 to 100 weight-%, more preferably from 99.9 to 100 weight-% of the oxygen storage compound consist of a mixed oxide comprising cerium, zirconium, yttrium and lanthanum;
wherein more preferably from 20 to 60 weight-%, more preferably from 35 to 45 weight-%, of the oxygen storage compound consist of cerium, calculated as $CeO_2$, and more preferably from 35 to 60 weight-%, more preferably from 45 to 55 weight-%, of the oxygen storage compound consist of zirconium, calculated as $ZrO_2$.

18. The four-way conversion catalyst of any one of embodiments 1 to 17, wherein the oxygen storage compound comprised in the first three-way conversion catalytic coating has a porosity in the range of from 0.05 to 1.5 ml/g, preferably in the range of from 0.1 to 1.0 ml/g, more preferably in the range of from 0.15 to 0.8 ml/g, wherein the porosity is determined according to Reference Example 1.

19. The four-way conversion catalyst of any one of embodiments 1 to 18, wherein the first three-way conversion catalytic coating comprises a platinum group metal, preferably palladium, supported on the oxygen storage component.

20. The four-way conversion catalyst of any one of embodiments 1 to 19, wherein the second refractory metal oxide comprised in the first three-way conversion catalytic coating comprises aluminum, preferably comprises one or more of aluminum oxide, a mixture of oxides comprising aluminum, a mixed oxide comprising aluminum, wherein the mixed oxide comprising aluminum preferably additionally comprises one or more of zirconium, cerium, lanthanum, barium, and neodymium, wherein more preferably the second refractory metal oxide comprises, more preferably is, an aluminum oxide, more preferably a gamma aluminum oxide.

21. The four-way conversion catalyst of any one of embodiments 1 to 20, wherein the second refractory metal oxide has a porosity in the range of from 0.05 to 1.5 ml/g, preferably in the range of from 0.1 to 1.0 ml/g, more preferably in the range of from 0.15 to 0.8 ml/g, wherein the porosity is determined according to Reference Example 1.

22. The four-way conversion catalyst of any one of embodiments 1 to 21, wherein the first three-way conversion catalytic coating further comprises a promotor, wherein the promotor preferably comprises one or more of zirconium, barium, strontium, lanthanum, neodymium, yttrium, and praseodymium, wherein more preferably the promotor comprises one or more of zirconium and barium, wherein more preferably the promotor comprises, more preferably is, one or more of a mixture of barium oxide and zirconium oxide and a mixed oxide of barium and zirconium.

23. The four-way conversion catalyst of any one of embodiments 1 to 22, wherein the first three-way conversion catalytic coating comprises, preferably consists of, the platinum group metal, preferably rhodium, supported on the second refractory metal oxide; a platinum group metal, preferably palladium, supported on the oxygen storage component, and a promotor as defined in embodiment 22.

24. The four-way conversion catalyst of any one of embodiments 1 to 23, wherein from 98 to 100 weight-%, preferably from 99 to 100 weight-%, more preferably 99.5 to 100 weight-%, more preferably from 99.9 to 100 weight-% of the first three-way conversion catalytic coating consist of the platinum group metal, preferably rhodium, supported on the second refractory metal oxide; a platinum group metal, preferably palladium, supported on the oxygen storage component, and a promotor as defined in embodiment 22.

25. The four-way conversion catalyst of any one of embodiments 1 to 24, wherein in the catalyst, the first three-way conversion catalytic coating comprises the second refractory metal oxide at a loading (l1) and the oxygen storage compound at a loading (l2), wherein the ratio of the loading (l1) to the loading (l2) is in the range of from 3:1 to 1:6, preferably in the range of from 2:1 to 1:5, more preferably in the range of from 1.5:1 to 1:4, more preferably in the range of from 1:1 to 1:3.

26. The four-way conversion catalyst of any one of embodiments 1 to 25, wherein in the catalyst, the first three-way conversion catalytic coating comprises the platinum group metal supported on the second refractory metal oxide at a loading in the range of from 0.035 to 7.063 g/l (1 to 200 g/ft$^3$), preferably in the range of from 0.106 to 6.357 g/l (3 to 180 g/ft$^3$), more preferably in the range of from 0.141 to 5.297 g/l (4 to 150 g/ft$^3$), and the second refractory metal oxide at a loading in the range of from 6.10 to 183.07 g/l (0.1 to 3 g/in$^3$), preferably in the range of from 9.15 to 152.56 g/l (0.15 to 2.5 g/in$^3$), more preferably in the range of from 12.20 to 122.05 g/l (0.2 to 2 g/in$^3$).

27. The four-way conversion catalyst of any one of embodiments 1 to 26, wherein in the catalyst, the first three-way conversion catalytic coating comprises a platinum group metal supported on the oxygen storage compound at a loading in the range of from 0.035 to 7.063 g/l (1 to 200 g/ft$^3$), preferably in the range of from 0.106 to 6.357 g/l (3 to 180 g/ft$^3$), more preferably in the range of from 0.141 to 5.297 g/l (4 to 150 g/ft$^3$), and the oxygen storage compound at a loading in the range of from 6.10 to 183.07 g/l (0.1 to 3 g/in$^3$), preferably in the range of from 9.15 to 152.56 g/l (0.15 to 2.5 g/in$^3$), more preferably in the range of from 12.20 to 122.05 g/l (0.2 to 2 g/in$^3$).

28. The four-way conversion catalyst of any one of embodiments 1 to 27, wherein in the catalyst, the first three-way conversion catalytic coating comprises a promotor at a loading in the range of from 0.061 to 61.024 g/l (0.001 to 1.0 g/in$^3$), preferably in the range of from 0.305 to 30.512 g/l (0.005 to 0.5 g/in$^3$), more preferably in the range of from 0.305 to 12.205 g/l (0.005 to 0.2 g/in$^3$).

29. The four-way conversion catalyst of any one of embodiments 1 to 28, wherein from 10 to 100 weight-% of the first three-way conversion catalytic coating are comprised in the pores of the internal walls.

30. The four-way conversion catalyst of any one of embodiments 1 to 29, wherein from 30 to 100 weight-%, preferably from 50 to 100 weight-%, more preferably from 70 to 100 weight-%, of the first three-way conversion catalytic coating are comprised in the pores of the internal walls.

31. The four-way conversion catalyst of any one of embodiments 1 to 30, wherein the catalyst comprises the first three-way conversion catalytic coating at a loading in the range of from 30 to 250 g/l, preferably in the range of from 40 to 200 g/l, more preferably in the range of from 50 to 170 g/l.

32. The four-way conversion catalyst of any one of embodiments 1 to 31, wherein the pores comprising the oxidic component extends over x % of the substrate axial length from the inlet end toward the outlet end of the inlet passages, with x being in the range of from 95 to 100; or
wherein the pores comprising the oxidic component extends over x % of the substrate axial length from the outlet end toward the inlet end of the outlet passages, with x being in the range of from 95 to 100.

33. The four-way conversion catalyst of embodiment 32, wherein the first three-way conversion catalytic coating extends over y % of the substrate axial length from the inlet end toward the outlet end of the inlet passages, with y being in the range of from 20 to x.

34. The four-way conversion catalyst of embodiment 32 or 33, wherein the first three-way conversion catalytic coating extends over y % of the substrate axial length from the inlet end toward the outlet end of the inlet passages, with y being in the range of from 80 to x, preferably in the range of from 90 to x, more preferably with y being x;
wherein the pores comprising the oxidic component more preferably extends over x % of the substrate axial length from the inlet end toward the outlet end of the inlet passages, with x being in the range of from 95 to 100 and the first three-way conversion catalytic coating extends over y % of the substrate axial length from the inlet end toward the outlet end of the inlet passages, with y being in the range of from 80 to x, more preferably in the range of from 90 to x, more preferably with y being x.

35. The four-way conversion catalyst of any one of embodiments 32 to 34, wherein the first three-way conversion catalytic coating extends over y % of the substrate axial length from the inlet end toward the outlet end of the inlet passages, with y being in the range of from 20 to 70, preferably in the range of from 40 to 60, more preferably in the range of from 45 to 55.
36. The four-way conversion catalyst of embodiment 32, wherein the first three-way conversion catalytic coating extends over y % of the substrate axial length from the outlet end toward the inlet end of the outlet passages, with y being in the range of from 20 to x.
37. The four-way conversion catalyst of embodiment 32 or 36, wherein the first three-way conversion catalytic coating extends over y % of the substrate axial length from the outlet end toward the inlet end of the outlet passages, with y being in the range of from 80 to x, preferably in the range of from 90 to x, more preferably with y being x;
and more preferably wherein the pores comprising the oxidic component extends over x % of the substrate axial length from the outlet end toward the inlet end of the outlet passages, with x being in the range of from 95 to 100.
38. The four-way conversion catalyst of any one of embodiments 1 to 37, wherein from 95 to 100 weight-%, preferably from 98 to 100 weight-%, more preferably from 99 to 100 weight-%, more preferably from 99.5 to 100 weight-%, more preferably from 99.9 to 100 weight-% of the four-way conversion catalyst consist of the porous wall-flow filter substrate, the oxidic component and the first three-way conversion catalytic coating.
39. The four-way conversion catalyst of any one of embodiments 32 to 35, wherein the catalyst further comprises a second three-way conversion catalytic coating, at least 10 weight-% thereof being comprised in the pores of the internal walls, the second three-way conversion catalytic coating comprising an oxygen storage compound and a platinum group metal supported on a refractory metal oxide,
wherein the second three-way conversion catalytic coating extends over z % of the substrate axial length from the outlet end toward the inlet end of the outlet passages, with z being in the range of from 20 to x, preferably in the range of from 20 to 70, more preferably in the range of from 40 to 60, more preferably in the range of from 45 to 55.
40. The four-way conversion catalyst of embodiment 39, wherein the first three-way conversion coating extends over y % of the substrate axial length from the inlet end toward the outlet end of the inlet passages, with y being in the range of from 20 to 70, preferably in the range of from 40 to 60, more preferably in the range of from 45 to 55, and the second three-way conversion catalytic coating extends over z % of the substrate axial length from the outlet end toward the inlet end, with z being in the range of from 20 to 70, preferably in the range of from 40 to 60, more preferably in the range of from 45 to 55.
41. The four-way conversion catalyst of embodiment 39 or 40, wherein the second three-way conversion catalytic coating comprises one or more platinum group metals, preferably one or more of ruthenium, palladium, rhodium, platinum, and iridium, more preferably one or more of palladium, rhodium and platinum, more preferably one or more of palladium and rhodium.
42. The four-way conversion catalyst of any one of embodiments 39 to 41, wherein the oxygen storage compound comprised in the second three-way conversion catalytic coating comprises cerium, more preferably comprises one or more of a cerium oxide, a mixture of oxides comprising a cerium oxide and a mixed oxide comprising cerium, wherein the mixed oxide comprising cerium preferably additionally comprises one or more of zirconium, yttrium, neodymium, lanthanum, hafnium, samarium and praseodymium, more preferably one or more of zirconium, yttrium, neodymium and lanthanum.
43. The four-way conversion catalyst of any one of embodiments 39 to 42, wherein the oxygen storage compound comprised in the second three-way conversion catalytic coating has a porosity in the range of from 0.05 to 1.5 ml/g, preferably in the range of from 0.1 to 1.0 ml/g, more preferably in the range of from 0.15 to 0.8 ml/g, wherein the porosity is determined according to Reference Example 1.
44. The four-way conversion catalyst of any one of embodiments 39 to 43, wherein the oxygen storage compound comprised in the second three-way conversion catalytic coating comprises a mixed oxide comprising cerium, zirconium, yttrium, neodymium and lanthanum;
wherein preferably from 98 to 100 weight-%, more preferably from 99 to 100 weight-%, more preferably from 99.5 to 100 weight-%, more preferably from 99.9 to 100 weight-% of the oxygen storage compound consist of a mixed oxide comprising cerium, zirconium, yttrium, neodymium and lanthanum;
wherein more preferably from 20 to 60 weight-%, more preferably from 35 to 45 weight-% of the oxygen storage compound consist of cerium, calculated as $CeO_2$, and more preferably from 30 to 60 weight-%, more preferably from 40 to 50 weight-% of the oxygen storage compound consist of zirconium, calculated as $ZrO_2$.
45. The four-way conversion catalyst of any one of embodiments 39 to 43, wherein the oxygen storage compound comprised in the second three-way conversion catalytic coating comprises a mixed oxide comprising cerium, zirconium, yttrium and lanthanum;
wherein preferably from 98 to 100 weight-%, more preferably from 99 to 100 weight-%, more preferably from 99.5 to 100 weight-%, more preferably from 99.9 to 100 weight-% of the oxygen storage compound consist of a mixed oxide comprising cerium, zirconium, yttrium and lanthanum;
wherein more preferably from 20 to 60 weight-%, more preferably from 35 to 45 weight-% of the oxygen storage compound consist of cerium, calculated as $CeO_2$, and more preferably from 35 to 60 weight-%, more preferably from 45 to 55 weight-% of the oxygen storage compound consist of zirconium, calculated as $ZrO_2$.
46. The four-way conversion catalyst of any one of embodiments 39 to 45, wherein the second three-way conversion catalytic coating comprises a platinum group metal, preferably palladium, supported on the oxygen storage component.
47. The four-way conversion catalyst of any one of embodiments 39 to 46, wherein the refractory metal oxide comprised in the second three-way conversion catalytic coating comprises aluminum, preferably comprises one or more of aluminum oxide, a mixture of oxides comprising aluminum, a mixed oxide comprising aluminum, wherein the mixed oxide comprising aluminum preferably additionally comprises one or more of zirconium, cerium, lanthanum, barium, and neodymium,
   wherein more preferably the refractory metal oxide comprised in the second three-way conversion catalytic coating comprises, more preferably is, an aluminum oxide, more preferably a gamma aluminum oxide.
48. The four-way conversion catalyst of any one of embodiments 39 to 47, wherein the refractory metal oxide comprised in the second three-way conversion catalytic coating has a porosity in the range of from 0.05 to 1.5 ml/g, preferably in the range of from 0.1 to 1.0 ml/g, more preferably in the range of from 0.15 to 0.8 ml/g, wherein the porosity is determined according to Reference Example 1.
49. The four-way conversion catalyst of any one of embodiments 39 to 48, wherein the second three-way conversion catalytic coating further comprises a promotor, wherein the promotor preferably comprises one or more of zirconium, barium, strontium, lanthanum, neodymium, yttrium, and praseodymium, wherein more preferably the promotor comprises one or more of zirconium and barium, wherein more preferably the promotor comprises, more preferably is, one or more of a mixture of barium oxide and zirconium oxide and a mixed oxide of barium and zirconium.
50. The four-way conversion catalyst of any one of embodiments 39 to 49, wherein the second three-way conversion catalytic coating comprises, preferably consists of, the platinum group metal, preferably rhodium, supported on the refractory metal oxide; a platinum group metal, preferably palladium, supported on the oxygen storage component, and a promotor as defined in embodiment 49.
51. The four-way conversion catalyst of any one of embodiments 39 to 50, wherein from 98 to 100 weight-%, preferably from 99 to 100 weight-%, more preferably 99.5 to 100 weight-%, more preferably from 99.9 to 100 weight-% of the second three-way conversion catalytic coating consist of the platinum group metal, preferably rhodium, supported on the refractory metal oxide; a platinum group metal, preferably palladium, supported on the oxygen storage component, and a promotor as defined in embodiment 49.
52. The four-way conversion catalyst of any one of embodiments 39 to 51, wherein in the catalyst, the second three-way conversion catalytic coating comprises the refractory metal oxide at a loading (I1') and the oxygen storage compound at a loading (I2'), wherein the ratio of the loading (I1') to the loading (I2') is in the range of from 3:1 to 1:6, preferably in the range of from 2:1 to 1:5, more preferably in the range of from 1.5:1 to 1:4, more preferably in the range of from 1:1 to 1:3.
53. The four-way conversion catalyst of any one of embodiments 39 to 52, wherein in the catalyst, the second three-way conversion catalytic coating comprises the platinum group metal supported on the refractory metal oxide at a loading in the range of from 0.035 to 7.063 g/l (1 to 200 g/ft$^3$), preferably in the range of from 0.106 to 6.357 g/l (3 to 180 g/ft$^3$), more preferably in the range of from 0.141 to 5.297 g/l (4 to 150 g/ft$^3$), and the refractory metal oxide at a loading in the range of from 6.10 to 183.07 g/l (0.1 to 3 g/in$^3$), preferably in the range of from 9.15 to 152.56 g/l (0.15 to 2.5 g/in$^3$), more preferably in the range of from 12.20 to 122.05 g/l (0.2 to 2 g/in$^3$).
54. The four-way conversion catalyst of any one of embodiments 39 to 53, wherein in the catalyst, the second three-way conversion catalytic coating comprises a platinum group metal supported on the oxygen storage compound at a loading in the range of from 0.035 to 7.063 g/l (1 to 200 g/ft$^3$), preferably in the range of from 0.106 to 6.357 g/l (3 to 180 g/ft$^3$), more preferably in the range of from 0.141 to 5.297 g/l (4 to 150 g/ft$^3$), and the oxygen storage compound at a loading in the range of from 6.10 to 183.07 g/l (0.1 to 3 g/in$^3$), preferably in the range of from 9.15 to 152.56 g/l (0.15 to 2.5 g/in$^3$), more preferably in the range of from 12.20 to 122.05 g/l (0.2 to 2 g/in$^3$).
55. The four-way conversion catalyst of any one of embodiments 39 to 54, wherein in the catalyst, the second three-way conversion catalytic coating comprises a promotor at a loading in the range of from 0.061 to 61.024 g/l (0.001 to 1.0 g/in$^3$), preferably in the range of from 0.305 to 30.512 g/l (0.005 to 0.5 g/in$^3$), more preferably in the range of from 0.305 to 12.20 g/l (0.005 to 0.2 g/in$^3$).
56. The four-way conversion catalyst of any one of embodiments 39 to 55, wherein from 10 to 100 weight-% of the second three-way conversion catalytic coating are comprised in the pores of the internal walls.
57. The four-way conversion catalyst of any one of embodiments 39 to 56, wherein from 30 to 100 weight-%, preferably from 50 to 100 weight-%, more preferably from 70 to 100 weight-%, of the second three-way conversion catalytic coating are comprised in the pores of the internal walls.
58. The four-way conversion catalyst of any one of embodiments 39 to 57, wherein the catalyst comprises the second three-way conversion catalytic coating at a loading in the range of from 30 to 250 g/l, preferably in the range of from 40 to 200 g/l, more preferably in the range of from 50 to 170 g/l.
59. The four-way conversion catalyst of any one of embodiments 39 to 58, wherein the catalyst comprises the first three-way conversion catalytic coating at a loading (L1) and the second three-way conversion catalytic coating at a loading (L2), wherein the ratio of (L1):(L2) is in the range of from 1:3 to 3:1, preferably in the range of from 1:2 to 2:1, more preferably in the range of from 1:1.1 to 1.1:1.
60. The four-way conversion catalyst of any one of embodiments 39 to 59, wherein from 95 to 100 weight-%, preferably from 98 to 100 weight-%, more preferably from 99 to 100 weight-%, more preferably from 99.5 to 100 weight-%, more preferably from 99.9 to 100 weight-% of the four-way conversion catalyst consist of the porous wall-flow filter substrate, the oxidic component, the first three-way conversion catalytic coating and the second three-way conversion catalytic coating.
61. The four-way conversion catalyst of any one of embodiments 39 to 60, wherein the first three-way conversion catalytic coating and the second three-way conversion catalytic coating have the same chemical composition.
62. The four-way conversion catalyst of any one of embodiments 1 to 61, wherein the porous wall-flow filter substrate comprises, preferably consists of, a ceramic substance, wherein the ceramic substance comprises, preferably consists of, one or more of a silica, a silicate, a aluminosilicate, preferably a cordierite or a mullite, an aluminum titanate and a silicon carbide, more preferably one or more of a silicon carbide and a cordierite, more preferably a cordierite.

63. The four-way conversion catalyst of any one of embodiments 1 to 62, wherein the porous internal walls comprising the oxidic component, at least 10 weight-% of the first three-way conversion catalytic coating, and optionally at least 10 weight-% of a second three-way conversion catalytic coating as defined in any one of embodiments 39 to 59, have a relative average porosity in the range of from 20 to 75%, preferably in the range of from 50 to 75%, more preferably in the range of from 55 to 70%, more preferably in the range of from 60 to 65%,
   wherein the relative average porosity is defined as the average porosity of the porous internal walls comprising the oxidic component, at least 10 weight-% of the first three-way conversion catalytic coating, and optionally at least 10 weight-% of a second three-way conversion catalytic coating as defined in any one of embodiments 39 to 59, to the average porosity of the porous internal walls not comprising the oxidic component and said three-way catalytic coatings, wherein the average porosity is determined according to Reference Example 3.

64. A process for preparing the four-way conversion catalyst according to any one of embodiments 1 to 63, comprising
   (i) providing a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages having an open inlet end and a closed outlet end, and outlet passages having a closed inlet end and an open outlet end, wherein the interface between the passages and the porous internal walls is defined by the surface of the internal walls, wherein the internal walls have an average pore size in the range of from 10 to 30 micrometers, the average pore size being determined according to Reference Example 3, and wherein the average porosity of the internal walls is in the range of from 25 to 75%, the average porosity being determined according to Reference Example 3;
   (ii) providing a slurry comprising particles of a source of the oxidic component, said particles having a Dv90 value in the range of from 0.005 to 20 micrometers, the Dv90 value being determined according to Reference Example 4; coating the porous internal walls of the porous wall-flow filter substrate provided in (i) with the particles of the slurry; calcining the obtained coated filter substrate, obtaining the filter substrate comprising the oxidic component;
   (iii) providing a slurry comprising particles of a source of the first three-way conversion catalytic coating, said particles having a Dv90 value in the range of from 2 to 25 micrometers, the Dv90 value being determined according to Reference Example 4; coating the porous internal walls of the porous wall-flow filter substrate obtained in (ii) with the particles of the slurry; calcining the obtained coated filter substrate, obtaining the filter substrate comprising the oxidic component and the first three-way conversion catalytic coating.

65. The process of embodiment 64, wherein the internal walls according to (i) have an average pore size in the range of from 10 to 25 micrometers, preferably in the range of from 16 to 21 micrometers, wherein the average pore size is determined according to Reference Example 3.

66. The process of embodiment 64 or 65, wherein the average porosity of the internal walls according to (i) is in the range of from 50 to 75%, preferably in the range of from 55 to 70%, more preferably in the range of from 60 to 70%, wherein the average porosity is determined according to Reference Example 3.

67. The process of any one of embodiments 64 to 66, wherein the particles according to (ii) have a Dv90 value in the range of from 0.005 to 19 micrometers, preferably in the range of from 0.005 to 1 micrometer, or preferably in the range of from 2 to 6 micrometers, or preferably in the range of from 17 to 19 micrometers, wherein the Dv90 value is determined according to Reference Example 4.

68. The process of embodiment 67, wherein the particles according to (ii) have a Dv90 value in the range of from 0.005 to 0.5 micrometer, or in the range of from 2.5 to 5 micrometers, wherein the Dv90 value is determined according to Reference Example 4.

69. The process of any one of embodiments 64 to 68, wherein the slurry provided in (ii) has a solid content in the range of from 10 to 50 weight-%, preferably in the range of from 14 to 45 weight-%.

70. The process of any one of embodiments 64 to 69, wherein the particles according to (iii) have a Dv90 value in the range of from 3 to 20 micrometers, preferably in the range of from 4 to 18 micrometers, wherein the Dv90 value is determined according to Reference Example 4.

71. The process of any one of embodiments 64 to 70, wherein the slurry provided in (iii) has a viscosity in the range of from 5 to 35 mPa·s, preferably in the range of from 10 to 30 mPa·s, more preferably in the range of from 12 to 28 mPa·s, at a shear rate of 300 s$^{-1}$ as described in Reference Example 5.

72. The process of any one of embodiments 64 to 71, wherein (ii) comprises
   (ii.1) providing particles of a source of a first refractory metal oxide comprising aluminum, water, preferably with one or more of a source of an oxide, comprising one or more of Mg, Ca, Sr and Ba, and a source of an oxide, comprising one or more of La, Y, Nd, Ti and Zr, and more preferably further providing one or more of an alcohol, an acid and a metal oxide binder, forming a slurry;
   (ii.2) adjusting the pH of the aqueous phase of the slurry obtained in (ii.1) to a value in the range of from 2 to 5, preferably in the range of from 3 to 4;
   (ii.3) milling the slurry obtained in (ii.2) obtaining particles having a Dv90 value in the range of from 2 to 6 micrometers, or in the range of from 17 to 19 micrometers, the Dv90 value being determined according to Reference Example 4, obtaining the slurry comprising particles of a source of the oxidic component;
   (ii.4) coating the porous internal walls of the porous wall-flow filter substrate provided in (i), with the particles of the slurry obtained in (ii.3), over x % of the substrate axial length from the inlet end to the outlet end of the inlet passages, or from the outlet end to the inlet end of the outlet passages, wherein x is in the range of from 95 to 100, obtaining a slurry treated wall-flow filter substrate;
(ii.5) optionally drying the slurry-treated wall-flow filter substrate obtained in (ii.4), obtaining a dried slurry-treated wall-flow filter substrate;
(ii.6) calcining the slurry-treated wall-flow filter substrate obtained in (ii.4), or the dried slurry-treated wall-flow filter substrate obtained in (ii.5).

73. The process of embodiment 72, wherein according to (ii.1), the first refractory metal oxide comprises, preferably consists of, alumina, preferably gamma alumina.

74. The process of embodiment 72 or 73, wherein according to (ii.1), the source of an oxide comprising one or more of Mg, Ca, Sr and Ba comprises a salt of one or more of Mg, Ca, Sr and Ba, preferably a salt of one or more of Mg, Ca and Ba, more preferably a salt of one or more of Mg and Ba, wherein the source of an oxide comprising one or more of Mg, Ca, Sr and Ba, more preferably comprises, more preferably is, a salt of Ba, more preferably barium nitrate.

75. The process of any one of embodiments 72 to 74, wherein according to (ii.1), the source of an oxide comprising one or more of La, Y, Nd, Ti and Zr comprises a salt of one or more of La, Y, Nd, Ti and Zr, preferably a salt of Ti and Zr, wherein the source of an oxide comprising one or more of La, Y, Nd, Ti and Zr more preferably comprises, more preferably is, a salt of Zr, more preferably zirconium nitrate.

76. The process of any one of embodiments 64 to 71, wherein (ii) comprises
(ii.1') providing particles of a source of a first refractory metal oxide comprising aluminum, preferably boehmite, water, and preferably one or more of an alcohol and an acid, forming a slurry, said particles having more preferably a Dv90 value in the range of from 0.005 to 5 micrometers, more preferably in the range of from 0.005 to 0.5 micrometer, the Dv90 value being determined according to Reference Example 4;
(ii.2') adjusting the pH of the aqueous phase of the slurry obtained in (ii.1') to a value in the range of from 2 to 5, preferably in the range of from 3 to 4;
(ii.3') milling the slurry obtained in (ii.2') to homogenize the slurry, obtaining the slurry comprising particles of a source of the oxidic component;
(ii.4') coating the porous internal walls of the porous wall-flow filter substrate provided in (i), with the particles of the slurry obtained in (ii.3'), over x % of the substrate axial length from the inlet end to the outlet end of the inlet passages, or from the outlet end to the inlet end of the outlet passages, wherein x is in the range of from 95 to 100, obtaining a slurry-treated wall-flow filter substrate;
(ii.5') optionally drying the slurry-treated wall-flow filter substrate obtained in (ii.4'), obtaining a dried slurry-treated wall-flow filter substrate;
(ii.6') calcining the slurry-treated wall-flow filter substrate obtained in (ii.4'), or the dried slurry-treated wall-flow filter substrate obtained in (ii.5').

77. The process of any one of embodiments 72 to 76, wherein the coating according to (ii.4), or (ii.4'), is performed by applying the slurry with vacuum or immersing the substrate, preferably immersing the substrate.

78. The process of any one of embodiments 72 to 77, wherein drying according to (ii.5), or (ii.5'), is performed in a gas atmosphere having a temperature in the range of from 90 to 200° C., preferably in the range of from 100 to 180° C., the gas atmosphere preferably comprising oxygen.

79. The process of any one of embodiments 72 to 78, wherein drying according to (ii.5), or (ii.5'), is performed in a gas atmosphere for a duration in the range of from 10 minutes to 1 hour, preferably in the range of from 10 to 30 minutes, the gas atmosphere preferably comprising oxygen.

80. The process of any one of embodiments 72 to 79, wherein calcining according to (ii.6), or (ii.6'), is performed in a gas atmosphere having a temperature in the range of from 300 to 600° C., preferably in the range of from 400 to 500° C., the gas atmosphere preferably comprising oxygen.

81. The process of any one of embodiments 72 to 80, wherein calcining according to (ii.6), or (ii.6'), is performed in a gas atmosphere for a duration in the range of from 10 minutes to 6 hours, preferably from 1 to 6 hours, more preferably in the range of from 2 to 4 hours, the gas atmosphere preferably comprising oxygen.

82. The process of any one of embodiments 72 to 81, wherein (iii) comprises
(iii.1) impregnating a source of a platinum group metal onto a refractory metal oxide;
admixing the platinum group metal supported on the refractory metal oxide with one or more of an adjuvant and a source of a promotor, obtaining a slurry;
milling the obtained slurry obtaining a slurry, wherein the particles comprised in said slurry have a Dv90 value in the range of from 3 to 20 micrometers, preferably in the range of from 4 to 18 micrometers, wherein the Dv90 value being determined according to Reference Example 4;
(iii.2) impregnating a source of a platinum group metal onto an oxygen storage compound;
admixing the platinum group metal supported on the oxygen storage compound with one or more of an adjuvant and a source of a promotor, obtaining a slurry;
milling the obtained slurry obtaining a slurry, wherein the particles comprised in said slurry have a Dv90 value in the range of from 3 to 20 micrometers, preferably in the range of from 4 to 18 micrometers, wherein the Dv90 value being determined according to Reference Example 4;
(iii.3) admixing the slurry obtained in (iii.1) and the slurry obtained in (iii.2), obtaining the slurry comprising particles of a source of the first three-way conversion catalytic coating;
(iii.4) coating the porous internal walls of the porous wall-flow filter substrate obtained in (ii), with the particles of the slurry obtained in (iii.3), over y % of the substrate axial length from the inlet end to the outlet end of the inlet passages, or from the outlet end to the inlet end of the outlet passages, wherein y is in the range of from 20 to x, obtaining a slurry treated wall-flow filter substrate;
(iii.5) optionally drying the slurry treated wall-flow filter substrate obtained in (iii.4), obtained a dried slurry treated wall-flow filter substrate;
(iii.6) calcining the slurry treated wall-flow filter substrate obtained in (iii.4), or the dried slurry treated wall-flow filter substrate obtained in (iii.5).

83. The process of embodiment 82, wherein according to (iii.1), the platinum group metal is one or more of ruthenium, palladium, rhodium, platinum, and iridium, preferably one or more of palladium, rhodium, and platinum, more preferably one or more of palladium and rhodium, more preferably rhodium,
wherein the source of a platinum group metal preferably comprises a salt of a platinum group metal, more preferably comprises a nitrate of a platinum group metal.

84. The process of embodiment 82 or 83, wherein according to (iii.1), the refractory metal oxide comprises aluminum, preferably comprises one or more of an aluminum oxide, a mixture of oxides comprising an aluminum oxide, and a mixed oxide comprising aluminum, wherein the mixed oxide comprising aluminum preferably additionally comprises one or more of zirconium, cerium, lanthanum, barium, and neodymium, wherein more preferably, the refractory metal oxide support comprises, more preferably is, an aluminum oxide, more preferably a gamma aluminum oxide.

85. The process of any one of embodiments 82 to 84, wherein according to (iii.1) and prior to admixing the platinum group metal supported on the refractory metal oxide with one or more of an adjuvant and a source of a promotor, the refractory metal oxide impregnated with the source of platinum group metal is calcined in gas atmosphere, preferably having a temperature in the range of from 250 to 600° C., more preferably in the range of from 300 to 450° C., the gas atmosphere preferably comprising oxygen.

86. The process of any one of embodiments 82 to 85, wherein according to (iii.1), the adjuvant is one or more of water, a polyacrylate, a methylcellulose, and an alcohol, preferably one or more of water and an alcohol, more preferably water and an alcohol.

87. The process of any one of embodiments 82 to 86, wherein according to (iii.1), the source of a promotor is a source of one or more of a promotor comprising zirconium, a promotor comprising barium, a promotor comprising strontium, a promotor comprising lanthanum, a promotor comprising neodymium, a promotor comprising yttrium, a promotor comprising praseodymium, preferably one or more of a promotor comprising zirconium and a promotor comprising barium, more preferably a promotor comprising zirconium and a promotor comprising barium.

88. The process of embodiment 87, wherein according to (iii.1), the source of a promotor comprises a salt, preferably a nitrate, of the respective promotor element, more preferably zirconium nitrate and barium nitrate.

89. The process of any one of embodiments 82 to 88, wherein according to (iii.2), the platinum group metal is one or more of ruthenium, palladium, rhodium, platinum, and iridium, preferably one or more of palladium, rhodium, and platinum, more preferably one or more of palladium and rhodium, more preferably palladium,
wherein the source of a platinum group metal preferably comprises a salt of a platinum group metal, more preferably comprises a nitrate of a platinum group metal.

90. The process of any one of embodiments 82 to 89, wherein according to (iii.2), the oxygen storage compound comprises cerium, preferably comprises one or more of a cerium oxide, a mixture of oxides comprising a cerium oxide, and a mixed oxide comprising cerium, wherein the mixed oxide comprising cerium preferably additionally comprises one or more of zirconium, yttrium, neodymium, lanthanum, hafnium, samarium and praseodymium, more preferably additionally comprises one or more of zirconium, yttrium, neodymium, and lanthanum, or more preferably additionally comprises zirconium, yttrium, and lanthanum;
wherein the oxygen storage compound more preferably comprises a mixed oxide of cerium, zirconium, yttrium, neodymium, and lanthanum or a mixed oxide of cerium, zirconium, yttrium, and lanthanum.

91. The process of any one of embodiments 82 to 90, wherein according to (iii.2) and prior to admixing the platinum group metal supported on the oxygen storage compound with one or more of an adjuvant and a source of a promotor, the oxygen storage compound impregnated with the source of platinum group metal is calcined in gas atmosphere, preferably having a temperature in the range of from 250 to 600° C., more preferably in the range of from 300 to 450° C., the gas atmosphere preferably comprising oxygen.

92. The process of any one of embodiments 82 to 91, wherein to according to (iii.2), the adjuvant is one or more of water, a polyacrylate, a methylcellulose, and an alcohol, preferably one or more of water and an alcohol, more preferably water and an alcohol.

93. The process of any one of embodiments 82 to 92, wherein according to (iii.2), the source of a promotor is a source of one or more of a promotor comprising zirconium, a promotor comprising barium, a promotor comprising strontium, a promotor comprising lanthanum, a promotor comprising neodymium, a promotor comprising yttrium, a promotor comprising praseodymium, preferably one or more of a promotor comprising zirconium and a promotor comprising barium, more preferably a promotor comprising zirconium and a promotor comprising barium.

94. The process of embodiment 93, wherein according to (iii.2), the source of a promotor comprises a salt, preferably a nitrate, of the respective promotor element, more preferably zirconium nitrate and barium nitrate.

95. The process of any one of embodiments 82 to 94, wherein the coating according to (iii.4) is performed by applying the slurry with vacuum or immersing the substrate, preferably immersing the substrate.

96. The process of any one of embodiments 82 to 95, wherein drying according to (iii.5) is performed in a gas atmosphere having a temperature in the range of from 90 to 200° C., preferably in the range of from 100 to 180° C., the gas atmosphere preferably comprising oxygen.

97. The process of any one of embodiments 82 to 96, wherein drying according to (iii.5) is performed in a gas atmosphere for a duration in the range of from 10 minutes to 1 hour, preferably in the range of from 10 to 30 minutes, the gas atmosphere preferably comprising oxygen.

98. The process of any one of embodiments 82 to 97, wherein calcining according to (iii.6) is performed in a gas atmosphere having a temperature in the range of from 300 to 600° C., preferably in the range of from 400 to 500° C., the gas atmosphere preferably comprising oxygen.

99. The process of any one of embodiments 82 to 98, wherein calcining according to (iii.6) is performed in a gas atmosphere for a duration in the range of from 10 minutes to 6 hours, preferably in the range of from 1 to 6 hours, more preferably in the range of from 2 to 4 hours, the gas atmosphere preferably comprising oxygen.

100. The process of any one of embodiments 82 to 99, wherein according to (ii.4), or (ii.4'), the coating of the porous internal walls of the porous wall-flow filter substrate provided in (i) is over x % of the substrate axial length, wherein x is in the range of from 95 to 100 from the inlet end to the outlet end of the inlet passages, and
according to (iii.4), the coating of the porous internal walls of the porous wall-flow filter substrate obtained in (ii) is over y % of the substrate axial length from the inlet end to the outlet end of the inlet passages, wherein y is in the range of from 20 to x, preferably in the range of from 80 to x, more preferably in the range of from 90 to x, or wherein y is in the range of from 20 to 70, preferably in the range of from 40 to 60, more preferably in the range of from 45 to 55.

101. The process of any one of embodiments 82 to 100, wherein according to (ii.4), or (ii.4'), the coating of the porous internal walls of the porous wall-flow filter substrate provided in (i) is over x % of the substrate axial length from the outlet end to the inlet end of the outlet passages, wherein x is in the range of from 95 to 100, and according to (iii.4), the coating of the porous internal walls of the porous wall-flow filter substrate obtained in (ii) is over y % of the substrate axial length from the outlet end to the inlet end of the outlet passages, wherein y is in the range of from 20 to x, preferably in the range of from 80 to x, more preferably in the range of from 90 to x.

102. The process of any one of embodiments 64 to 101 consisting of (i), (ii) and (iii).

103. The process of any one of embodiments 72 to 100 further comprising
(iv) providing a slurry comprising particles of a source of the second three-way conversion catalytic coating, said particles having a Dv90 value in the range of from 2 to 25 micrometers, the Dv90 value being determined according to Reference Example 4; coating the porous internal walls of the porous wall-flow filter substrate obtained in (iii), with the particles of the slurry, over z % of the substrate axial length from the outlet end to the inlet end of the outlet passages, wherein z is in the range of from 20 to x, preferably in the range of from 20 to 70, more preferably in the range of from 40 to 60, more preferably in the range of from 45 to 55; calcining the obtained coated filter substrate, obtaining the filter substrate comprising the oxidic component, the first three-way conversion catalytic coating and the second three-way conversion catalytic coating.

104. The process of embodiment 103, wherein according to (iii.4), the coating of the porous internal walls of the porous wall-flow filter substrate obtained in (ii), is over y % of the substrate axial length from the inlet end to the outlet end of the inlet passages, wherein y is in the range of from 20 to 70, preferably in the range of from 40 to 60, more preferably in the range of from 45 to 55.

105. The process of embodiment 103 or 104, wherein (iv) comprises
(iv.1) impregnating a source of a platinum group metal onto a refractory metal oxide;
admixing the platinum group metal supported on the refractory metal oxide support with one or more of an adjuvant and a source of a promotor, obtaining a slurry;
milling the obtained slurry obtaining a slurry, wherein the particles comprised in said slurry have a Dv90 value in the range of from 3 to 20 micrometers, preferably in the range of from 4 to 18 micrometers, wherein the Dv90 value being determined according to Reference Example 4;
(iv.2) impregnating a source of a platinum group metal onto an oxygen storage compound;
admixing the platinum group metal supported on the oxygen storage compound with one or more of an adjuvant and a source of a promotor, obtaining a slurry;
milling the obtained slurry obtaining a slurry, wherein the particles comprised in said slurry have a Dv90 value in the range of from 3 to 20 micrometers, preferably in the range of from 4 to 18 micrometers, wherein the Dv90 value being determined according to Reference Example 4;
(iv.3) admixing the slurry obtained in (iv.1) and the slurry obtained in (iv.2), obtaining the slurry comprising a source of the second three-way conversion catalytic coating;
(iv.4) coating the porous internal walls of the porous wall-flow filter substrate obtained in (iii), with the particles of the slurry obtained in (iv.3), over z % of the substrate axial length from the outlet end to the inlet end of the outlet passages, wherein z is in the range of from 20 to 70, preferably in the range of from 40 to 60, more preferably in the range of from 45 to 55, obtaining a slurry treated wall-flow filter substrate;
(iv.5) optionally drying the slurry treated wall-flow filter substrate obtained in (iv.4), obtained a dried slurry treated wall-flow filter substrate;
(iv.6) calcining the slurry treated wall-flow filter substrate obtained in (iv.4), or the dried slurry treated wall-flow filter substrate obtained in (iv.5).

106. The process of embodiment 105, wherein according to (iv.1), the platinum group metal is one or more of ruthenium, palladium, rhodium, platinum, and iridium, preferably one or more of palladium, rhodium, and platinum, more preferably one or more of palladium and rhodium, more preferably rhodium,
wherein the source of a platinum group metal preferably comprises a salt of a platinum group metal, more preferably comprises a nitrate of a platinum group metal.

107. The process of embodiment 105 or 106, wherein according to (iv.1), the refractory metal oxide comprises aluminum, preferably comprises one or more of an aluminum oxide, a mixture of oxides comprising an aluminum oxide, and a mixed oxide comprising aluminum, wherein the mixed oxide comprising aluminum preferably additionally comprises one or more of zirconium, cerium, lanthanum, barium, and neodymium, wherein more preferably, the refractory metal oxide support comprises, more preferably is, an aluminum oxide, more preferably a gamma aluminum oxide.

108. The process of any one of embodiments 105 to 107, wherein according to (iv.1) and prior to admixing the platinum group metal supported on the refractory metal oxide with one or more of an adjuvant and a source of a promotor, the refractory metal oxide impregnated with the source of platinum group metal is calcined in gas atmosphere, preferably having a temperature in the range of from 250 to 600° C., more preferably in the range of from 300 to 450° C., the gas atmosphere preferably comprising oxygen.

109. The process of any one of embodiments 105 to 108, wherein according to (iv.1), the adjuvant is one or more of water, a polyacrylate, a methylcellulose, and an alcohol, preferably one or more of water and an alcohol, more preferably water and an alcohol.

110. The process of any one of embodiments 105 to 109, wherein according to (iv.1), the source of a promotor is a source of one or more of a promotor comprising zirconium, a promotor comprising barium, a promotor comprising strontium, a promotor comprising lanthanum, a promotor comprising neodymium, a promotor comprising yttrium, a promotor comprising praseodymium, preferably one or more of a promotor comprising zirconium and a promotor comprising barium, more preferably a promotor comprising zirconium and a promotor comprising barium.

111. The process of embodiment 110, wherein according to (iv.1), the source of a promotor comprises a salt, preferably a nitrate, of the respective promotor element, more preferably zirconium nitrate and barium nitrate.

112. The process of any one of embodiments 105 to 111, wherein according to (iv.2), the platinum group metal is one or more of ruthenium, palladium, rhodium, platinum, and iridium, preferably one or more of palladium, rhodium, and platinum, more preferably one or more of palladium and rhodium, more preferably palladium,
wherein the source of a platinum group metal preferably comprises a salt of a platinum group metal, more preferably comprises a nitrate of a platinum group metal.

113. The process of any one of embodiments 105 to 112, wherein according to (iv.2), the oxygen storage compound comprises cerium, preferably comprises one or more of a cerium oxide, a mixture of oxides comprising a cerium oxide, and a mixed oxide comprising cerium, wherein the mixed oxide comprising cerium preferably additionally comprises one or more of zirconium, yttrium, neodymium, lanthanum, hafnium, samarium and praseodymium, more preferably additionally comprises one or more of zirconium, yttrium, neodymium, and lanthanum, or more preferably additionally comprises zirconium, yttrium, and lanthanum;
wherein the oxygen storage compound more preferably comprises a mixed oxide of cerium, zirconium, yttrium, neodymium, and lanthanum or a mixed oxide of cerium, zirconium, yttrium, and lanthanum.

114. The process of any one of embodiments 105 to 113, wherein according to (iv.2) and prior to admixing the platinum group metal supported on the oxygen storage compound with one or more of an adjuvant and a source of a promotor, the oxygen storage compound impregnated with the source of platinum group metal is calcined in gas atmosphere, preferably having a temperature in the range of from 250 to 600° C., more preferably in the range of from 300 to 450° C., the gas atmosphere preferably comprising oxygen.

115. The process of any one of embodiments 105 to 114, wherein according to (iv.2), the adjuvant is one or more of water, a polyacrylate, a methylcellulose, and an alcohol, preferably one or more of water and an alcohol, more preferably water and an alcohol.

116. The process of any one of embodiments 105 to 115, wherein according to (iv.2), the source of a promotor is a source of one or more of a promotor comprising zirconium, a promotor comprising barium, a promotor comprising strontium, a promotor comprising lanthanum, a promotor comprising neodymium, a promotor comprising yttrium, a promotor comprising praseodymium, preferably one or more of a promotor comprising zirconium and a promotor comprising barium, more preferably a promotor comprising zirconium and a promotor comprising barium.

117. The process of embodiment 116, wherein according to (iv.2), the source of a promotor comprises a salt, preferably a nitrate, of the respective promotor element, more preferably zirconium nitrate and barium nitrate.

118. The process of any one of embodiments 105 to 117, wherein the coating according to (iv.4) is performed by applying the slurry with vacuum or immersing the substrate, preferably immersing the substrate.

119. The process of any one of embodiments 105 to 118, wherein drying according to (iv.5) is performed in a gas atmosphere having a temperature in the range of from 90 to 200° C., preferably in the range of from 100 to 180° C., the gas atmosphere preferably comprising oxygen.

120. The process of any one of embodiments 105 to 119, wherein drying according to (iv.5) is performed in a gas atmosphere for a duration in the range of from 10 minutes to 1 hour, preferably in the range of from 10 to 30 minutes, the gas atmosphere preferably comprising oxygen.

121. The process of any one of embodiments 105 to 120, wherein calcining according to (iv.6) is performed in a gas atmosphere having a temperature in the range of from 300 to 600° C., preferably in the range of from 400 to 500° C., the gas atmosphere preferably comprising oxygen.

122. The process of any one of embodiments 105 to 121, wherein calcining according to (iv.6) is performed in a gas atmosphere for a duration in the range of from 10 minutes to 6 hours, preferably in the range of from 1 to 6 hours, more preferably in the range of from 2 to 4 hours, the gas atmosphere preferably comprising oxygen.

123. The process of any one of embodiments 105 to 122 consisting of (i), (ii), (iii), and (iv).

124. The process of any one of embodiments 64 to 123, wherein the porous wall-flow filter according to (i) comprises, preferably consists of, a ceramic substance, wherein the ceramic substance comprises, preferably consists of, one or more of a silica, a silicate, a aluminosilicate, preferably a cordierite or a mullite, an aluminum titanate and a silicon carbide, more preferably one or more of a silicon carbide and a cordierite, more preferably a cordierite.

125. A four-way conversion catalyst, preferably the four-way conversion catalyst according to any one of embodiments 1 to 63, obtainable or obtained or preparable or prepared by a process according to any one of embodiments 64 to 124, preferably embodiment 102 or 123.

126. An exhaust gas treatment system downstream of and in fluid communication with a gasoline engine, the system comprising a four-way conversion catalyst according to any one of embodiments 1 to 63 and 125.

127. The exhaust gas treatment system of embodiment 126, wherein the gasoline engine is a spark ignition engine, preferably a gasoline direct injection engine.
128. The exhaust gas treatment system of embodiment 126 or 127, wherein the exhaust gas stream of the gasoline engine comprises hydrocarbon (HC), carbon monoxide (CO), nitrogen oxides (NOx), and particulates.
129. Use of a four-way conversion catalyst according to any one of embodiments 1 to 63 and 125, for the treatment of an exhaust gas stream from a gasoline engine.
130. The use of embodiment 129, wherein the gasoline engine is a spark ignition engine, preferably a gasoline direct injection engine.
131. The use of embodiment 129 or 130, wherein the exhaust gas stream of the gasoline engine comprises hydrocarbon (HC), carbon monoxide (CO), nitrogen oxides (NOx), and particulates.
132. A method of treating an exhaust gas stream from a gasoline engine, comprising passing said exhaust gas stream through a four-way conversion catalyst according to any one of embodiments 1 to 63 and 125.
133. The method of embodiment 132, wherein the gasoline engine is a spark ignition engine, preferably a gasoline direct injection engine.
134. The method of embodiment 132 or 133, wherein the exhaust gas stream of the gasoline engine comprises hydrocarbon (HC), carbon monoxide (CO), nitrogen oxides (NOx), and particulates.

In the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

Further, in the context of the present invention, the features related to the first aspect of the present invention and the features related to the second aspect of the present invention may be combined together, in any manner, by the person skilled in the art.

The present invention is further illustrated by the following Reference Examples, Examples, and Comparative Examples.

EXAMPLES

Reference Example 1: Measurement of the Porosity of the Porous Oxidic Compound

The porosity of the porous oxidic compound, e.g. aluminum oxide or cerium-zirconium mixed oxide, was determined by physisorption of $N_2$ and analyzing the physisorption isotherms via BJH (Barett, Joyner, Halenda) analysis according to DIN 66134.

Reference Example 2: Measurement of the BET Specific Surface Area of Alumina

The BET specific surface area of the alumina was determined according to DIN 66131 or DIN-ISO 9277 using liquid nitrogen.

Reference Example 3: Measurement of the Average Porosity and the Average Pore Size of the Porous Wall-Flow Substrate The average porosity of the porous wall-flow substrate was determined by mercury intrusion using mercury porosimetry according to DIN 66133 and ISO 15901-1.

Reference Example 4: Determination of the Volume-Based Particle Size Distributions The particle size distributions were determined by a static light scattering method using Sympatec HELOS (3200) & QUIXEL equipment, wherein the optical concentration of the sample was in the range of from 6 to 10%.

Reference Example 5: Determination of the Viscosity of a Washcoat Slurry

The slurry dynamic viscosities were measured with a HAAKE Rheostress 6000 manufactured by Thermo Fisher Scientific. Values reported reported here are measured at a shear rate of 300 1/s. The viscosity was measured at 20° C.

Reference Example 6: General Coating Method

In order to coat a porous wall-flow substrate with a three-way conversion coating according to the present invention, the wall-flow substrate was immersed vertically in a portion of the washcoat for a specific length of the substrate which was equal to the targeted length of the coating to be applied. In this manner, the washcoat contacted the porous walls of the substrate. The sample was left in the washcoat for a specific period of time, usually for 1-10 seconds. The substrate was then removed from the washcoat, and excess slurry was removed from the substrate by allowing it to drain from the substrate, then by blowing with compressed air (against the direction of washcoat penetration). The coated substrate was then calcined for 3 h at 450° C.

Comparative Example 1: FWC Catalyst not According to the Invention (75 g/l)

A porous wall-flow substrate having a three-way conversion (TWC) catalyst permeating the substrate wall was prepared at a washcoat loading of 1.242 $g/in^3$ (75 g/l) on a cordierite substrate sized 4.66*5 inches with 300 CPSI (cells per square inch), 8 mill wall thickness, average porosity of 65% and average pore size of 20 micrometers according to the following method:
(1) 1371 g of a high surface area gamma alumina (BET specific surface area=144 $m^2$/g; total pore volume=0.843 ml/g; mean pore radius=109 Angstrom) were impregnated with 136.8 g of a 9.06 weight-% aqueous solution of rhodium nitrate ($Rh(NO_3)_3$) with addition of 949 g deionized water. The Rh-impregnated alumina was calcined in air at a temperature of 590° C. for 3 h to form respective metal oxides. The calcined material was added to 2136 g deionized water containing 8 g n-octanol, 124 g 58.6 weight-% of barium nitrate ($Ba(NO_3)_2$) and 139 g 21.5 weight-% zirconium nitrate ($Zr(NO_3)_4$). The resulting mixture was milled using a continuous milling apparatus so that the Dv90 value of the particles was 4.8 micrometers.

(2) 3756 g of an oxygen storage compound (OSC), a mixed oxide comprising Ce (40 weight-% calculated as $CeO_2$) and Zr (45 weight-% calculated as $ZrO_2$), and further comprising Nd, La, and Y (15 weight-% in total, each calculated as $X_2O_3$) and having a Dv90 value of 31 micrometers were impregnated with 227.5 g of a 18.53 weight-% aqueous solution of palladium nitrate ($Pd(NO_3)_2$)) together with addition of 1155 g of deionized water. The Pd-impregnated OSC was calcined at a temperature of 590° C. to form respective metal oxides. The calcined material was added to 5006 g of deionized water containing 8 g n-octanol, 290 g 58.6 weight-% of barium nitrate ($Ba(NO_3)_2$) and 208 g 21.5 weight-% zirconium nitrate ($Zr(NO_3)_4$). The resulting mixture was milled using the apparatus described above so that the Dv90 value of the particles was 4.43 micrometers.

(3) The materials obtained from (1) and (2) were combined to form the final TWC slurry. The pH of the slurry was adjusted with nitric acid to 3.8. The final slurry had a viscosity of 15.2 mPa·s, measured as described in Reference Example 5.

(4) The porous wall-flow substrate was coated with the washcoat obtained from (3) as described in Reference Example 6 hereinabove over 100% of the axial length of the substrate from the inlet end.

Example 1: FWC Catalyst (75 g/l TWC Catalytic Coating+30 g/l Oxidic Component—Dv90 of 18.89 Micrometers)

A porous wall-flow substrate as described in Comparative Example 1 was coated with an oxidic component with a loading of 0.501 g/in³ (30 g/l) prior to the application of the TWC catalytic coating as described in Comparative Example 1. The catalyst was prepared according to the following method:

(1) 2664 g of a high surface area gamma alumina (BET specific surface area=149 m²/g; total pore volume=0.535 ml/g) was added to an aqueous solution containing 12819 g deionized water, 29 g n-octanol, 170 g acetic acid, 433 g of 21.5 weight-% zirconium nitrate ($Zr(NO_3)_4$), 218 g of 59.88 weight-% barium acetate and 667 g of 78.4 weight-% boehmite. The pH of the aqueous phase of the resulting slurry was adjusted with acetic acid to 3.5. The particles of the slurry were then milled so that the Dv90 value of the containing particles was 18.89 micrometers. The solid content of the slurry was 19.04 weight-%.

(2) The porous wall-flow substrate was coated with the slurry obtained from (1) as described in Reference Example 6 over 100% of the substrate axial length from the inlet end.

(3) The TWC slurry prepared as described in Comparative Example 1 was applied to the coated porous wall-flow filter obtained in (2) as described in Reference Example 6 over 100% of the axial length of the substrate from the inlet end obtaining a TWC loading in the catalyst of 75 g/l.

Example 2: FWC Catalyst (75 g/l TWC Catalytic Coating+15 g/l Oxidic Component—Dv90 of 18.89 Micrometers)

A porous wall-flow substrate as described in Comparative Example 1 was coated with an oxidic component with a loading 0.25 g/in³ (15 g/l) prior to the application of TWC catalytic coating as described in Comparative Example 1. The catalyst was prepared according to the following method:

(1) The oxidic component was prepared as described in Example 1 (1).

(2) The porous wall-flow substrate was coated with the slurry obtained from (1) as described in Reference Example 6 over 100% of the substrate axial length from the inlet end.

(3) The TWC slurry prepared as described in Comparative Example 1 was applied to the coated porous wall-flow filter obtained in (2) as described in Reference Example 6 over 100% of the axial length of the substrate from the inlet end obtaining a TWC loading in the catalyst of 75 g/l.

Example 3: FWC Catalyst (75 g/l TWC Catalytic Coating+30 g/l Oxidic Component—Dv90 of 2.97 Micrometers)

A porous wall-flow substrate as described in Comparative Example 1 was coated with an oxidic component with a loading of 0.501 g/in³ (30 g/l) prior to the application of the TWC catalytic coating as described in Comparative Example 1. The catalyst was prepared according to the following method:

(1) 4700 g of a high surface area gamma alumina (BET specific surface area=149 m²/g; total pore volume=0.535 ml/g) was added to an aqueous solution containing 22622 g deionized water, 50 g n-octanol, 300 g acetic acid, 764 g of 30.2 weight-% zirconium nitrate ($Zr(NO_3)_4$), 386 g of 59.88 weight-% barium acetate and 1177 g of 78.4 weight-% boehmite. The pH of the aqueous phase of the resulting slurry was adjusted with acetic acid to 3.7. The particles of the slurry were then milled so that the Dv90 value of the containing particles was 2.97 micrometers. The solid content of the slurry was 18.12 weight-%.

(2) The porous wall-flow substrate was coated with the slurry obtained from (1) as described in Reference Example 6 over 100% of the substrate axial length from the inlet end.

(3) The TWC slurry prepared as described in Comparative Example 1 was applied to the coated porous wall-flow filter obtained in (2) as described in Reference Example 6 over 100% of the axial length of the substrate from the inlet end obtaining a TWC loading in the catalyst of 75 g/l.

Example 4: Cold Flow Backpressure Evaluation

The backpressure of the catalysts obtained in Comparative Example 1 and Examples 1 to 3 was measured on a Super Flow Cold Flow bench SF-1020 Superbench at ambient conditions. The backpressure data recorded at a volume flow of 700 m³/h was reported in Table 1.

TABLE 1

Cold Flow Back Pressure Data

| | Back pressure/mbar |
|---|---|
| Comparative Example 1 | 65.59 |
| Example 1 | 90.30 |
| Example 2 | 68.91 |
| Example 3 | 80.53 |

From Table 1, a clear impact of the presence of the oxidic compound in addition to the TWC catalytic coating can be seen, namely a higher amount as well as larger particle size increase backpressure relative to Comparative Example 1.

Example 5

The catalysts of Comparative Example 1 and Examples 1 to 3 were canned and measured under World Light Duty Test Cycle (WLTC) in close-coupled (CC) position on a dynamic engine bench equipped with a 2.0 l direct-injection turbo engine. Emissions of particulate number according to the Particle Measurement Program (PMP) protocol were measured for full systems and compared to the engine raw emission for calculation of the filtration efficiency. The results are shown in Table 2.

TABLE 2

WLTC Emission Results on engine bench

| | Particulate Number (#/km) | Filtration Efficiency based on engine raw emission |
|---|---|---|
| Comparative Example 1 | 7.9514E+10 | 56% |
| Example 1 | 6.5256E+10 | 64% |
| Example 2 | 6.765E+10 | 62% |
| Example 3 | 6.3616E+10 | 64% |
| Engine raw emission | 1.7906E+11 | -Not applicable- |

Example 1, Example 2 and Example 3 show improved filtration effciency compared to Comparative Example 1.

Example 1, Example 2 and Example 3 show improved filtration efficiency compared to Comparative Example 1.

Example 6

The canned catalysts from Example 5 were 100 h fuel-cut aged in close-coupled position with 950° C. inlet temperature. The performance of the aged catalysts was measured under New European Drive Cycle (NEDC) in close-coupled (CC) position on 2.0 l engine bench. Emission results measured after the respective catalysts are shown in Table 3.

TABLE 3

HC, CO and NOx emissions

| | HC [g/km] | CO [g/km] | NOx [g/km] |
|---|---|---|---|
| Comparative Example 1 | 0.373 | 2.219 | 0.502 |
| Example 1 | 0.228 | 1.698 | 0.396 |
| Example 2 | 0.276 | 1.940 | 0.421 |
| Example 3 | 0.215 | 1.590 | 0.405 |

Example 1, Example 2 and Example 3 show improved gaseous conversion performance compared to Comparative Example 1.

Example 1, Example 2 and Example 3 show improved gaseous conversion performance compared to Comparative Example 1.

Example 7

The aged catalysts from Comparative Example 1 and Example 3 as obtained in Example 6 were decanned. The samples were investigated for element distribution with electron microprobe analyses (EMPA). Results for Silicon mapping are shown in FIGS. 1 and 2. The results of Example 3 are displayed in FIG. 1 and the results of Comparative Example 1 are displayed in FIG. 2.

In FIG. 1, the arrow a) shows the catalytic washcoat (TWC) and the arrow b) shows the silicon present in the alumina-based oxidic component, which as may be taken from the figure acts as an undercoat. However according to FIG. 1, there is no silicon in the catalytic washcoat of the catalyst of Example 3. On the contrary, as can be seen in FIG. 2, the arrow c) shows silicon present in the catalytic washcoat of Comparative Example 1. Thus, this example demonstrates that the silicon migration into the catalytic washcoat is hindered by using the catalysts of the invention, namely comprising a specific oxidic component in addition to the catalytic coating(s).

Comparative Example 2: FWC Catalyst not According to the Invention (100 g/l)

A porous wall-flow substrate having a three-way conversion (TWC) catalyst permeating the substrate wall was prepared at a washcoat loading of 1.651 g/in$^3$ (100 g/l) on a cordierite substrate sized 4.66*5 inches with 300 CPSI (cells per square inch), 8 mill wall thickness, average porosity of 65% and average pore size of 20 micrometers according to the following method:

(1) 1880 g of a high surface area gamma alumina (BET specific surface area=144 m$^2$/g; total pore volume=0.843 ml/g; mean pore radius=109 Angstrom) were impregnated with 158.2 g of a 7.98 weight-% aqueous solution of rhodium nitrate (Rh(NO$_3$)$_3$) with addition of 1286 g deionized water. The Rh-impregnated alumina was calcined in air at a temperature of 590° C. for 3 h to form respective metal oxides. The calcined material was added to 2887 g deionized water containing 11 g n-octanol, 169 g 58.4 weight-% of barium nitrate (Ba(NO$_3$)$_2$) and 192 g 21.0 weight-% zirconium nitrate (Zr(NO$_3$)$_4$). The resulting mixture was milled using a continuous milling apparatus so that the Dv90 value of the particles was 5.40 micrometers.

(2) 5090 g of an oxygen storage compound (OSC), a mixed oxide comprising Ce (40 weight-% calculated as CeO$_2$) and Zr (45 weight-% calculated as ZrO$_2$), and further comprising Nd, La, and Y (15 weight-% in total, each calculated as X$_2$O$_3$) and having a Dv90 value of 31 micrometers were impregnated with 249.4 g of a 17.20 weight-% aqueous solution of palladium nitrate (Pd(NO$_3$)$_2$)) together with addition of 1603 g of deionized water. The Pd-impregnated OSC was calcined at a temperature of 590° C. to form respective metal oxides. The calcined material was added to 6767 g of deionized water containing 11 g n-octanol, 395 g 58.4 weight-% of barium nitrate (Ba(NO$_3$)$_2$) and 289 g 21.0 weight-% zirconium nitrate (Zr(NO$_3$)$_4$). The resulting mixture was milled using the apparatus described above so that the Dv90 value of the particles was 5.79 micrometers.

(3) The materials obtained from (1) and (2) were combined to form the final TWC slurry. The pH of the aqueous phase of the slurry was adjusted with nitric acid to 3.8. The final slurry had a viscosity of 24 mPa·s, measured as described in Reference Example 5.

(4) The porous wall-flow substrate was coated with the washcoat obtained from (3) as described in Reference Example 6 by immersing 50% of the axial length of the substrate from the inlet side plus 3 mm followed by drying and calcining for 3 h at 450° C. then by immersing 50% of the axial length of the substrate from the outlet side plus 3 mm followed by drying. The coated substrate was then calcined for 3 h at 450° C.

Example 8: Cold Flow Backpressure Evaluation

The backpressure of the particulate filter obtained as described in Comparative Examples 1 and 2 and Examples 1 and 3 was measured on a SuperFlow Cold Flow bench SF-1020 Superbench at ambient conditions. The backpressure data recorded at a volume flow of 700 m$^3$/h is reported in Table 4.

TABLE 4

Cold Flow Back Pressure Data

| | Back pressure/mbar |
|---|---|
| Comparative Example 1 | 65.59 |
| Comparative Example 2 | 73.68 |
| Example 1 | 90.30 |
| Example 3 | 80.53 |

While having comparable washcoat loadings, the backpressure obtained Examples 1 and 3 is higher than with Comparative Example 2. This indicates that a portion of washcoat is located on the walls of the inlet passages of the substrate.

Example 9

The catalysts form Comparative Examples 1 and 2 and Example 1 and 3 were canned. Further, said catalysts were 200 h fuel-cut aged in close-coupled position with 880° C. bed temperature. The performance of the aged catalysts was measured under New European Drive Cycle (NEDC) in close-coupled (CC) position on 2.0 l engine bench. Emission results measured after the respective catalysts are shown in Table 5.

TABLE 5

HC, CO and NOx emissions

| Sample | HC [g/km] | CO [g/km] | NOx [g/km] |
|---|---|---|---|
| Comparative Example 1 | 0.323 | 1.988 | 0.485 |
| Comparative Example 2 | 0.262 | 1.582 | 0.407 |
| Example 1 | 0.270 | 1.694 | 0.366 |
| Example 3 | 0.290 | 1.719 | 0.377 |

The catalyst of Comparative Example 1, having a TWC loading of 75 g/l, exhibits higher emissions of HC, CO and NOx compared to the catalysts of Examples 1 and 3, which also have the same TWC catalytic loading. This demonstrates that the oxidic component permits to improve the performance of the catalyst. Further, Table 5 shows that the catalyst of Comparative Example 2, having a TWC loading of 100 g/l, exhibits lower emissions of HC, CO and NOx compared to the catalyst of Comparative Example 1, showing that by increasing the TWC catalyst loading, the emissions of HC, CO and NOx may be reduced. However, the catalyst of Comparative Example 2 also shows lower performance with respect to the NOx emissions compared to the catalysts of Example 1 and Example 3 which have a lower TWC loading.

Comparative Example 3: FWC Catalyst not According to the Invention (in-Wall Coating—150 g/l)

A porous wall-flow substrate having a three-way conversion (TWC) catalyst permeating the substrate wall was prepared at a washcoat loading of 2.494 g/in$^3$ (150 g/l) on a cordierite substrate sized 4.66*4.65 inches with 300 CPSI (cells per square inch), 8 mill wall thickness, average porosity of 65% and average pore size of 17 micrometers according to the following method:

(1) 2461 g of a high surface area gamma alumina (BET specific surface area=144 m$^2$/g; total pore volume=0.843 ml/g; mean pore radius=109 Angstrom) were impregnated with 142.5 g of a 8.60 weight-% aqueous solution of rhodium nitrate ($Rh(NO_3)_3$) with addition of 1581 g deionized water. The Rh-impregnated alumina was calcined in air at a temperature of 590° C. for 3 h to form respective metal oxides. The calcined material was added to 3821 g deionized water containing 14 g n-octanol, 223 g 58.5 weight-% of barium nitrate ($Ba(NO_3)_2$) and 251 g 21.4 weight-% zirconium nitrate ($Zr(NO_3)_4$). The resulting mixture was milled using a continuous milling apparatus so that the Dv90 value of the particles was 5.54 micrometers.

(2) 6673 g of an oxygen storage compound (OSC), a mixed oxide comprising Ce (40 weight-% calculated as $CeO_2$) and Zr (50 weight-% calculated as $ZrO_2$), and further comprising La and Y (10 weight-% in total, each calculated as $X_2O_3$) and having a Dv90 value of 12.7 micrometers were impregnated with 671.6 g of a 18.74 weight-% aqueous solution of palladium nitrate ($Pd(NO_3)_2$)) together with addition of 1383 g of deionized water. The Pd-impregnated OSC was calcined at a temperature of 590° C. to form respective metal oxides. The calcined material was added to 9063 g of deionized water containing 14 g n-octanol, 521 g 58.5 weight-% of barium nitrate ($Ba(NO_3)_2$) and 376 g 21.4 weight-% zirconium nitrate ($Zr(NO_3)_4$). The resulting mixture was milled using the apparatus described above so that the Dv90 value of the particles was 5.60 micrometers.

(3) The materials obtained from (1) and (2) were combined to form the final TWC slurry. The pH of the aqueous phase of the slurry was adjusted with nitric acid to 3.7. The final slurry had a viscosity of 22.3 mPa·s, measured as described in Reference Example 5.

(4) The porous wall-flow substrate was coated with the washcoat obtained from (3) as described in Reference Example 6 by immersing 50% of the axial length of the substrate from the inlet side plus 3 mm followed by drying and calcining for 3 h at 450° C. and then by immersing 50% of the axial length of the substrate from the outlet side plus 3 mm followed by drying. The coated substrate was then calcined for 3 h at 450° C.

Example 10: FWC Catalyst (120 g/l TWC Catalytic Coating+30 g/l Oxidic Component—Dv90 of 3.38 Micrometers)

A porous wall-flow substrate, a cordierite substrate sized 4.66*4.65 inches with 300 CPSI (cells per square inch), 8 mill wall thickness, average porosity of 65% and average pore size of 17 micrometers, was coated with an oxidic component with a loading of 30 g/l prior to the application of the TWC catalytic coatings with a loading of 2.002 g/in³ (120 g/l) according to the following method:

(1) 3734 g of a high surface area gamma alumina (BET specific surface area=149 m²/g; total pore volume=0.535 ml/g) was added to a aqueous solution containing 24460 g deionized water, 38 g n-octanol, 225 g acetic acid, 583 g of 29.7 weight-% zirconium acetate, 291 g of 59.56 weight-% barium acetate and 876 g of 79.00 weight-% boehmite. The pH of the aqueous phase of the resulting slurry was adjusted with acetic acid to 3.5. The particles of the slurry were then milled so that the Dv90 value of the containing particles was 3.38 micrometers. The solid content of the slurry was of 15.12 weight-%.

(2) The porous wall-flow substrate was coated with the slurry obtained from (1) as described in Reference Example 6 over 100% of the substrate axial length from the inlet end.

(3) 1532 g of a high surface area gamma alumina (BET specific surface area=144 m²/g; total pore volume=0.843 ml/g; mean pore radius=109 Angstrom) were impregnated with 110.9 g of a 8.60 weight-% aqueous solution of rhodium nitrate ($Rh(NO_3)_3$) with addition of 850 g deionized water. The Rh-impregnated alumina was calcined in air at a temperature of 590° C. for 3 h to form the respective metal oxides. The calcined material was added to 2382 g deionized water containing 9 g n-octanol, 139 g 58.5 weight-% of barium nitrate ($Ba(NO_3)_2$) and 156 g 21.4 weight-% zirconium nitrate ($Zr(NO_3)_4$). The resulting mixture was milled using a continuous milling apparatus so that the Dv90 value of the particles was 5.02 micrometers.

(4) 4221 g of an oxygen storage compound (OSC), a mixed oxide comprising Ce (40 weight-% calculated as $CeO_2$) and Zr (45 weight-% calculated as $ZrO_2$), and further comprising Nd, La and Y (15 weight-% in total, each calculated as $X_2O_3$) and having a Dv90 value of 31 micrometers were impregnated with 522.8 g of a 18.74 weight-% aqueous solution of palladium nitrate ($Pd(NO_3)_2$)) together with addition of 1125 g of deionized water. The Pd-impregnated OSC was calcined at a temperature of 590° C. to form the respective metal oxides. The calcined material was added to 5671 g of deionized water containing 9 g n-octanol, 325 g 58.5 weight-% of barium nitrate ($Ba(NO_3)_2$) and 234 g 21.4 weight-% zirconium nitrate ($Zr(NO_3)_4$). The resulting mixture was milled using the apparatus described above so that the Dv90 value of the particles was 5.94 micrometers.

(5) The materials obtained from (3) and (4) were combined to form the final TWC slurry. The pH of the slurry was adjusted with acetic acid to 3.7. The final slurry had a viscosity of 18.5 mPa·s, measured as described in Reference Example 5.

(6) The coated porous wall-flow substrate obtained from (2) was coated with the slurry (TWC catalytic coating) obtained from (5) as described in Reference Example 6 by immersing 50% of the axial length of the substrate from the inlet side plus 3 mm followed by drying and calcining for 3 h at 450° C. and then was coating with the slurry obtained from (5) ($2^{nd}$ TWC catalytic coating) by immersing of 50% of the axial length of the substrate from the outlet side plus 3 mm followed by drying. The coated substrate was then calcined for 3 h at 450° C.

Example 11: FWC Catalyst (90 g/l TWC Catalytic Coating+30 g/l Oxidic Component—Dv90 of 3.38 Micrometers)

A porous wall-flow substrate, a cordierite substrate sized 4.66*4.65 inches with 300 CPSI (cells per square inch), 8 mill wall thickness, average porosity of 65% and average pore size of 17 micrometers, was coated with an oxidic component with a loading of 30 g/l prior to the application of the TWC catalytic with a loading of 1.511 g/in³ (90 g/l) according to the following method:

(1) The oxidic component was prepared and disposed on the substrate as described in Example 10, (1) and (2).

(2) 1447 g of a high surface area gamma alumina (BET specific surface area=144 m²/g; total pore volume=0.843 ml/g; mean pore radius=109 Angstrom) were impregnated with 139.7 g of a 8.60 weight-% aqueous solution of rhodium nitrate ($Rh(NO_3)_3$) with addition of 776 g deionized water. The Rh-impregnated alumina was calcined in air at a temperature of 590° C. for 3 h to form the respective metal oxides. The calcined material was added to 2255 g deionized water containing 9 g n-octanol, 131 g 58.5 weight-% of barium nitrate ($Ba(NO_3)_2$) and 147 g 21.4 weight-% zirconium nitrate ($Zr(NO_3)_4$). The resulting mixture was milled using a continuous milling apparatus so that the Dv90 value of the particles was 4.79 micrometers.

(3) 3986 g of an oxygen storage compound (OSC), a mixed oxide comprising Ce (40 weight-% calculated as $CeO_2$) and Zr (45 weight-% calculated as $ZrO_2$), and further comprising Nd, La and Y (15 weight-% in total, each calculated as $X_2O_3$) and having a Dv90 value of 31 micrometers were impregnated with 658.3 g of a 18.74 weight-% aqueous solution of palladium nitrate ($Pd(NO_3)_2$)) together with addition of 957 g of deionized water. The Pd-impregnated OSC was calcined at a temperature of 590° C. to form respective metal oxides. The calcined material was added to 5397 g of deionized water containing 9 g n-octanol, 307 g 58.5 weight-% of barium nitrate ($Ba(NO_3)_2$) and 221 g 21.4 weight-% zirconium nitrate ($Zr(NO_3)_4$). The resulting mixture was milled using the apparatus described above so that the Dv90 value of the particles was 4.72 micrometers.

(4) The materials obtained from (2) and (3) were combined to form the final TWC slurry. The pH of the aqueous phase of the slurry was adjusted with nitric acid to 3.9. The final slurry had a viscosity of 15.8 mPa·s, measured as described in Reference Example 5.

(5) The porous wall-flow substrate obtained after (1) was coated with the slurry obtained from (4) as described in Reference Example 6 hereinabove over 100% of the axial length of the substrate from the inlet end.

Example 12: FWC Catalyst (75 g/l TWC Catalytic Coating+30 g/l Oxidic Component—Dv90 of 3.38 Micrometers)

A porous wall-flow substrate, a cordierite substrate sized 4.66*4.65 inches with 300 CPSI (cells per square inch), 8 mill wall thickness, average porosity of 65% and average pore size of 17 micrometers, was coated with an oxidic component with a loading of 30 g/l prior to the application of the TWC catalytic coating with a loading of 1.265 g/in³ (75 g/l) according to the following method:

(1) The oxidic component was prepared and disposed on the substrate as described in Example 10, (1) and (2).

(2) 1344 g of a high surface area gamma alumina (BET specific surface area=144 m²/g; total pore volume=0.843 ml/g; mean pore radius=109 Angstrom) were impregnated with 155.7 g of a 8.60 weight-% aqueous solution of rhodium nitrate (Rh(NO$_3$)$_3$) with addition of 701 g deionized water. The Rh-impregnated alumina was calcined in air at a temperature of 590° C. for 3 h to form respective metal oxides. The calcined material was added to 2098 g deionized water containing 8 g n-octanol, 122 g 58.5 weight-% of barium nitrate (Ba(NO$_3$)$_2$) and 137 g 21.4 weight-% zirconium nitrate (Zr(NO$_3$)$_4$). The resulting mixture was milled using a continuous milling apparatus so that the Dv90 value of the particles was 4.83 micrometers.

(3) 3703 g of an oxygen storage compound (OSC), a mixed oxide comprising Ce (40 weight-% calculated as CeO$_2$) and Zr (45 weight-% calculated as ZrO$_2$), and further comprising Nd, La and Y (15 weight-% in total, each calculated as X$_2$O$_3$) and having a Dv90 value of 31 micrometers were impregnated with 733.8 g of a 18.74 weight-% aqueous solution of palladium nitrate (Pd(NO$_3$)$_2$)) together with addition of 810 g of deionized water. The Pd-impregnated OSC was calcined at a temperature of 590° C. to form the respective metal oxides. The calcined material was added to 5045 g of deionized water containing 8 g n-octanol, 285 g 58.5 weight-% of barium nitrate (Ba(NO$_3$)$_2$) and 205 g 21.4 weight-% zirconium nitrate (Zr(NO$_3$)$_4$). The resulting mixture was milled using the apparatus described above so that the Dv90 value of the particles was 4.91 micrometers.

(4) The materials obtained from (2) and (3) were combined to form the final TWC slurry. The pH of the aqueous phase of the slurry was adjusted with nitric acid to 3.6. The final slurry had a viscosity of 15.8 mPa·s, measured as described in Reference Example 5.

(5) The coated porous wall-flow substrate obtained from (1) was coated with the washcoat obtained from (4) as described in Reference Example 6 hereinabove over 100% of the axial length of the substrate from the inlet end.

Example 13: Cold Flow Backpressure Evaluation

The backpressure of the particulate filters obtained as described in Comparative Example 1 and 2 and Examples 1 and 3 was measured on a SuperFlow Cold Flow bench SF-1020 Superbench at ambient conditions. The backpressure data recorded at a volume flow of 700 m³/h is reported in Table 6.

TABLE 6

Cold Flow Back Pressure Data

| | Back pressure/mbar |
|---|---|
| Comparative Example 3 | 85.48 |
| Example 10 | 101.08 |
| Example 11 | 103.14 |
| Example 12 | 98.12 |

The higher backpressures obtained with Examples 10 to 12, having the same or inferior total loading, compared to Comparative Example 3 indicate a partial application of washcoat on the walls of the substrate.

Example 14

The catalysts from Comparative Example 3 and Examples 9 to 11 were canned. Further, they were 200 h fuel-cut aged in close-coupled position with 960° C. bed temperature. The aged catalysts were measured under Federal Test Procedure (FTP75) in close-coupled (CC) position on 2.0 l engine bench. Emission results measured after the respective catalysts are shown in Table 7.

TABLE 7

HC, CO and NOx emissions

| Sample | HC [g/km] | CO [g/km] | NOx [g/km] |
|---|---|---|---|
| Comparative Example 3 | 0.212 | 2.017 | 0.435 |
| Example 10 | 0.168 | 1.392 | 0.295 |
| Example 11 | 0.169 | 1.505 | 0.282 |
| Example 12 | 0.176 | 1.740 | 0.327 |

The catalysts of Examples 10 to 12 show improved gaseous conversion performance compared to the catalyst of Comparative Example 3. This example shows that even under aged conditions the catalysts according to the present invention permit to obtain reduced HC, CO and NOx emissions which demonstrate that the catalysts of the present invention have an improved thermal stability.

Comparative Example 4: FWC Catalyst not According to the Invention (in-Wall Coating—150 g/l)

A porous wall-flow substrate having a three-way conversion (TWC) catalyst permeating the substrate wall was prepared at a washcoat loading of 2.501 g/in³ (150 g/l) on a cordierite substrate sized 4.66*6 inches with 300 CPSI (cells per square inch), 8 mill wall thickness, average porosity of 65% and average pore size of 17 micrometers according to the following method:

(1) 2807 g of a high surface area gamma alumina (BET specific surface area=144 m²/g; total pore volume=0.843 ml/g; mean pore radius=109 Angstrom) were impregnated with 288.7 g of a 8.98 weight-% aqueous solution of rhodium nitrate (Rh(NO$_3$)$_3$) with addition of 1592 g deionized water. The Rh-impregnated alumina was calcined in air at a temperature of 590° C. for 3 h to form respective metal oxides. The calcined material was added to 4459 g deionized water containing 17 g n-octanol, 260 g 58.6 weight-% of barium nitrate (Ba(NO$_3$)$_2$) and 297 g 21.0 weight-% zirconium nitrate (Zr(NO$_3$)$_4$). The resulting mixture was milled using a continuous milling apparatus so that the Dv90 value of the particles was 5.86 micrometer.

(2) 7809 g of an oxygen storage compound (OSC), a mixed oxide comprising Ce (40 weight-% calculated as CeO$_2$) and Zr (45 weight-% calculated as ZrO$_2$), and further comprising Nd, La and Y (15 weight-% in total, each calculated as X$_2$O$_3$) and having a Dv90 value of micrometer were impregnated with 862.3 g of a 19.23 weight-% aqueous solution of palladium nitrate (Pd (NO$_3$)$_2$)) together with addition of 2149 g of deionized water. The Pd-impregnated OSC was calcined at a temperature of 590° C. to form respective metal oxides. The calcined material was added to 10564 g of deionized water containing 17 g n-octanol, 606 g 58.6 weight-% of barium nitrate (Ba(NO$_3$)$_2$) and 445 g 21.0 weight-% zirconium nitrate (Zr(NO$_3$)$_4$). The resulting mixture was milled using the apparatus described above so that the Dv90 value of the particles was 4.77 micrometers.

(3) The materials obtained from (1) and (2) were combined to form the final TWC slurry. The pH of the aqueous phase of the slurry was adjusted with nitric acid to 3.7. The final slurry had a viscosity of 20.9 mPa·s, measured as described in Reference Example 5.
(4) The porous wall-flow substrate was coated with the washcoat obtained from (3) as described in Reference Example 6 by immersing 50% of the axial length of the substrate from the inlet side plus 3 mm followed by drying and calcining for 3 h at 450° C. then by immersing 50% of the axial length of the substrate from the outlet side plus 3 mm followed by drying. The coated substrate was then calcined for 3 h at 450° C.

Example 15: FWC Catalyst (120 g/l TWC Catalytic Coating+30 g/l Oxidic Component—Dv90 of 3.18 Micrometers)

A porous wall-flow substrate, a cordierite substrate sized 4.66*6 inches with 300 CPSI (cells per square inch), 8 mill wall thickness, average porosity of 65% and average pore size of 17 micrometers, was coated with an oxidic component with a loading of 30 g/l prior to the application of the TWC catalytic coatings with a loading of 2.009 g/in$^3$ (120 g/l) according to the following method:
(1) 5291 g of a high surface area gamma alumina (BET specific surface area=149 m$^2$/g; total pore volume=0.535 ml/g) was added to an aqueous solution containing 36706 g deionized water, 57 g n-octanol, 338 g acetic acid, 861 g of 29.7 weight-% zirconium acetate, 434 g of 59.88 weight-% barium acetate and 1315 g of 79.00 weight-% boehmite. The pH of the resulting slurry was adjusted with acetic acid to 3.6. The slurry was then milled so that the Dv90 value of the containing particles was 3.18 micrometers. The solid content of the slurry was of 14.47 weight-%.
(2) The porous wall-flow substrate was coated with a slurry obtained from (1) as described in Reference Example 6.
(3) 2196 g of a high surface area gamma alumina (BET specific surface area=144 m$^2$/g; total pore volume=0.843 ml/g; mean pore radius=109 Angstrom) were impregnated with 282.3 g of a 8.98 weight-% aqueous solution of rhodium nitrate (Rh(NO$_3$)$_3$) with addition of 1134 g deionized water. The Rh-impregnated alumina was calcined in air at a temperature of 590° C. for 3 h to form respective metal oxides. The calcined material was added to 3497 g deionized water containing 13 g n-octanol, 203 g 58.6 weight-% of barium nitrate (Ba(NO$_3$)$_2$) and 232 g 21.0 weight-% zirconium nitrate (Zr(NO$_3$)$_4$). The resulting mixture was milled using a continuous milling apparatus so that the Dv90 value of the particles was 5.23 micrometers.
(4) 6109 g of an oxygen storage compound (OSC), a mixed oxide comprising Ce (40 weight-% calculated as CeO$_2$) and Zr (45 weight-% calculated as ZrO$_2$), and further comprising Nd, La and Y (15 weight-% in total, each calculated as X$_2$O$_3$) and having a Dv90 value of 31 micrometers were impregnated with 843.3 g of a 18.74 weight-% aqueous solution of palladium nitrate (Pd(NO$_3$)$_2$)) together with addition of 1573 g of deionized water. The Pd-impregnated OSC was calcined at a temperature of 590° C. to form respective metal oxides. The calcined material was added to 8309 g of deionized water containing 13 g n-octanol, 474 g 58.6 weight-% of barium nitrate (Ba(NO$_3$)$_2$) and 348 g 21.0 weight-% zirconium nitrate (Zr(NO$_3$)$_4$). The resulting mixture was milled using the apparatus described above so that the Dv90 value of the particles was 5.56 micrometers.
(5) The materials obtained from (3) and (4) were combined to form the final TWC slurry. The pH of the aqueous phase of the slurry was adjusted with nitric acid to 3.4. The final slurry had a viscosity of 15.3 mPa·s, measured as described in Reference Example 5.
(6) The coated porous wall-flow substrate was coated with the slurry obtained from (5) as described in Reference Example 6 by immersing 50% of the axial length of the substrate from the inlet side plus 3 mm followed by drying and calcining for 3 h at 450° C. (TWC catalytic coating) and then by immersing 50% of the axial length of the substrate in the slurry obtained from (5) from the outlet side plus 3 mm (2$^{nd}$ TWC catalytic coating) followed by drying. The coated substrate was then calcined for 3 h at 450° C.

Example 16: FWC Catalyst (150 g/l TWC Catalytic Coating+15 g/l Oxidic Component)

A porous wall-flow substrate, a cordierite substrate sized 4.66*6 inches with 300 CPSI (cells per square inch), 8 mill wall thickness, average porosity of 65% and average pore size of 17 micrometers, was coated with an oxidic component with a loading of 15 g/l prior to the application of the TWC catalytic coatings with a loading of 2.501 g/in$^3$ (150 g/l) according to the following method:
(1) 6670 g of a highly dispersed boehmite phase aluminium oxide hydroxide (Dv50<0.5 micrometer) 79.00 weight-% was added to an aqueous solution containing 16296 g deionized water, 6 g acetic acid and 132 g n-octanol. The resulting mixture was milled to homogenize the slurry. The pH of the aqueous phase of the slurry was adjusted with nitric acid to 3.2. Particle size measurement by light scattering was not applicable to this slurry. The solid content of the slurry was of 19.29 weight-%.
(2) The porous wall-flow substrate was coated with the slurry obtained from (1) as described in Reference Example 6 over 100% of the substrate axial length from the inlet end to the outlet end.
(3) 2005 g of a high surface area gamma alumina (BET specific surface area=144 m$^2$/g; total pore volume=0.843 ml/g; mean pore radius=109 Angstrom) were impregnated with 206.2 g of a 8.98 weight-% aqueous solution of rhodium nitrate (Rh(NO$_3$)$_3$) with addition of 1219 g deionized water. The Rh-impregnated alumina was calcined in air at a temperature of 590° C. for 3 h to form respective metal oxides. The calcined material was added to 3185 g deionized water containing 12 g n-octanol, 185 g 58.6 weight-% of barium nitrate (Ba(NO$_3$)$_2$) and 212 g 21.0 weight-% zirconium nitrate (Zr(NO$_3$)$_4$). The resulting mixture was milled using a continuous milling apparatus so that the Dv90 value of the particles was 5.14 micrometers.
(4) 5525 g of an oxygen storage compound (OSC), a mixed oxide comprising Ce (40 weight-% calculated as CeO$_2$) and Zr (50 weight-% calculated as ZrO$_2$), and further comprising La, and Y (10 weight-% in total, each calculated as X$_2$O$_3$) and having a Dv90 value of 12.7 micrometers were impregnated with 616.0 g of a 19.23 weight-% aqueous solution of palladium nitrate (Pd(NO$_3$)$_2$)) together with addition of 1477 g of deionized water. The Pd-impregnated OSC was calcined at a temperature of 590° C. to form respective metal oxides. The calcined material was added to 7546 g of deionized water containing 12 g n-octanol, 433 g 58.6 weight-% of barium nitrate (Ba(NO$_3$)$_2$) and 318 g 21.0 weight-% zirconium nitrate (Zr(NO$_3$)$_4$). The resulting mixture was milled using the apparatus described above so that the Dv90 value of the particles was 5.51 micrometers.

(5) The materials obtained from (3) and (4) were combined to form the final TWC slurry. The pH of the aqueous phase of the slurry was adjusted with nitric acid to 3.2. The final slurry had a viscosity of 17.0 mPa·s, measured as described in Reference Example 5.

(6) The coated porous wall-flow substrate obtained from (2) was coated with the slurry obtained from (5) as described in Reference Example 6 by immersing 50% of the axial length of the substrate from the inlet side plus 3 mm (TWC catalytic coating) followed by drying and calcining for 3 h at 450° C. then by immersing 50% of the axial length of the substrate in the slurry obtained from (5) from the outlet side plus 3 mm ($2^{nd}$ TWC catalytic coating) followed by drying. The coated substrate was then calcined for 3 h at 450° C.

Example 17: Cold Flow Backpressure Evaluation

The backpressure of the catalysts obtained as described in Comparative Example 4 and Examples 15 and 16 was measured on a SuperFlow Cold Flow bench SF-1020 Superbench at ambient conditions. The backpressure data recorded at a volume flow of 500 m$^3$/h is reported in Table 8.

TABLE 8

Cold Flow Back Pressure Data

|  | Back pressure/mbar |
| --- | --- |
| Comparative Example 4 | 51.6 |
| Example 15 | 104.4 |
| Example 16 | 53.8 |

The higher backpressure obtained with Example 15 compared to Comparative Example 4 indicates a partial application of washcoat on the walls of the substrate.

Example 18

The catalysts of Comparative Example 4 and Examples 15 and 16 were canned and measured under World Light Duty Test Cycle (WLTC) in close-coupled (CC) position on a dynamic engine bench equipped with a 2.0 l direct-injection turbo engine. Emissions of particulate number according to the PMP protocol were measured for full systems and compared to the engine raw emission for calculation of the filtration efficiency. Results are shown in Table 9.

TABLE 9

WLTC Emission Results on engine bench

|  | Particulate Number (#/km) | Filtration Efficiency based on engine raw emission |
| --- | --- | --- |
| Comparative Example 4 | 8.3951E+10 | 58% |
| Example 15 | 5.2249E+10 | 74% |
| Example 16 | 8.1555E+10 | 59% |
| Engine raw emission | 1.9993E+11 | -not applicable- |

The catalyst of Example 15 shows improved filtration efficiency compared to Comparative Example 4. The higher filtration efficiency obtained with Example 15 indicates the partial application of washcoat on the walls of the substrate.

Example 19

The canned catalysts form Comparative Example 4 and Examples 15 and 16 were 100 h fuel-cut aged in close-coupled position with 950° C. inlet temperature. The aged catalysts were measured under World Harmonized Light Duty Test Cycle (WLTC) in close-coupled (CC) position on 2.0 l engine bench. Emission results measured after the respective catalysts are shown in Table 10.

TABLE 10

HC, CO and NOx emmissions

| Sample | HC [g/km] | CO [g/km] | NOx [g/km] |
| --- | --- | --- | --- |
| Comparative Example 4 | 0.86 | 1.307 | 0.193 |
| Example 15 | 0.66 | 0.966 | 0.134 |
| Example 16 | 0.065 | 1.008 | 0.094 |

The catalysts of Examples 15 and 16 show improved gaseous conversion performance compared to the catalyst of Comparative Example 4. This example shows that even under aged conditions the catalysts according to the present invention permit to obtain reduced HC, CO and NOx emissions. This demonstrates that the catalysts of the present invention have an improved thermal stability.

Comparative Example 5: FWC Catalyst not According to the Invention (150 g/l)

A porous wall-flow substrate having a three-way conversion (TWC) catalyst permeating the substrate wall was prepared at a washcoat loading of 2.494 g/in$^3$ (150 g/l) on a cordierite substrate sized 4.66*6 inches with 300 CPSI (cells per square inch), 8 mill wall thickness, average porosity of 63% and average pore size of 20 micrometers according to the following method:

(1) 1629 g of a high surface area gamma alumina (BET specific surface area=144 m$^2$/g; total pore volume=0.843 ml/g; mean pore radius=109 Angstrom) were impregnated with 174.2 g of a 8.50 weight-% aqueous solution of rhodium nitrate (Rh(NO$_3$)$_3$) with addition of 968 g deionized water. The Rh-impregnated alumina was calcined in air at a temperature of 590° C. for 3 h to form respective metal oxides. The calcined material was added to 2548 g deionized water containing 10 g n-octanol, 148 g 58.6 weight-% of barium nitrate (Ba(NO$_3$)$_2$) and 170 g 21.0 weight-% zirconium nitrate (Zr(NO$_3$)$_4$). The resulting mixture was milled using a continuous milling apparatus so that the Dv90 value of the particles was 5.51 micrometers.

(2) 4419 g of an oxygen storage compound (OSC), a mixed oxide comprising Ce (40 weight-% calculated as CeO$_2$) and Zr (50 weight-% calculated as ZrO$_2$), and further comprising La, and Y (10 weight-% in total, each calculated as X$_2$O$_3$) and having a Dv90 value of 12.7 micrometers were impregnated with 513.0 g of a 18.48 weight-% aqueous solution of palladium nitrate (Pd(NO$_3$)$_2$)) together with addition of 1168 g of deionized water. The Pd-impregnated OSC was calcined at a temperature of 590° C. to form respective metal oxides. The calcined material was added to 6036 g of deionized water containing 10 g n-octanol, 346 g 58.6 weight-% of barium nitrate (Ba(NO$_3$)$_2$) and 255 g 21.0 weight-% zirconium nitrate (Zr(NO$_3$)$_4$). The resulting mixture was milled using the apparatus described above so that the Dv90 value of the particles was 5.98 micrometers.

(3) The materials obtained from (1) and (2) were combined to form the final TWC slurry. The pH of the slurry was adjusted with nitric acid to 3.2. The final slurry had a viscosity of 18.5 mPa·s, measured as described in Reference Example 5.

(4) The porous wall-flow substrate was coated with the washcoat obtained from (3) as described in Reference Example 6 by immersing 50% of the axial length of the substrate from the inlet side plus 3 mm followed by drying and calcining for 3 h at 450° C. then by immersing 50% of the axial length of the substrate from the outlet side plus 3 mm followed by drying. The coated substrate was then calcined for 3 h at 450° C.

Example 20: FWC Catalyst (120 g/l TWC Catalytic Coating+30 g/l Oxidic Component)

A porous wall-flow substrate, a cordierite substrate sized 4.66*6 inches with 300 CPSI (cells per square inch), 8 mill wall thickness, average porosity of 63% and average pore size of 20 micrometers, was coated with an oxidic component with a loading of 30 g/l prior to the application of the TWC catalytic coatings with a loading of 2.009 g/in$^3$ (120 g/l) according to the following method:

(1) 6367 g of a highly dispersed boehmite phase aluminium oxide hydroxide (Dv50<0.5 micrometer) 79.40 weight-% was added to an aqueous solution containing 13553 g deionized water and 150 g n-octanol. The resulting mixture was milled to homogenize and obtain a slurry. The pH of the aqueous phase of the slurry was adjusted with nitric acid to 3.8. Particle size measurement by light scattering was not applicable to this solution. The solid content of the slurry was of 23.88 weight-%. (2) The porous wall-flow substrate was coated with the slurry obtained from (1) as described in Reference Example 6 over 100% of the substrate axial length from the inlet end.

(3) 3546 g of a high surface area gamma alumina (BET specific surface area=144 m$^2$/g; total pore volume=0.843 ml/g; mean pore radius=109 Angstrom) were impregnated with 474.2 g of a 8.50 weight-% aqueous solution of rhodium nitrate (Rh(NO$_3$)$_3$) with addition of 2072 g deionized water. The Rh-impregnated alumina was calcined in air at a temperature of 590° C. for 3 h to form respective metal oxides. The calcined material was added to 5562 g deionized water containing 21 g n-octanol, 323 g 58.6 weight-% of barium nitrate (Ba(NO$_3$)$_2$) and 370 g 21.0 weight-% zirconium nitrate (Zr(NO$_3$)$_4$). The resulting mixture was milled using a continuous milling apparatus so that the Dv90 value of the particles was 5.62 micrometers.

(4) 9625 g of an oxygen storage compound (OSC), a mixed oxide comprising Ce (40 weight-% calculated as CeO$_2$) and Zr (50 weight-% calculated as ZrO$_2$), and further comprising La, and Y (10 weight-% in total, each calculated as X$_2$O$_3$) and having a Dv90 value of 12.7 micrometers were impregnated with 1396.6 g of a 18.48 weight-% aqueous solution of palladium nitrate (Pd(NO$_3$)$_2$)) together with addition of 2365 g of deionized water. The Pd-impregnated OSC was calcined at a temperature of 590° C. to form respective metal oxides. The calcined material was added to 13217 g of deionized water containing 21 g n-octanol, 754 g 58.6 weight-% of barium nitrate (Ba(NO$_3$)$_2$) and 555 g 21.0 weight-% zirconium nitrate (Zr(NO$_3$)$_4$). The resulting mixture was milled using the apparatus described above so that the Dv90 value of the particles was 5.32 micrometers.

(5) The materials obtained from (3) and (4) were combined to form the final TWC slurry. The pH of the aqueous phase of the slurry was adjusted with nitric acid to 3.6. The final slurry had a viscosity of 26.3 mPa·s, measured as described in Reference Example 5.

(6) The coated porous wall-flow substrate obtained from (2) was coated with the slurry obtained from (5) as described in Reference Example 6 by immersing 50% of the axial length of the substrate from the inlet side plus 3 mm followed by drying and calcining for 3 h at 450° C. (TWC catalytic coating) and then by immersing 50% of the axial length of the substrate in the slurry obtained from (5) from the outlet side plus 3 mm (2$^{nd}$ TWC catalytic coating) followed by drying. The coated substrate was then calcined for 3 h at 450° C.

Example 21: FWC Catalyst (120 g/l TWC Catalytic Coating+30 g/l Oxidic Component—Dv90 of 4.51 Micrometers)

A porous wall-flow substrate, a cordierite substrate sized 4.66*6 inches with 300 CPSI (cells per square inch), 8 mill wall thickness, average porosity of 63% and average pore size of 20 micrometers, was coated with an oxidic component with a loading of 30 g/l prior to the application of the TWC catalytic coatings with a loading of 2.009 g/in$^3$ (150 g/l) according to the following method:

(1) 4516 g of a high surface area gamma alumina (BET specific surface area=149 m$^2$/g; total pore volume=0.535 ml/g) was added to an aqueous solution containing 10527 g deionized water, 40 g n-octanol, 288 g acetic acid, 608 g of 30.34 weight-% zirconium acetate, 309 g of 59.84 weight-% barium acetate. The pH of the aqueous phase of the resulting slurry was adjusted with nitric acid to 3.4. The slurry was then milled so that the Dv90 value of the containing particles was 4.51 micrometers. The solid content of the slurry was of 19.65 weight-%. (2) The slurry obtained from (1) was coated as described in Reference Example 6 over 100% of the substrate axial length from the inlet end.

(3) The porous wall-flow substrate obtained from (2) was coated with the TWC slurry obtained from Example 20 (3)-(5) as described in Example 20, (6).

Example 22: FWC Catalyst (120 g/l TWC Catalytic Coating+30 g/l Oxidic Component—Dv90 of 4.83 Micrometers)

A porous wall-flow substrate, a cordierite substrate sized 4.66*6 inches with 300 CPSI (cells per square inch), 8 mill wall thickness, average porosity of 63% and average pore size of 20 micrometers, was coated with an oxidic component with a loading of 30 g/l prior to the application of the TWC catalytic coatings with a loading of 2.009 g/in$^3$ (150 g/l) according to the following method:

(1) 4765 g of a high surface area gamma alumina (BET specific surface area=80 m$^2$/g; total pore volume=0.42 ml/g) was added to an aqueous solution containing 10905 g deionized water, 42 g n-octanol, 114 g acetic acid, 634 g of 30.34 weight-% zirconium acetate, 321 g of 59.84 weight-% barium acetate. The pH of the aqueous phase of the resulting slurry was adjusted with nitric acid to 3.8. The slurry was then milled so that the Dv90 value of the containing particles was 4.83 micrometers. The solid content of the slurry was of 19.20 weight-%. (2) The porous wall-flow substrate was coated with the slurry obtained from (1) as described in Reference Example 6 over 100% of the substrate axial length from the inlet side.
(3) The porous wall-flow substrate obtained from (2) was coated with the TWC slurry obtained from Example 20 (3)-(5) as described in Example 20, (6).

Example 23: Cold Flow Backpressure Evaluation

The backpressure of the catalysts obtained as described in Comparative Example 5 and Example 20 to 22 was measured on a SuperFlow Cold Flow bench SF-1020 Superbench at ambient conditions. The backpressure data recorded at a volume flow of 600 m$^3$/h is reported in Table 11.

TABLE 11

Cold Flow Back Pressure Data

| | Back pressure/mbar |
|---|---|
| Comparative Example 5 | 76.8 |
| Example 20 | 84.5 |
| Example 21 | 101.6 |
| Example 22 | 95.9 |

The higher filtration efficiency obtained with Examples 20 to 22 compared to Comparative Example 5 indicates the partial application of washcoat on the walls of the substrate.

Example 24

Canned catalysts form Comparative Example 5 and Examples 20 to 22 were 100 h fuel-cut aged in close-coupled position with 950° C. inlet temperature. Aged Cans were measured under world light duty test cycle (WLTC) in close-coupled (CC) position on 2.0 l engine bench. Emission results measured after the respective catalysts are shown in Table 12.

TABLE 12

HC, CO and NOx emissions

| Sample | HC [g/km] | CO [g/km] | NOx [g/km] |
|---|---|---|---|
| Comparative Example 5 | 0.106 | 0.676 | 0.127 |
| Example 20 | 0.097 | 0.687 | 0.121 |
| Example 21 | 0.103 | 0.631 | 0.094 |
| Example 22 | 0.094 | 0.635 | 0.109 |

The catalysts of Examples 20 to 22 show improved gaseous conversion performance compared to the catalyst of Comparative Example 5. This example shows that even under aged conditions the catalysts according to the present invention permit to obtain reduced HC, CO and NOx emissions. This demonstrates that the catalysts of the present invention have an improved thermal stability.

Example 25

The catalysts of Comparative Example 5 and Examples 20 to 22 were canned and measured under World Light Duty Test Cycle (WLTC) in close-coupled (CC) position on a dynamic engine bench equipped with a 2.0 l direct-injection turbo engine. Emissions of particulate number according to the PMP protocol were measured for full systems and compared to the engine raw emission for calculation of the filtration efficiency. Results are shown in Table 13.

TABLE 13

WLTC Emission Results on engine bench

| | Particulate Number (#/km) | Filtration Efficiency based on engine raw emission |
|---|---|---|
| Comparative Example 5 | 1.24813E+11 | 65.9% |
| Example 20 | 9.88E+10 | 73.1% |
| Example 21 | 8.24E+10 | 77.5% |
| Engine raw emission | 3.67E+11 | -not applicable- |

The catalysts of Examples 20 and 21 shows improved filtration efficiency compared to the catalyst of Comparative Example 5.

Comparative Example 6: FWC Catalyst not According to the Invention (100 g/l)

A porous wall-flow substrate having a three-way conversion (TWC) catalyst permeating the substrate wall was prepared at a washcoat loading of 1.639 g/in$^3$ (100 g/l) on a cordierite substrate sized 4.66*4 inches with 300 CPSI (cells per square inch), 8 mill wall thickness, average porosity of 65% and average pore size of 17 micrometers according to the following method:
(1) 1598 g of a high surface area gamma alumina (BET specific surface area=144 m$^2$/g; total pore volume=0.843 ml/g; mean pore radius=109 Angstrom) were impregnated with 243.6 g of a 7.27 weight-% aqueous solution of rhodium nitrate (Rh(NO$_3$)$_3$) with addition of 891 g deionized water. The Rh-impregnated alumina was calcined in air at a temperature of 590° C. for 3 h to form respective metal oxides. The calcined material was added to 2543 g deionized water containing 10 g n-octanol, 148 g 58.6 weight-% of barium nitrate (Ba(NO$_3$)$_2$) and 169 g 21.0 weight-% zirconium nitrate (Zr(NO$_3$)$_4$). The resulting mixture was milled using a continuous milling apparatus so that the Dv90 value of the particles was 5.76 micrometers.
(2) 4433 g of an oxygen storage compound (OSC), a mixed oxide comprising Ce (40 weight-% calculated as CeO$_2$) and Zr (50 weight-% calculated as ZrO$_2$), and further comprising La, and Y (10 weight-% in total, each calculated as X$_2$O$_3$) was impregnated with 639 g of a 17.99 weight-% aqueous solution of palladium nitrate (Pd(NO$_3$)$_2$)) together with addition of 1123 g of deionized water. The Pd-impregnated OSC was calcined at a temperature of 590° C. to form respective metal oxides. The calcined material was added to 6042 g of deionized water containing 10 g n-octanol, 345 g 58.6 weight-% of barium nitrate (Ba(NO$_3$)$_2$) and 254 g 21.0 weight-% zirconium nitrate (Zr(NO$_3$)$_4$). The resulting mixture was milled using the apparatus described above so that the Dv90 value of the particles was 5.27 micrometers.
(3) The materials obtained from (1) and (2) were combined to form the final TWC slurry. The pH of the slurry was adjusted with nitric acid to 3.2. The final slurry had a viscosity of 28.6 mPa·s, measured as described in Reference Example 5.
(4) The porous wall-flow substrate was coated with the washcoat obtained from (3) as described in Reference Example 6 by immersing 50% of the axial length of the substrate from the inlet side plus 3 mm followed by drying and calcining for 3 h at 450° C. then by immersing 50% of the axial length of the substrate from the outlet side plus 3 mm followed by drying. The coated substrate was then calcined for 3 h at 450° C.

Example 26: FWC Catalyst (70 g/l TWC Catalytic Coating+30 g/l Oxidic Component—Dv90 of 4.85 Micrometers)

A porous wall-flow substrate, a cordierite substrate sized 4.66*4 inches with 300 CPSI (cells per square inch), 8 mill wall thickness, average porosity of 65% and average pore size of 17 micrometers, was coated with an oxidic component with a loading of 30 g/l prior to the application of the TWC catalytic coating with a loading of 1.148 g/in$^3$ (70 g/l) according to the following method:
(1) 4233 g of a high surface area gamma alumina (BET specific surface area=149 m$^2$/g; total pore volume=0.535 ml/g) was added to an aqueous solution containing 9867 g deionized water, 38 g n-octanol, 289 g of 59.93 weight-% barium acetate. The pH of the aqueous phase of the resulting slurry was adjusted with nitric acid to 3.3. The slurry was then milled so that the Dv90 value of the containing particles was 4.85 micrometers. The solid content of the slurry was of 28.89 weight-%.
(2) The porous wall-flow substrate was coated with the slurry obtained from (1) as described in Reference Example 6 over 100% of the substrate axial length from the inlet end.
(3) 1287 g of a high surface area gamma alumina (BET specific surface area=144 m$^2$/g; total pore volume=0.843 ml/g; mean pore radius=109 Angstrom) were impregnated with 280.2 g of a 7.27 weight-% aqueous solution of rhodium nitrate (Rh(NO$_3$)$_3$) with addition of 669 g deionized water. The Rh-impregnated alumina was calcined in air at a temperature of 590° C. for 3 h to form respective metal oxides. The calcined material was added to 2058 g deionized water containing 8 g n-octanol, 119 g 58.6 weight-% of barium nitrate (Ba(NO$_3$)$_2$) and 136 g 21.0 weight-% zirconium nitrate (Zr(NO$_3$)$_4$). The resulting mixture was milled using a continuous milling apparatus so that the Dv90 value of the particles was 4.98 micrometers.
(4) 3558 g of an oxygen storage compound (OSC), a mixed oxide comprising Ce (40 weight-% calculated as CeO$_2$) and Zr (50 weight-% calculated as ZrO$_2$), and further comprising La, and Y (10 weight-% in total, each calculated as X$_2$O$_3$) and having a Dv90 value of 12.7 micrometers were impregnated with 735.8 g of a 17.99 weight-% aqueous solution of palladium nitrate (Pd(NO$_3$)$_2$)) together with addition of 733 g of deionized water. The Pd-impregnated OSC was calcined at a temperature of 590° C. to form respective metal oxides. The calcined material was added to 4920 g of deionized water containing 8 g n-octanol, 278 g 58.6 weight-% of barium nitrate (Ba(NO$_3$)$_2$) and 204 g 21.0 weight-% zirconium nitrate (Zr(NO$_3$)$_4$). The resulting mixture was milled using the apparatus described above so that the Dv90 value of the particles was 5.25 micrometers.
(5) The materials obtained from (3) and (4) were combined to form the final TWC slurry. The pH of the aqueous phase of the slurry was adjusted with nitric acid to 3.5. The final slurry had a viscosity of 10.3 mPa·s, measured as described in Reference Example 5.
(6) The coated porous wall-flow substrate obtained from (2) was coated with the slurry obtained from (5) as described in Reference Example 6 by immersing 100% of the axial length of the substrate from the inlet followed by drying and calcining for 3 h at 450° C. (TWC catalytic coating). The coated substrate was then calcined for 3 h at 450° C.

Example 27: FWC Catalyst (70 g/l TWC Catalytic Coating+30 g/l Oxidic Component—Dv90 of 4.85 Micrometers)

A porous wall-flow substrate, a cordierite substrate sized 4.66*4 inches with 300 CPSI (cells per square inch), 8 mill wall thickness, average porosity of 65% and average pore size of 17 micrometers, was coated with an oxidic component with a loading of 30 g/l prior to the application of the TWC catalytic coatings with a loading of 1.148 g/in$^3$ (70 g/l) according to the following method:
(1) The porous wall-flow substrate was coated with the slurry obtained from Example 26 (1) as described in Reference Example 6 over 100% of the substrate axial length from the inlet end.
(2) 1287 g of a high surface area gamma alumina (BET specific surface area=144 m$^2$/g; total pore volume=0.843 ml/g; mean pore radius=109 Angstrom) were impregnated with 280.2 g of a 7.27 weight-% aqueous solution of rhodium nitrate (Rh(NO$_3$)$_3$) with addition of 669 g deionized water. The Rh-impregnated alumina was calcined in air at a temperature of 590° C. for 3 h to form respective metal oxides. The calcined material was added to 2058 g deionized water containing 8 g n-octanol, 119 g 58.6 weight-% of barium nitrate (Ba(NO$_3$)$_2$) and 136 g 21.0 weight-% zirconium nitrate (Zr(NO$_3$)$_4$). The resulting mixture was milled using a continuous milling apparatus so that the Dv90 value of the particles was 13.15 micrometers.
(3) 3558 g of an oxygen storage compound (OSC), a mixed oxide comprising Ce (40 weight-% calculated as CeO$_2$) and Zr (50 weight-% calculated as ZrO$_2$), and further comprising La, and Y (10 weight-% in total, each calculated as X$_2$O$_3$) and having a Dv90 value of 12.7 micrometers were impregnated with 735.8 g of a 17.99 weight-% aqueous solution of palladium nitrate (Pd(NO$_3$)$_2$)) together with addition of 733 g of deionized water. The Pd-impregnated OSC was calcined at a temperature of 590° C. to form respective metal oxides. The calcined material was added to 4920 g of deionized water containing 8 g n-octanol, 278 g 58.6 weight-% of barium nitrate (Ba(NO$_3$)$_2$) and 204 g 21.0 weight-% zirconium nitrate (Zr(NO$_3$)$_4$). The resulting mixture was milled using the apparatus described above so that the Dv90 value of the particles was 13.13 micrometers.
(4) The materials obtained from (3) and (4) were combined to form the final TWC slurry. The pH of the aqueous phase of the slurry was adjusted with nitric acid to 3.7. The final slurry had a viscosity of 8.82 mPa·s, measured as described in Reference Example 5.
(5) The coated porous wall-flow substrate obtained from (2) was coated with the slurry obtained from (5) as described in Reference Example 6 by immersing 100% of the axial length of the substrate from the inlet followed by drying and calcining for 3 h at 450° C. (TWC catalytic coating). The coated substrate was then calcined for 3 h at 450° C.

Example 28

The catalysts of Comparative Example 6 and Examples 26 and 27 were canned and measured under World Light Duty Test Cycle (WLTC) in close-coupled (CC) position on a dynamic engine bench equipped with a 2.0 l direct-injection turbo engine. Emissions of particulate number according to the PMP protocol were measured for full systems and compared to the engine raw emission for calculation of the filtration efficiency. Results are shown in Table 14.

TABLE 14

WLTC Emission Results on engine bench

|  | Particulate Number (#/km) | Filtration Efficiency based on engine raw emission |
|---|---|---|
| Comparative Example 6 | 1.81E11 | 50.7 |
| Example 26 | 1.80E11 | 51.0 |
| Example 27 | 1.01E11 | 72.4 |
| Engine raw emission | 3.67E11 | -not applicable- |

The catalyst of Example 27 shows improved filtration efficiency compared to the catalyst of Comparative Example 6. This indicates the partial application of washcoat on the walls of the inlet passages of the substrate.

Example 29: Cold Flow Backpressure Evaluation

The backpressure of the catalysts obtained as described in Comparative Example 6 and Examples 26 and 27 was measured on a SuperFlow Cold Flow bench SF-1020 Superbench at ambient conditions. The backpressure data recorded at a volume flow of 500 m$^3$/h is reported in Table 15.

TABLE 15

Cold Flow Back Pressure Data at 500 m$^3$/h

|  | Back pressure/mbar |
|---|---|
| Comparative Example 6 | 43 |
| Example 26 | 49 |
| Example 27 | 113 |

The higher backpressure obtained from Example 27 compared to Comparative Example 6 indicates the partial application of washcoat on the walls of the substrate. The backpressure obtained with Example 26 is similar to those obtained with Comparative Example 6, this indicates predominantly in wall coating.

Example 30

A fresh catalyst from Example 21 was investigated by scanning electron microscopy (SEM). The results of Example 30 are displayed in FIG. 3. In FIG. 3, the arrows a) and b) show the catalytic washcoat (TWC) and the arrow c) shows shows the oxidic component in the pores. It is clearly seen that the washcoat is predominantely located on top of the filter walls whereas the oxidic component is distributed within the filter walls.

CITED LITERATURE

Figure 1:
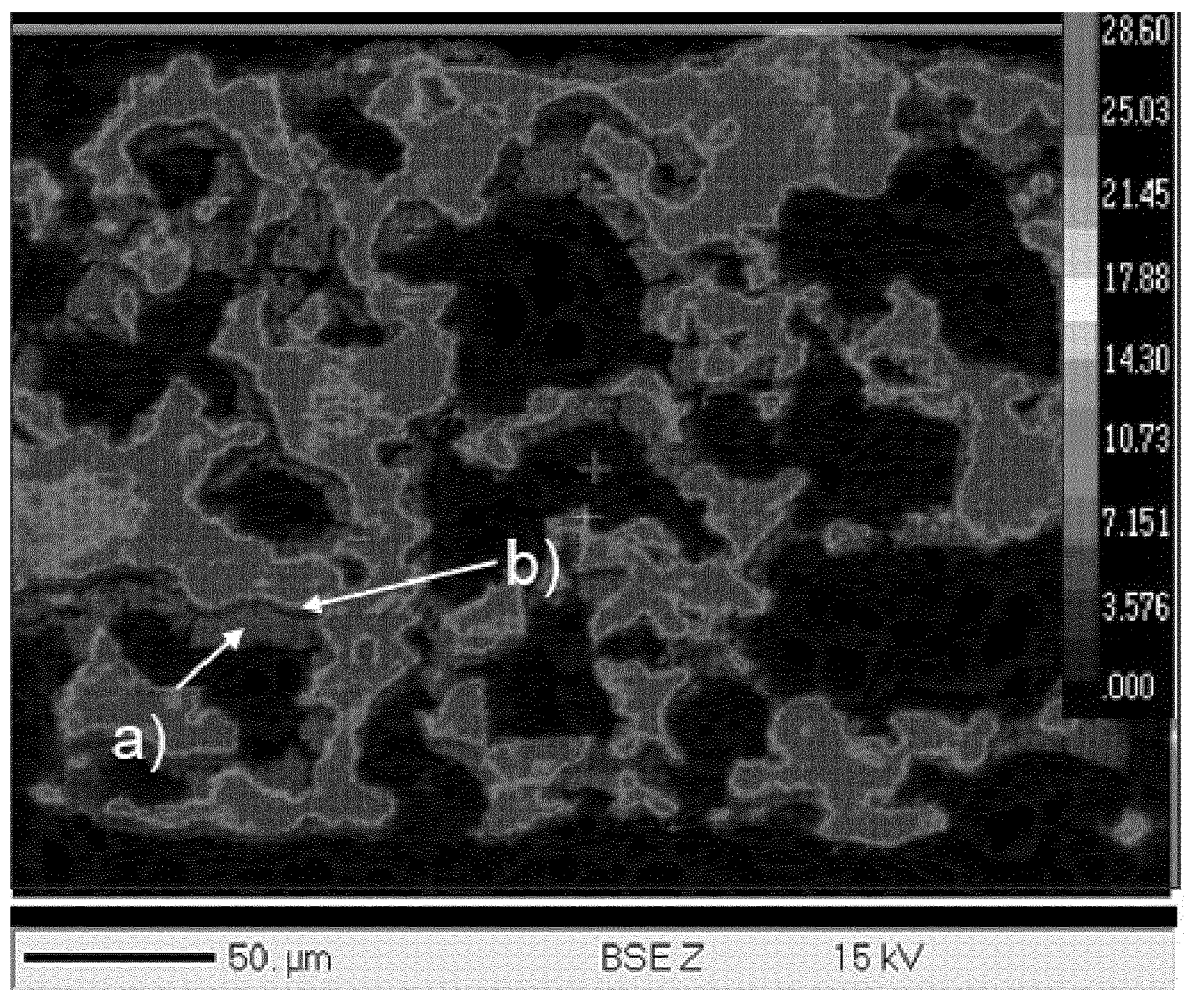
FIG. 1 shows the electron microprobe analyses (EMPA) of the four-way conversion catalyst of Example 3.
Figure 2:
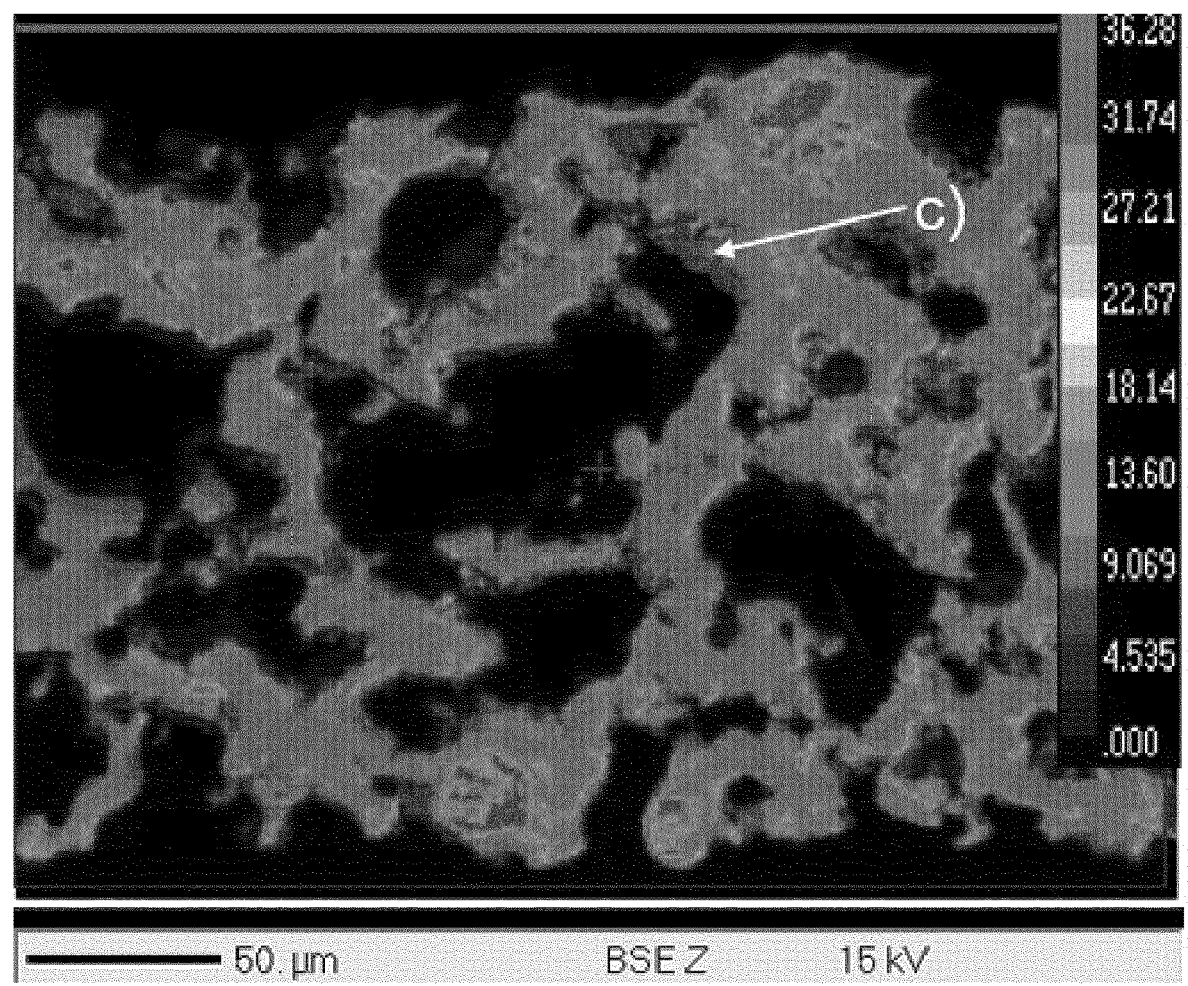
FIG. 2 shows the electron microprobe analyses (EMPA) of the four-way conversion catalyst of Comparative Example 1.
Figure 3:
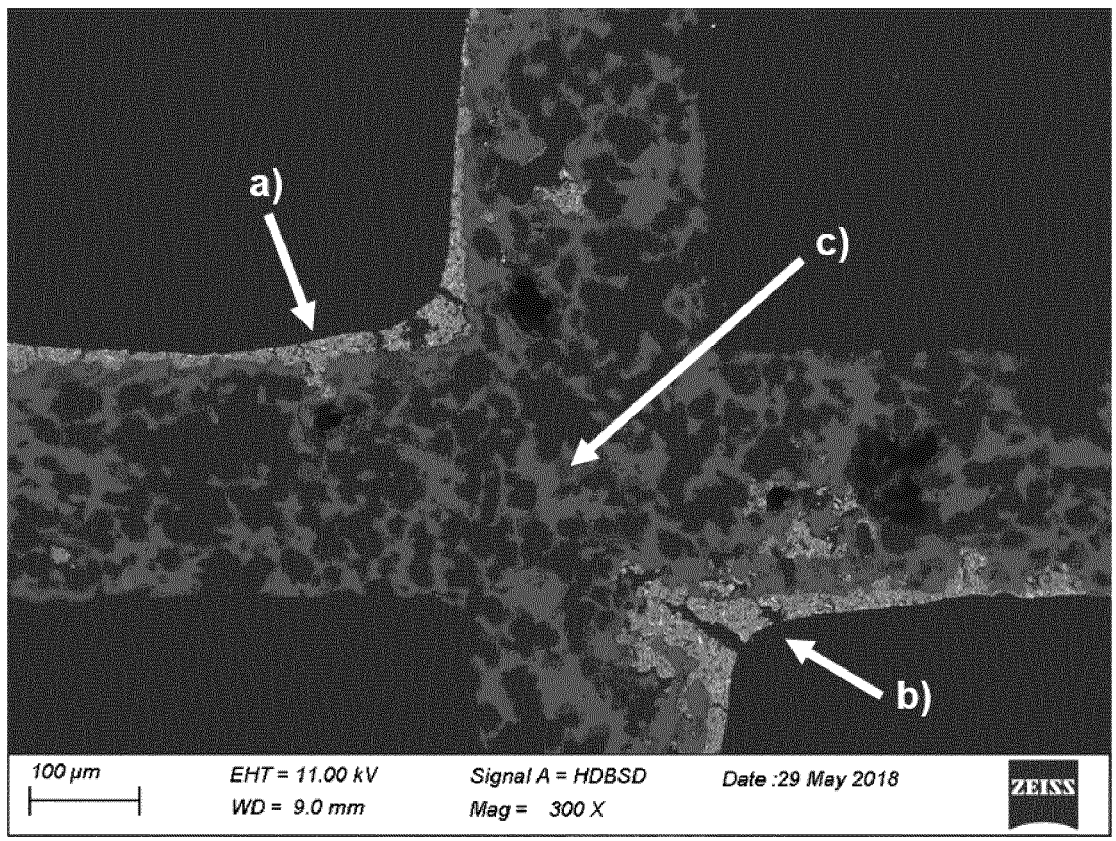
FIG. 3 shows the scanning electron microscopy (SEM) of the four-way conversion catalyst of Example 21.

U.S. Pat. No. 8,815,189B2
WO2018/024546A1
WO2018/024547A1

The invention claimed is:

1. A four-way conversion catalyst for the treatment of an exhaust gas stream of a gasoline engine, the catalyst comprising:
a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages with an open inlet end and a closed outlet end, and outlet passages with a closed inlet end and an open outlet end, wherein an interface between the passages and the porous internal walls is defined by a surface of the internal walls;
wherein the porous internal walls comprise pores, the pores comprise an oxidic component comprising a first refractory metal oxide, the first refractory metal oxide comprising aluminum, the oxidic component having a platinum group metal content ranging from weight-% to 0.001 weight-%, based on a total weight of the oxidic component;
wherein the catalyst further comprises a first three-way conversion catalytic coating, at least 10 weight-% thereof comprised in the pores of the internal walls, the first three-way conversion catalytic coating comprising an oxygen storage compound and a platinum group metal supported on a second refractory metal oxide; and
wherein the oxygen storage compound comprises a mixed oxide comprising cerium, zirconium, yttrium, neodymium and lanthanum, or a mixed oxide comprising cerium, zirconium, yttrium, and lanthanum.

2. The four-way conversion catalyst of claim 1, wherein from 98 weight-% to 100 weight-% of the first refractory metal consists of aluminum and oxygen.

3. The four-way conversion catalyst of claim 1, wherein the oxidic component further comprises an oxide comprising one or more of Mg, Ca, Sr, and Ba and an oxide comprising one or more of La, Y, Nd, Ti and Zr, or the oxidic component further comprises an oxide comprising one or more of Mg, Ca, Sr, and Ba --,-- or the oxidic component further comprises an oxide comprising one or more of La, Y, Nd, Ti and Zr.

4. The four-way conversion catalyst of claim 1, wherein from 98 weight-% to 100 weight-% of the oxidic component consist of the first refractory metal oxide.

5. The four-way conversion catalyst of claim 1, wherein the catalyst comprises the oxidic component at a loading ranging from 7 g/l to 75 g/l.

6. The four-way conversion catalyst of claim 1, wherein the first three-way conversion catalytic coating comprises one or more platinum group metals.

7. The four-way conversion catalyst of claim 1, wherein the first three-way conversion catalytic coating comprises a platinum group metal supported on the oxygen storage component.

8. The four-way conversion catalyst of claim 1, wherein the second refractory metal oxide comprises aluminum.

9. The four-way conversion catalyst of claim 1, wherein from 30 weight-% to 100 weight-% of the first three-way conversion catalytic coating is comprised in the pores of the internal walls.

10. The four-way conversion catalyst of claim 1, wherein the catalyst comprises the first three-way conversion catalytic coating at a loading ranging from 30 g/l to 250 g/l.

11. The four-way conversion catalyst of claim 1, wherein the pores comprising the oxidic component extend over x % of the substrate axial length from the inlet end toward the outlet end of the inlet passages or from the outlet end toward the inlet end of the outlet passages; with x ranging from 95 to 100.

12. The four-way conversion catalyst of claim 11, wherein the first three-way conversion catalytic coating extends over y % of the substrate axial length from the inlet end toward the outlet end of the inlet passages, with y ranging from 20 to x.

13. The four-way conversion catalyst of claim 11, wherein the first three-way conversion catalytic coating extends over y % of the substrate axial length from the inlet end toward the outlet end of the inlet passages, with y ranging from 20 to 70.

14. The four-way conversion catalyst of claim 11, wherein the catalyst further comprises a second three-way conversion catalytic coating, at least 10 weight-% thereof comprised in the pores of the internal walls, the second three-way conversion catalytic coating comprising an oxygen storage compound and a platinum group metal supported on a refractory metal oxide, and
  wherein the second three-way conversion catalytic coating extends over z % of the substrate axial length from the outlet end toward the inlet end of the outlet passages, with z ranging from 20 to x.

15. A process for preparing the four-way conversion catalyst according to claim 1, comprising:

(i) providing a porous wall-flow filter substrate comprising an inlet end, an outlet end, a substrate axial length extending between the inlet end and the outlet end, and a plurality of passages defined by porous internal walls of the porous wall-flow filter substrate, wherein the plurality of passages comprise inlet passages with an open inlet end and a closed outlet end, and outlet passages with a closed inlet end and an open outlet end, wherein the interface between the passages and the porous internal walls is defined by the surface of the internal walls, wherein the internal walls have an average pore size in the range of from 10 micrometers to 30 micrometers, and wherein the average porosity of the internal walls ranges from 25% to 75%;

(ii) providing a slurry comprising particles of a source of the oxidic component, the particles having a Dv90 value ranging from 0.005 micrometers to 20 micrometers; coating the porous internal walls of the porous wall-flow filter substrate provided in (i) with the particles of the slurry; calcining the obtained coated filter substrate, obtaining the filter substrate comprising the oxidic component; and (iii) providing a slurry comprising particles of a source of the first three-way conversion catalytic coating, the particles having a Dv90 value ranging from 2 micrometers to 25 micrometers; coating the porous internal walls of the porous wall-flow filter substrate obtained in (ii) with the particles of the slurry; calcining the obtained coated filter substrate, obtaining the filter substrate comprising the oxidic component and the first three-way conversion catalytic coating.

16. An exhaust gas treatment system downstream of and in fluid communication with a gasoline engine, the system comprising a four-way conversion catalyst according to claim 1.

* * * * *